(12) United States Patent  (10) Patent No.: US 9,104,312 B2
Kay et al.  (45) Date of Patent: Aug. 11, 2015

(54) MULTIMODAL TEXT INPUT SYSTEM, SUCH AS FOR USE WITH TOUCH SCREENS ON MOBILE PHONES

(75) Inventors: David Kay, Seattle, WA (US); Pim van Meurs, Kenmore, WA (US); Erland Unruh, Seattle, WA (US); Santosh Sharan, Acton, MA (US); Gordon Kessler, Mount Kisco, NY (US); Mayank Agarwal, Ashland, MA (US); Greg Sigel, Kentfield, CA (US)

(73) Assignee: Nuance Communications, Inc., Burlington, MA (US)

( * ) Notice: Subject to any disclaimer, the term of this patent is extended or adjusted under 35 U.S.C. 154(b) by 256 days.

(21) Appl. No.: 13/583,840

(22) PCT Filed: Mar. 14, 2011

(86) PCT No.: PCT/US2011/028387
§ 371 (c)(1),
(2), (4) Date: Oct. 16, 2012

(87) PCT Pub. No.: WO2011/113057
PCT Pub. Date: Sep. 15, 2011

(65) Prior Publication Data
US 2013/0046544 A1    Feb. 21, 2013

Related U.S. Application Data

(60) Provisional application No. 61/313,423, filed on Mar. 12, 2010, provisional application No. 61/313,454, filed on Mar. 12, 2010, provisional application No. 61/313,864, filed on Mar. 15, 2010, provisional application No. 61/316,799, filed on Mar. 23, 2010.

(51) Int. Cl.
*G06F 3/0488*    (2013.01)
*G06F 17/27*    (2006.01)

(52) U.S. Cl.
CPC ........ *G06F 3/04886* (2013.01); *G06F 3/04883* (2013.01); *G06F 17/2735* (2013.01); *G06F 2203/0381* (2013.01)

(58) Field of Classification Search
USPC ................. 704/9, 10, 275; 345/156, 168–178
See application file for complete search history.

(56) References Cited

U.S. PATENT DOCUMENTS 6,307,549 B1    10/2001  King et al.
7,382,358 B2     6/2008  Kushler et al.
(Continued)

FOREIGN PATENT DOCUMENTS

JP    H10-275046 A     10/1998
JP    2005-196759 A     7/2005
(Continued)

OTHER PUBLICATIONS

International Search Report and Written Opinion for PCT Application No. PCT/US11/28387, Mail Date May 12, 2011, 11 pages.

*Primary Examiner* — Abul Azad
(74) *Attorney, Agent, or Firm* — Perkins Coie LLP

(57) ABSTRACT

A system and method for entering text from a user includes a programmed processor that receives inputs from the user and disambiguates the inputs to present word choices corresponding to the text. In one embodiment, inputs are received in two or more modalities and are analyzed to present the word choices. In another embodiment, a keyboard is divided into zones each of which represents two more input characters. A sequence of zones selected by the user is analyzed to present word choices corresponding to the zone selected.

20 Claims, 28 Drawing Sheets

(56) References Cited

U.S. PATENT DOCUMENTS

| | | |
|---|---|---|
| 7,453,439 B1 * | 11/2008 | Kushler et al. ............ 345/168 |
| 7,881,936 B2 | 2/2011 | Longe et al. |
| 8,547,354 B2 * | 10/2013 | Koch et al. ............... 345/173 |
| 2006/0274051 A1 | 12/2006 | Longe et al. |
| 2007/0040813 A1 * | 2/2007 | Kushler et al. ............ 345/173 |
| 2007/0101292 A1 * | 5/2007 | Kupka ....................... 715/810 |
| 2007/0182595 A1 * | 8/2007 | Ghasabian ................. 341/22 |
| 2007/0259717 A1 | 11/2007 | Mattice et al. |
| 2008/0244446 A1 | 10/2008 | LeFevre et al. |
| 2008/0270896 A1 * | 10/2008 | Kristensson ............... 715/261 |
| 2009/0239587 A1 | 9/2009 | Negron et al. |
| 2009/0284471 A1 | 11/2009 | Longe et al. |
| 2010/0036655 A1 | 2/2010 | Cecil et al. |
| 2010/0171700 A1 * | 7/2010 | Sharan et al. ............. 345/161 |
| 2013/0046544 A1 | 2/2013 | Kay et al. |

FOREIGN PATENT DOCUMENTS

| | | |
|---|---|---|
| JP | 2009-500954 A | 1/2009 |
| KR | 10-2007-0098904 | 10/2007 |
| KR | 10-2009-0052378 | 5/2009 |

* cited by examiner

MULTIMODAL TEXT INPUT SYSTEM, SUCH AS FOR USE WITH TOUCH SCREENS ON MOBILE PHONES

CROSS-REFERENCE TO RELATED APPLICATION(S)

This application is a U.S. National Phase of International Patent Application No. PCT/US2011/028387, filed Mar. 14, 2011, entitled Multimodal Text Input System, Such as for Use With Touch Screens on Mobile Phones, which claims priority to the following commonly assigned U.S. Patent Application Nos. 61/313,454, filed Mar. 12, 2010 and 61/313,864, filed Mar. 15, 2010, both entitled Method and Apparatus for Text Input; 61/313,423, filed Mar. 12, 2010, entitled Method and Apparatus for Secure Data Transmission; and, 61/316,799, filed Mar. 23, 2010, entitled Multimodal Text Input System, Such as for Use with Touch screens on Mobile Phones, each of which is incorporated by reference in its entirety.

This application is also related to commonly assigned U.S. Pat. No. 6,307,549, entitled "REDUCED KEYBOARD DISAMBIGUATION SYSTEM;" U.S. patent application Ser. No. 11/379,006/U.S. Patent Publication No. 2006/0274051 entitled "VIRTUAL KEYBOARD SYSTEMS WITH AUTOMATIC CORRECTION," filed Apr. 17, 2006; and U.S. patent application Ser. No. 11/379,006, entitled "DISAMBIGUATION OF ICONS AND OTHER MEDIA IN TEXT-BASED APPLICATIONS," filed Mar. 29, 2007, and 61/313,564, filed Mar. 12, 2010, all of which are incorporated by reference.

BACKGROUND

Users enter text into computers and other data processing systems using a variety of input devices, including many types of keyboards. Most standard keyboards are large so as to accommodate both hands of a typist, but this leads to a less portable device. Laptop computers have attempted to shrink the size of a keyboard, sometimes at the expense of typing efficiency for some users.

Certain mobile devices such as cell phones, smart phones and the like, require an even smaller keyboard to maintain the form factor common with such devices. Some phones include a small key pad with physical buttons to distinguish each key on the keyboard, with which a user may use her thumbs to actuate the buttons. Other devices use a touch screen that displays a similar sized keyboard. Both of these smaller keyboards are cramped and can provide for slower and/or error prone text entry.

Although touch screen devices have become increasingly popular, consumers continue to demand simpler ways to input text, such as for e-mail, text messaging, instant messaging, and other activities. These touch screen keyboards, however, may suffer from more problems than their small key pad counterparts. The soft keys on the touch screen of such keyboards provide less tactile feedback to a user, which can lead to input errors, as well as other problems.

DETAILED DESCRIPTION

Various examples of the disclosed technology will now be described. The following description provides specific details for a thorough understanding and enabling description of these examples. One skilled in the relevant art will understand, however, that the disclosed technology may be practiced without many of these details. Likewise, one skilled in the relevant art will also understand that the disclosed technology may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the disclosed technology. Indeed, certain terms may even be emphasized below; however, any terminology intended to be interpreted in any restricted manner will be overtly and specifically defined as such in this Detailed Description section.

I. Enterprise/Cloud Environment

As will be explained in further detail below, the technology described herein relates to systems and methods for increasing the speed and accuracy with which a user can enter text into devices and in particular into mobile devices. In accordance with one embodiment, upon entry of text by the user, data representative of such text entry is transmitted to a centralized location via the Internet, wireless communication system, or other appropriate data transmission method to a remote centralized server.

Figure 1:
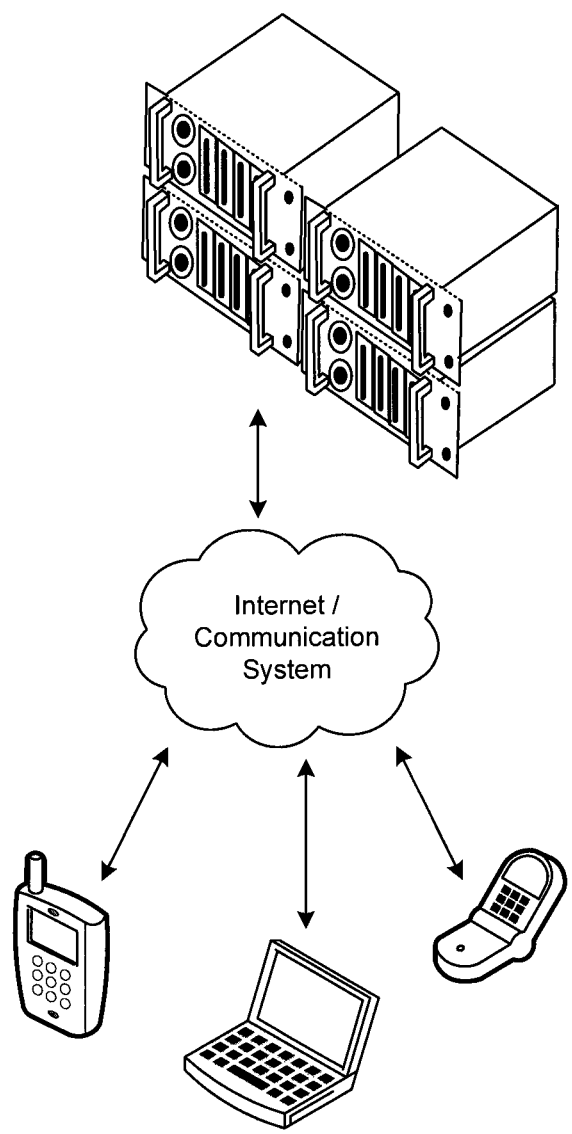
FIG. 1 is a graphical representation of a communication interface between one or more remotely located devices and a centralized enterprise server.

Referring first to FIG. 1, a first embodiment in accordance with the disclosed technology is shown. In FIG. 1, one or more remotely located devices are shown. The devices include cellular telephones, smart phones, netbooks or laptop computers or the like. Each of these devices is preferably provided with a communication system, such as a standard Internet connection or other proprietary wireless or wired communication system, as is well known to one of ordinary skill in the art. Thus, actions taken or data entered on one or more of the remote devices are communicated as appropriate to a centralized enterprise server. Such synchronizing communications may comprise for example, updating an enterprise email inbox or outbox when an email is sent or received. Traditionally, each of these remote devices performs all major functions on the device and synchronizes information with the enterprise server, such as with the user of email as noted above.

In accordance with one embodiment of the disclosed technology, certain functions previously limited to implementation on one or more of the remotely located devices are transferred to the enterprise server, thus providing a more similar user experience for all users of the enterprise system. In particular, when entering text into one or more of the remotely located devices, as noted above, typically all functionality regarding text correction and auto suggestion and auto fill of text entry words is performed in accordance with information retained on the remotely located device. There exists, therefore, a problem related to updating of data and the like used in such selection, and in particular with potentially frequently updated information on an enterprise wide basis such as email addresses. Thus, if an email address list is updated for a particular enterprise across an entire group of enterprise users, such update may not be transmitted to one or more of the remotely located devices. If the enterprise is sufficiently large, it may not be practicable to download an entire email list to such a remote device. Thus, the remote device may maintain a local cache with a limited number of text entries, typically such entries determined in accordance with a locally-maintained address list or the like. If an email address is not found for a particular indicated individual, the user may be provided with the option of searching for the email address on a remote server, but this process requires additional steps to be performed by a user. There is further no automatic integration of such a system into the user experience of the individual enterprise user. Additionally, such a system may not employ any error tolerant text entry as the user must complete the text entry before asking for access to information stored on the enterprise server. Thus, there has traditionally been no way for such a system to aid in text entry to determine user intent when a complete dictionary of word is not available to the remotely located device.

Therefore, in accordance with the disclosed technology, a method and apparatus are provided that employ error tolerant text entry techniques at the remote device level, while using such error tolerant text entry results to select suggested text entry information from a centralized database location.

For example, in one embodiment of the disclosed technology error tolerant text entry is provided to a user by providing the user with preferably nine, or other appropriate number of zones each comprising one or more keys. When a zone is selected, a predetermined number of keys comprising the zone are also selected. Innovative software is able to determine a desired selected word based upon the zone selection sequence, rather than needing each individual key to be selected. A more detailed description of one example of such a zone text entry method is described at U.S. patent application Ser. No. 12/500,675 filed Jul. 10, 2009 titled METHOD AND APPARATUS FOR TEXT ENTRY, the contents thereof being incorporated herein by reference.

In other embodiments of the disclosed technology, such zone key entry may be performed in the background without providing indications of such zones to a user. Thus, while a user may be encouraged to be as accurate as possible when typing, great accuracy is not necessary. Other error tolerant text entry systems, such as that described in co-assigned U.S. patent application Ser. No. 12/186,425 to Matthew Cecil, el al., filed Jun. 14, 2007 entitled "A PROBABILITY-BASED APPROACH TO RECOGNITION OF USER-ENTERED DATA", the entire contents thereof being incorporated herein by reference, may also be employed. In still further embodiments of the disclosed technology, more traditional text entry systems, and other known predictive text entry systems may be employed.

Further in accordance with aspects of the disclosed technology, in a particular embodiment of the disclosed technology, an error tolerant text entry system may be provided as described in U.S. patent application Ser. No. 12/500,675 referenced above. Thus, a described zone entry text system may be employed on the remotely located device, even without having the complete word dictionary located on such remotely located device. Such error tolerant text entry system may also maintain zone definitions in a manner not displayed to the user. Finally, other error tolerant text entry systems may also be employed in accordance with the present disclosed technology.

Figure 2:
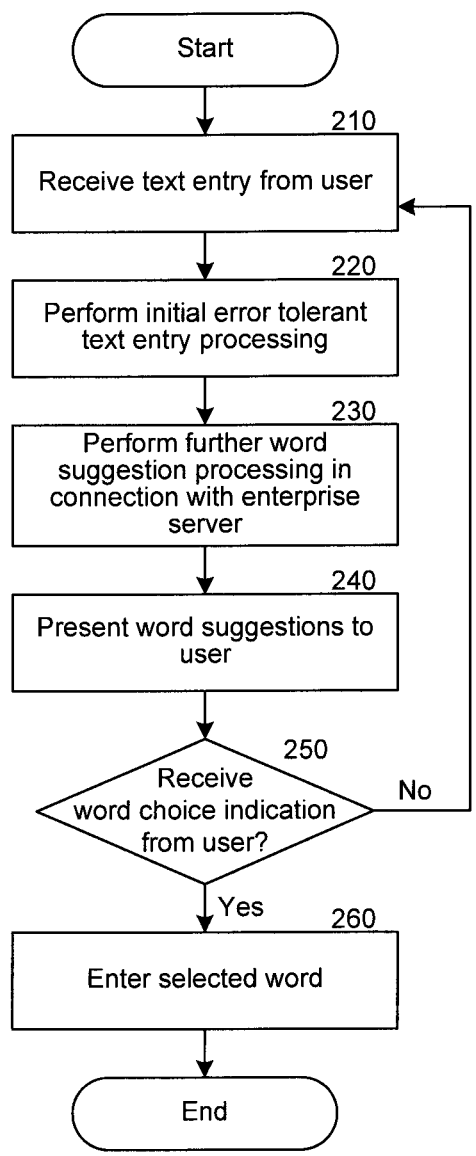
FIG. 2 is a flowchart of a process of creating a word choice in accordance with an embodiment of the disclosed technology.

Referring next to FIG. 2, a user first enters text in accordance with a provided text entry system accompanying a particular remotely located computing device at step 210. In a preferred embodiment of the present disclosed technology, as the user enters one or more keys through the user of the zone entry system of the Ser. No. 12/500,675 application, or any other error tolerant text entry system, an initial text input processing step is performed to begin to determine possible letter sequences that may be intended by the user. Thus, a dictionary search is not performed at this time, but rather locally on the remotely located computing device, information related to the text entry is determined to be used at a later time in a dictionary search.

Thereafter, at step 230, one or more a dictionary search or other database search is performed by transmitting the predictive text entry information to the enterprise server. Importantly, it is not merely text keys entered that are transmitted, but rather such data as has been determined in accordance with the initial error tolerant text entry processing is transmitted. In accordance with the preferred embodiment of the disclosed technology, for each key that is input by a user, all other keys defined to be in the zone with the selected key, whether these zones are fixed or dynamic, available to the user or not, are transmitted to the enterprise server for further processing in accordance with the disclosed technology. In such a manner, the received predictive text entry information entered in any of the one or remote devices can be applied to any number of consistently maintained enterprise wide databases.

Figure 3:
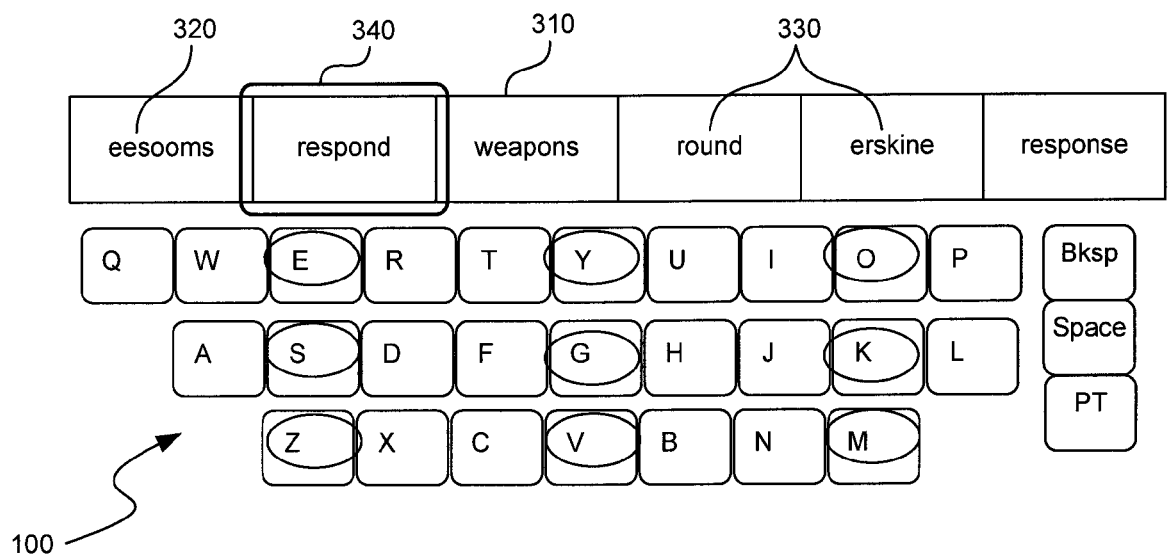
FIG. 3 depicts a keyboard including various suggested word choices in accordance with an embodiment of the disclosed technology.

FIG. 3 shows a keyboard 100 in which the keys are divided to be in a number of zone. Thus, in accordance with the disclosed technology described in the error tolerant text entry system of the Ser. No. 12/500,675 application, each time one or more keys indicating a particular zone is selected from the keyboard 100, all of the keys in the zone represented by the selected key are passed to the predictive text algorithm. In one embodiment, candidate words represented by the keys selected in each zone are determined locally and transmitted to the enterprise server. In another embodiment, a list of the zones selected by the user is send to the enterprise server to determine a list of possible candidate words. The list of possible words is analyzed by the enterprise server to determine one or more suggestions of potential word selections to the user that are then displayed on a screen of the remotely located device, such as is shown in FIG. 3 at 310. These word suggestions 330 are based upon the entered key sequence, taking into account all of the keys at each entry associated with the zone of the selected key. At 320, the sequence of keys selected by a user is shown. Word choice 340 depicts the most likely, or most common, word determined to be intended by the user as determined from one or more applicable databases located on the enterprise server. Upon determination of these word suggestions by the enterprise server, they are transmitted back to the remotely located device and displayed to the user as shown in FIG. 3 for selection by the user at step 240 of FIG. 2.

Selecting a suggested word replaces the entered word with the selected suggestion at step 250. If none of the words are selected, processing passes back to step 210 in FIG. 2 where further text entry is received from a user. Upon such additional text entry, the steps noted above are preformed again, thus providing potentially different words for user selection, or narrowing choices down for a user. Upon selection of one of the presented words by the user, such selected word is input to the remotely located computing device, and processing ends until the entry of another text sequence by the user.

In an alternative embodiment of the disclosed technology, in order to speed processing at the remote device, based upon a determined size of a particular dictionary, it may prove beneficial to download a dictionary to the remote device prior to the beginning of text entry by the user. Thus, in a case where entries into a particular field in a form or the like are limited to a small number of possible entries, downloading such a dictionary upon entry of the field by the user may allow for only a single data transfer to be employed. Similarly, if a user is visiting a form or the like with a number of fields, dictionaries for each of the fields in a particular form may be downloaded in advance, or upon entry of a first field of the form. Of course, if any particular field were found to have a very large dictionary, access to this dictionary on the enterprise server may be provided as noted above.

The user can train the system to add words to its dictionary or the system can be set to add words automatically after a preset number of times that the word has been entered. Thus, in accordance with the disclosed technology, not only can a dictionary be modified on an enterprise wide platform, entry of text by a particular user employing a remotely located computing device may result in the addition of such a text entry to a database or dictionary for subsequent use by any enterprise user. Of course, local databases may also be maintained for text entries that need not be made available to the enterprise as a whole.

An exemplary predictive text algorithm is depicted in U.S. patent application Ser. No. 12/186,425 referenced above. Such an algorithm utilized in accordance with the present disclosed technology addresses the predictive text requirements of the disclosed technology. A user interface provided to a user on one or more of the remotely located computing devices will provide a character (or string of characters associated with one or more selected zones) to an algorithm at an enterprise location, and the algorithm will interpret that set of characters and return a result from the enterprise server to a user interface at the remotely located computing device in the form of one or more suggested word selections. Alternatively the enterprise server may return an indication of an inability to properly parse out a word selection, thereby indicating that the user has not yet entered enough letters as of yet.

In one embodiment, user context, history or the like, in accordance with the particular individual user, or in accordance with the collective experience of the full set of enterprise users may be employed to aid in such suggested word selection. Additionally, while the described predictive text algorithm may be employed, the present disclosed technology may be used with any appropriate text parsing or predictive text algorithm.

Using a matrix of probabilities the predictive text algorithm knows that for each character pressed, the user could have meant characters to the left, right, above or below, or the other characters in the zone indicated in as described above. Once the algorithm knows which characters are probable (based upon the keys associated with a selected key, the algorithm then runs a search against a dictionary preferably provided at an enterprise server location as accessible to a plurality of enterprise users, as is more completely described in the '425 application referenced above. Any words that match the string of probable characters are designated and then preferably scored based on distance between characters, frequency, probability, and any number of other characteristics that may be indicative of a user intention.

The system may also adopt over time to give a higher probability of selection to frequently used patterns of a particular user, or to particular groups of users in an enterprise setting. Thus, the prediction mechanism may be personalized for a particular user, even if that user is selecting words from a common centralized enterprise dictionary or database. Such personalization may comprise providing selections based upon a frequency of selection of words by a particular user during a predetermined preceding time period. Thus, the more a user uses a particular word, the more likely it may be to be selected again, and the more likely it will be suggested to the user. This personalization may be particularly useful in such a situation as when a user is entering an email address from a centralized, enterprise wide email list. As a particular user sends email to one or more particular recipients, the names of these recipients are more likely to be entered by the user in the future. Furthermore, such personalization need not be limited to a single person. Rather, entry of particular email addresses may be accumulated for a group of people or the like, thus allowing for a department or the like to generate a preferred list of email addresses. This selection may also be applied to standard words or other sequences that may be selected in accordance with a text entry system. Such personalization may provide a weighted selection system in which the words or email addresses that are selected most recently or frequently are provided first to a user followed by words selected at an earlier time, or less frequently.

In another embodiment, the personalization of a user dictionary is not limited to words commonly or recently selected by a user. The dictionary may also be customized based on recent behavior of the user. If a user is searching the internet for web pages devoted to particular topic, words from those web pages can be classified and added to the dictionary as more likely choices. For example, if a user is viewing web pages on their remote device associated with food and cooking, then when the user enters the keys "d i s e r t" the word search algorithm uses the recent history to suggest the word "dessert" before the word "desert." Similarly, temporal and geographical considerations can be used by the text selection algorithm. For example, the GPS location of the remote device can be detected and sent to the enterprise server. If is known that a user is located in the mountains, then the text prediction algorithm is trained to suggest that a text entry of "how is the snor?" should be "How is the snow?" as opposed to "How is the show?"

In this embodiment, information about the recent browsing history, current location, e-mails read, GPS location etc. is send to the enterprise server and maintained in a file associated with user in order to customize a dictionary or to aid in selecting likely words for the user based on their recent behavior.

A can be seen in FIG. 3, a displayed keyboard represents a full QWERTY keyboard, but may comprise any other desired configuration. Such keyboard may comprise a virtual keyboard, or a physical keyboard including hard keys associated with one or more letters to be provided for text entry. While the disclosed technology has been described as generally making reference to such a keyboard, any number of input devices, mechanisms, or schemes may be employed. The disclosed technology is similarly applicable to text input on a traditional mobile phone with 9 or 12 key number pad or 4-way directional key. The disclosed technology may be applicable to use of a scroll type wheel, such as that provided on an Apple Ipod® device. In such a situation, it may be beneficial to define zones in a circular configuration so that movement along the scroll wheel results in movement along a circle of zone selection.

The disclosed technology may also be applied to a mobile or other device using a scrolling device, or otherwise comprising only one or two directional indication keys. With a scrolling device or one or two direction keys, the predefined zones are preferably provided with a predefined sequence, such as perhaps left to right, then top to bottom, so that upon scrolling or utilizing a directional key, a user is forwarded through each of the predefined zones, highlighting or otherwise indicating the presently selected zone. Pressing in the scrolling device, or other method of selection allows a user to choose the zone, and then scrolling is employed to move to a next zone for selection.

The disclosed technology may further be applied to a projected keyboard where various sensing mechanisms determine where a user touches a projected keyboard. As the accuracy of such sensing is likely difficult to determine, allowing a user to select from a smaller number of larger zones would be quite beneficial.

II. Microgesture Input

In accordance with another aspect of the disclosed technology, a rapid text entry system and method are provided that leverage error tolerant predictive text algorithms. A user can employ his familiarity with QWERTY keyboard (or other common keyboard layouts) and enter shorter microgestures of two or three letters that comprise less than an entire word. Shorter words can be entered with one such microgesture, while longer words may use two or more microgestures. Thus, the text entry system described below overcomes at least one major drawback of prior systems namely, the requirement that the user enter the entire intended word entry without lifting his finger and thus provide a single trace for an entire intended word.

In accordance with one embodiment, a text entry system notes a starting and ending location for each microgesture. Furthermore, if a bend is detected in the microgesture entered by the user, it is determined that a third, middle letter was intended. A number of different methods may be used to determine the intended middle letter. First, a location of the bend in the microgesture may be determined. Second, a direction moved from the starting position may be provided to a text parsing algorithm to help select among a number of possible next letter text entries, given the start and endpoint inputs. Alternatively, a recognition of the existence of such a bend may be determined, thus indicating that a middle letter was intended. The text parsing algorithm may then assist in determining such letter without any additional help, as if it had encountered a missing letter in a more traditional text entry system.

Once a first microgesture is determined, the selected letters are input to a text selection algorithm, and word suggestions and the like are provided to a user in a more traditional format. If no word is selected, a next tap of a key, or a next microgesture is determined to be part of text entry for a same, longer word.

In one embodiment, users slide their fingers between a number of characters on the keyboard instead of lifting and pressing each intended letter to be entered. It has been determined that some users prefer such sliding to neighboring characters instead of tapping each character individually, because it is more convenient and reduces the potential for text entry error as compared to a traditional tap entry system where the user may tap the wrong key if required lift their finger and press each key in succession. Further, the user is able to avoid any type of repetitive stress issues, and may be able to enter text more quickly.

When using smaller, typically mobile, touch screen devices users have been found to generally type using one or two fingers instead of all fingers as they would on a more traditional regular laptop/PC keyboard. The use of only one/two fingers can result in finger fatigue and discourage users from typing on a touch screen device. The required act of lifting and placing the finger for each letter to be entered is often associated with repetitive stress injuries such as carpal tunnel syndrome and the like. In accordance with an embodiment of the disclosed technology, a user has the option to either slide their fingers to enter a few letters, or tap the entry of a particular letter as desired. Thus, rather than requiring tapping as in traditional text entry systems, or tracing the letters for an entire word as noted in the prior art patents listed above, the user has the option and flexibility of entering text as he or she prefers. Such preferences may be based upon particular input device, particular word being entered, etc. Ultimately, users are provided with a most flexible option and can choose to enter with microgestures, tapping, or a combination of both based on convenience.

Microgestures allow users to select 2 or 3 characters at a time with a single microgesture. One further benefit of such microgestures is that users do not have to mentally or physically trace a complete path for a word before the predictive text algorithm begins suggesting corresponding words. Tracing a path for longer words can be confusing and difficult. Users tend to forget which characters of a word they have already entered and tend to misspell. Tracing paths for long words may also result in mental and/or physical fatigue. Further, because an apparatus receiving a path tracing an entire word must wait for completion of that word before processing the input data, it is not possible to provide automatic completion of such text entry, or suggestion of possible intended word entries. Thus, the user must complete tracing of the entire word, and only then can the system provide word suggestions.

The microgesture input system of the disclosed technology is also useful to input text or words in languages whose alphabets do not fit onto a single keyboard and therefore require getting letters/characters from alternative/function/shift keyboards.

At the completion of each microgesture, however, the system in accordance with one embodiment of the disclosed technology is able to auto-complete an input. The ability to use such an auto-complete enables the user to enter only a partial word and choose from the suggestions provided. This enhances the user experience, helps in faster text entry, and even further improves over prior art systems requiring tracing of an entire word because a user will often be able to select a desired input word after simply entering a first microgesture. In this manner, the predictive text algorithm in accordance with the disclosed technology supports error tolerant input for gliding or tapping. The user can be sloppy in entering text and need not provide the exact character input to get the desired word. In effect, letters that are selected in a microgesture entry are considered by a text parsing algorithm as if they had been tapped in a traditional text entry system. Thus, existing text parsing algorithms can be leveraged, and a far simpler and flexible system is provided to a user. Thus, missing and/or incorrect letters can be received and the system is still able to determine correct and intended text entry by a user.

Figure 4:
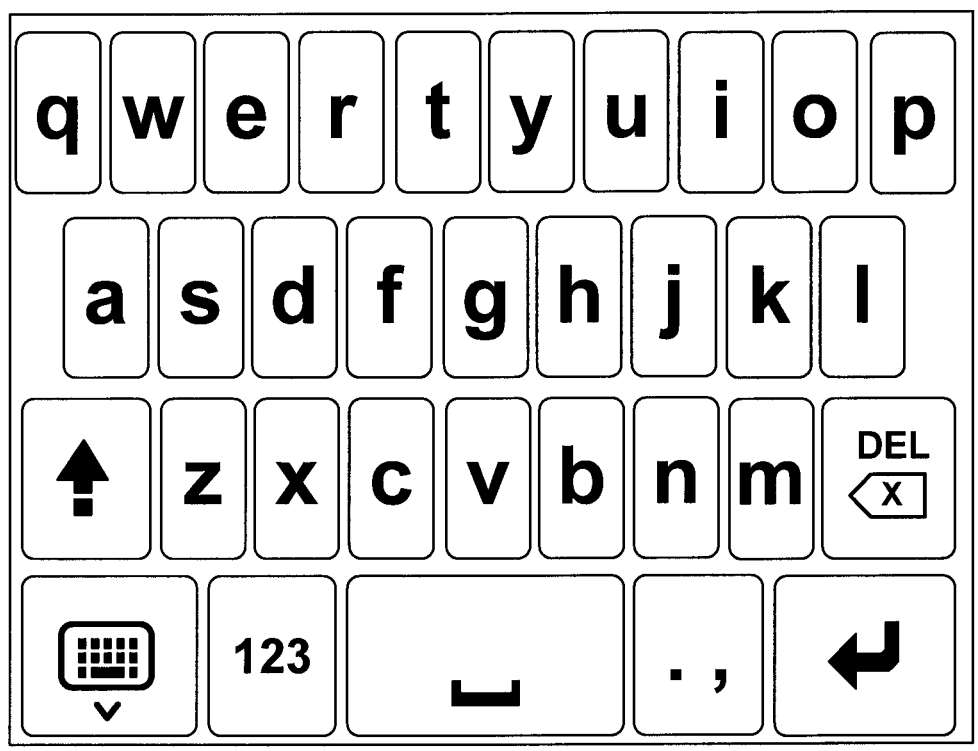
FIG. 4 illustrate a method of entering text in accordance with an embodiment of the disclosed technology.

Selecting letters for text entry through the use of gliding allows users to trace the path for fewer than all the characters of a word as shown by the example in FIG. 4. In accordance with this example, it is assumed that a user is interested in entering the word INPUT. Traditionally, the user would tap each of the five keys. If they hit all of the five keys, the word INPUT would be presented to the user.

However, in accordance with an embodiment of the disclosed technology, a user need not tap each of the five letters, and indeed may employ one or more microgesture glides to enter the desired letters. There are a number of different sequences for entering the word INPUT in accordance with the disclosed technology.

As shown in FIG. 4, the user can glide their finger(s) over the letters "i-n-p" and tap the letters "u", "t". As is shown in the above figure, the user begins their microgesture glide at "i", then glides to "n" and finishes the microgesture glide at "p". Thereafter the letters "u" and "t" are tapped to input the full word. The following alternative input sequences would also result in the word INPUT being recognized by the text prediction algorithm:

Glide "i-n-p" and glide "u-t"
Tap "i", "n" and glide "p-u-t"
Tap "i", "n", "p" and glide "u-t"

In order to further ease a user experience any glide or tap entered by the user may be maintained on the display for a period of time to provide sufficient feedback to the user to determine what was entered. As noted above, however, such maintenance of glide entry is useful only for the user and preferably may not play a role in determining user input (Of course, it would be possible to use such glide location to determine text input in an alternative embodiment of the disclosed technology.) Thus, while the trace shown in FIG. 4 shows the path that a user may observe on the device, internally the text prediction algorithm in accordance with the disclosed technology is preferably different, only keeping track of the initial and last character of a glide entered by the user. A middle character, if any, is deciphered using vectors associated with movement directions between the first and last letters of the glide, or less preferably, using an approximate location of a bend in the glide entered by the user. Therefore, in accordance with the disclosed technology, the inventive algorithm tries to find words from a database by using the first and last character input with a particular first glide and a middle character, if any. Based upon a determination of a bend in the glide, or use of a wildcard character assuming a three letter glider, the text prediction algorithm returns results. Further calculations may then be performed to filter words where the middle character does not meet the vector direction as drawn by the user.

The following example further depicts the use of such glide and vector algorithms. If the user traces a path "t-h-e, "h" is lower and to the right of "t". An initial pass through the algorithm will return words like "tie", "toe" and "the". Upon viewing of a vector of movement after entering the first letter "t", it can be determined that the user moved down towards the letter "h". Because both the letters "o" and "i" are to the right of the letter "t", they will be discarded (or provided as lower valued selections to the user) as there is a closer option that the algorithm will find. The letter "h" from the potential suggestion choice "the" more closely meets the vector proximity of the input and hence will preferably be chosen as the middle character. Furthermore, error tolerant text entry may be provided, and thus, the user could trace "r-j-w" and still get "the" as a suggested word. The letter "j" is located downward and to the right of the letter "r" and the letter "h" is located downward and to the right of the letter "t". Since both vectors are in close proximity, the letter "h" will be chosen as the middle character.

An explanation of vector direction will now be described, and is more completely described in U.S. patent application Ser. No. 12/091,700 to Sharan et al., filed Jun. 14, 2007, entitled "DATA ENTRY SYSTEM AND METHOD OF ENTERING DATA", the entire contents of which is herein incorporated by reference. The disclosed technology advantageously encodes the user inputs with regard to the translational movements i.e. the directions of one key relative to another when actuated sequentially by the user.

The translational movements are preferably coded within a set of predetermined primary directions, these being a reduced set of all possible directions which can be taken between two consecutive key actuations. One example of the reduced set would be the four directions: "up", "down", "left" and "right". Thus, rather than registering each translational movement according to the actual direction taken, the system preferably assigns one of the reduced sets. For example, if the actual direction of movement between two actuations is 10° off vertical, the transitional movement would be assigned, for example to "up", this being the closest of the primary to a real 10° heading.

Reducing possible directions from an infinite number to a small number, such that all translational directions are categorized within a reduced group, e.g. to "up", "down", "left" and "right", means that many disparate translational directions will be assigned the same primary direction. For example, all movements with a bearing up to ±44° with respect to a direction straight up could be assigned the same primary direction "up". Moreover, this will include translational movements with the same actual bearing, but with completely different starting points, such that the same vertical movement occurring at many different points on the keyboard could all be represented simply by "up".

An exemplary predictive text algorithm for use in accordance with the microgesture text entry system of the present disclosed technology is described in U.S. patent application Ser. No. 12/186,425 referenced above. Such an algorithm utilized in accordance with the present disclosed technology addresses the predictive text requirements of the disclosed technology. The user interface will pass the algorithm a character (or string of characters associated with a particular jumper point and zone) and the algorithm will interpret that character (or characters) and return a result to the user interface in the form of one or more suggested word selections, or may return an indication of an inability to properly parse out a word selection thereby indicating that the user has not yet entered enough letters as of yet. Of course, user context, history or the like may be employed to aid in such suggested word selection. Additionally, while the described predictive text algorithm may be employed, the present disclosed technology may be used with any appropriate text parsing or predictive text algorithm. As long as jump points can be associated with a number of different inputs, and these inputs can be differentiated from each other and used to select an intended input by a user, the disclosed technology may be employed.

Thus, using a matrix of probabilities the algorithm knows that for each character pressed the user could have meant characters to the left, right, above or below, or the other characters in the zone indicated in accordance with the disclosed technology as described above. Once the algorithm knows which characters are probable (based upon the keys associated with a selected jumper point, or alternatively, a dynamic or other determination of user intention, i.e. which letters it is likely the user intended, even if a predefined zone is not provided, the algorithm then runs a search against a dictionary, as is more completely described in the '425 application referenced above. Any words that match the string of probable characters are designated and then preferably scored based on distance between characters, frequency, probability, and any number of other characteristics that may be indicative of a user intention. The system can also adopt over time to give a higher probability of selection to frequently used patterns of a particular user. Thus, the prediction mechanism may be personalized for a particular user.

In order to additionally aid in determining user intention, in accordance with the disclosed technology the predictive algorithm of the proposed system may, in addition to relying upon a traditional dictionary, attempt to further determine user intention by determining the context of a particular text input, such as determining whether the input is for an email, chat, search, or the like, or whether the text input is taking place during a particular television show, or while a music application is playing a song. To the extent a user is likely to use different words and/or other language differences, such context determination may aid in the accuracy of the predictive text algorithm. The algorithm may also receive information about information from stored content, the content of one or more databases, such as a user's contact list or the like, to improve the reliability of the prediction. Such context may be stored within a device being used for text entry, or may be stored remotely in a database accessible over the Internet, or other available network. The list of words is then sorted based on that score and returned to the user interface. Thus, the disclosed technology uses the redundancy in the input language or the possible input functionalities to map approximate input into non-ambiguous input per the user intention. Additionally, device features and functionality may be considered when determining user input, thus perhaps taking into account device limitations when determining such input.

While the present disclosed technology has been described in one embodiment employing the predictive text algorithm of the '425 application, it is possible to use other text parsing algorithms. One such alternative text entry system is described in U.S. patent application Ser. No. 12/500,676 to Sharan et al., filed Jul. 10, 2009, entitled "METHOD AND APPARATUS FOR TEXT INPUT", the entire contents of which is herein incorporated by reference. The '676 application describes a system and method for dividing the keyboard into a plurality of zones, and then considering any text entry in a particular zone to be a selection of all of the letters in the zone. Thus, the user is able to be less precise when entering text. This system may be used in conjunction with the microgesture entry method described above, and thus, each determined starting point, ending point, and any vector directions or bend determination need only indicated zones that include the intended letter, thus further easing the difficulty of text entry for a user.

Additionally, while the disclosed technology has been described for a user making contact with a displayed or touch screen keyboard, it would be equally applicable to a keyboard that did not require contact, but might allow for text entry upon a user drawing a finger or the like in proximity to a particular key or the like. A microgesture may comprise the finger moving above the keyboard to a final key, which might be considered entered when the user removes the finger. Thus, processing may proceed in accordance with the systems and methods described above, but relying on proximity detection rather than contact for key selection and entry.

While a primary use for the method and system of the disclosed technology may be for small mobile devices or other small electronic devices such as cameras, personal assistants, netbooks and the like, such input system may be equally applicable for entry on, for example, set top boxes or television using a remote control, or other input device, such as a Wii® controller or the like. Thus, a user may begin entry by pointing to a key (or zone), depressing a selection button, holding down the button while the user moves an indicator through a second letter (if desired) to a third and final letter of the microgesture, indicated by release of the selection button. A more complete description of entry employing the zone input system and such a remote control in the '676 application, previously incorporated herein by reference. Indeed, it is contemplated that the present disclosed technology may be applicable to any input scheme or technology noted in the '676 application, including but not limited to remote control, Wii® remote, hand gestures, or other entry technique.

III. Suitable User Interface

Figure 5A:
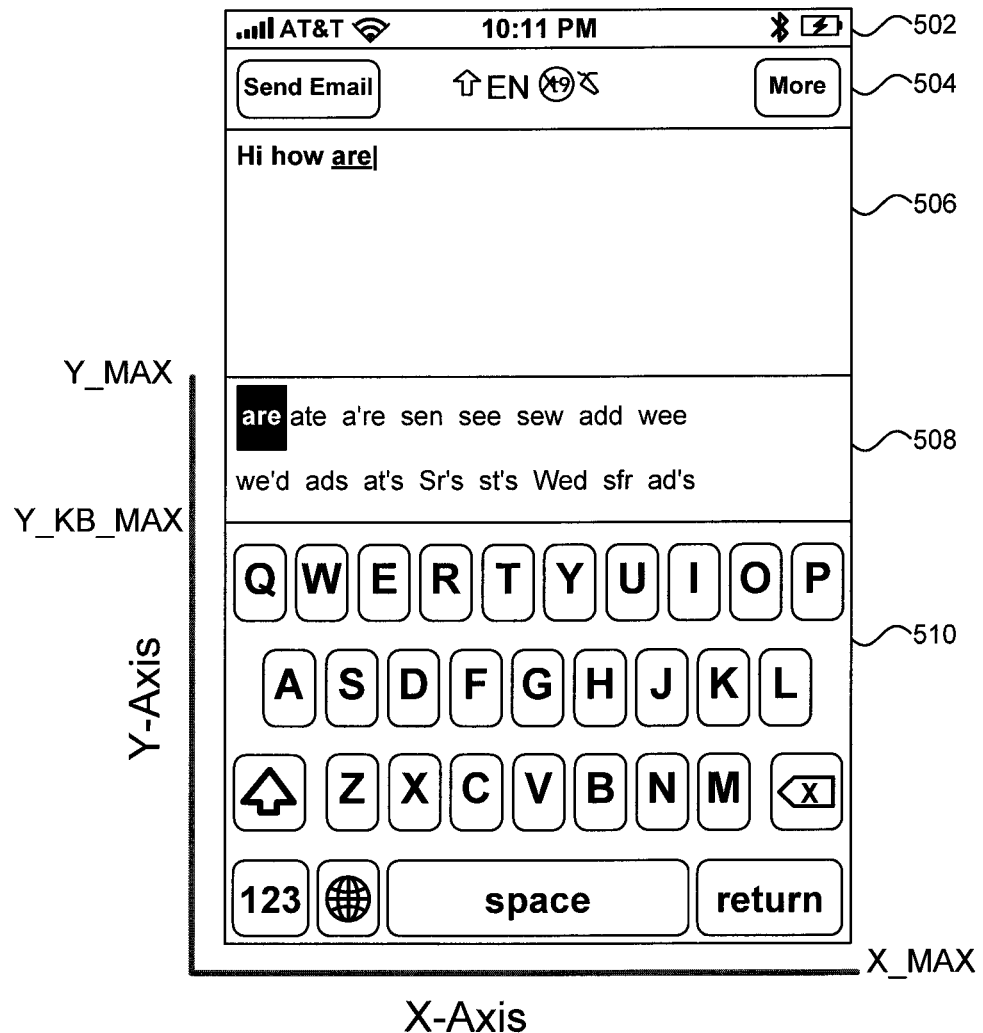
FIGS. 5A through 5I are screen shots illustrating user interface methods for inputting text under various implementations of the disclosed technology.

FIG. 5A illustrates a user interface suitable for receiving multi-modal user inputs (e.g., a mixture of taps, traces, hovers, other tactile inputs and/or non-tactile inputs) and outputting words. The user interface described herein may form part of any system where it is desirable to convert user input into words, including, but not limited to, mobile phones, personal digital assistants, portable audio systems, laptop computers (including ultra-mobile personal computers), desktop computers, other computing systems, video game systems, televisions, and myriad other consumer and commercial electronic systems or appliances (including, e.g. refrigerators, kiosks, etc.)

The user interface comprises a touch screen or similar display that facilitates both tactile input from a user (e.g., by fingertip or by stylus) and visual output. As indicated by the illustrative axes, each point on the display may be described by a unique X-Y coordinate. Additionally, although not shown in FIG. 5A, the user interface may receive other inputs, including inputs from a system accelerometer and/or pressure sensors in the touch screen, audio inputs, visual inputs, etc.

Additionally, the user interface may produce other outputs, including other visual outputs, audio outputs, haptic outputs, etc.

The sample display shown in FIG. 5A (and other depicted displays) is for a wireless mobile device, and includes an upper horizontal portion 502 that provides certain system information, such as signal strength, wireless carrier name, time, battery strength, etc. Below the upper horizontal portion 502 is an application bar 504 that includes some information and input buttons for an application, which in the depicted displays is an email application. A text display portion or output area 506 displays text input by the user, which for example, may be associated with an application program. A word suggestion portion or word choice area 508 (described below) displays suggested words to the user based on user input.

The user interface display includes at the bottom a virtual soft-key keyboard area 510 that is configured to display a virtual keyboard and receive tactile user input that indicates character selection from that virtual keyboard. As shown, a virtual keyboard has multiple defined areas arranged in a particular layout on the display. Each defined area circumscribes a key. Except for special function keys, each key in the virtual keyboard is associated with one or more characters, as described in greater detail herein. As used herein, the term "characters" may include alphabetic letters (with or without diacritic markers such as accents), digits, characters or symbols that represent a phonetic or sub-word component, including Japanese kana, Korean jamos, and Chinese zhuyin, or another linguistic and non-linguistic characters such as digits, and punctuation that are contained in abbreviations, chat slang, emoticons, user IDs or URLs. Special function keys in a virtual keyboard are associated with the performance of special functions related to the input of textual information (e.g., capitalization of a letter, deletion of characters). Special function keys may include, but are not limited to, a shift key, delete key, numerical input key (e.g., to select a keyboard layout suitable for faster entry of numerical and symbolic characters), a multi-keyboard selection key (e.g., to select a different keyboard layout and/or virtual keyboard that supports a different character set), a return key, and a space key.

A user may provide different types of tactile input to the virtual keyboard area 510, as described in greater detail herein, in order to indicate his selection of a sequence of characters. The user may intend for a set of his tactile inputs to collectively result in the formation of a particular intended word in the output area 506 shown in the user interface display (or at another output), For clarity, unless the context clearly requires otherwise, the term "word" as used herein denotes any type of linguistic object, including, but not limited to, a string of characters, word stem, prefix, suffix, phrase, sentence, abbreviation, chat slang, emoticon, user ID, URL or ideographic character sequence, emoticons or icons.

Without system intervention, a user's raw tactile input to a virtual keyboard might result in an unintended word being added to the output area that is different than his intended word, if for example, the (1) user is sloppy or inaccurate with his tactile inputs, (2) the user misspells the word, (3) multiple keystrokes are required in order to select a particular character (e.g., if a diacritical marker is needed, or if the virtual keyboard has a half-QWERTY or 12-key layout, such as the one shown in FIG. 1H), (4) the intended word is particularly long, and/or (5) other reasons. Any of these factors may delay the user's entry of the intended word.

Thus, to facilitate an improved user experience, the disclosed user interface may provide user input received from the virtual keyboard area 510 (and other areas of the touch-sensitive display and/or other inputs) to a disambiguation system or module such as the disambiguation module disclosed herein. The disambiguation module resolves the received user input to generate a suggested list of word choices (a "word choice list") that may be rank-ordered or otherwise organized in a logical fashion. The user interface may then display a subset of the word choice list generated by the disambiguation module in the word choice list area 508 (e.g., in an ordered or grouped fashion). Within the word choice list area, one or more default words may be highlighted (e.g., "are" as shown in FIG. 5A) and/or displayed in the output area. The user may select a word displayed in the word choice area to indicate his intended word (e.g., by providing tactile input within the word choice list area; by depressing a point on the display at or near a special key, such as the space bar; or by providing other input indicative of selection). The user may alternatively review additional results from the word choice list in the word choice list area (e.g., by scrolling or swiping within the word choice area) before selecting a word. After a user indicates his selection from the word choice list, the user interface may then add the selected word to the output area 506 (or otherwise output the selected word).

Although the user interface display is described herein primarily as a touch-sensitive touch screen, one having skill in the art will appreciate that the user interface and disambiguation systems and methods described herein may be implemented instead using laser projection keyboards, muscle sensing keyboards, fabric keyboards, motion-sensitive video systems (such as the Nintendo Wii®), virtual reality systems, etc. since these systems are capable of displaying a virtual keyboard and translating user actions into positional information within the displayed keyboard that is analogous to the tactile input of a touch screen.

Modes of User Input

FIGS. 5B-G illustrate various types of user inputs that may be received by the suitable user interface shown in FIG. 5A and analyzed by a disambiguation module to produce a word choice list that is displayed within the user interface. For simplicity, tactile user inputs to a touch screen display are described herein in conjunction with a user's depressing the display with a fingertip. However, one having skill in the art will appreciate that the user may depress a touch screen by any suitable means, e.g., a finger, a stylus, or any other suitable input tool.

Tap Inputs

Figure 5B:
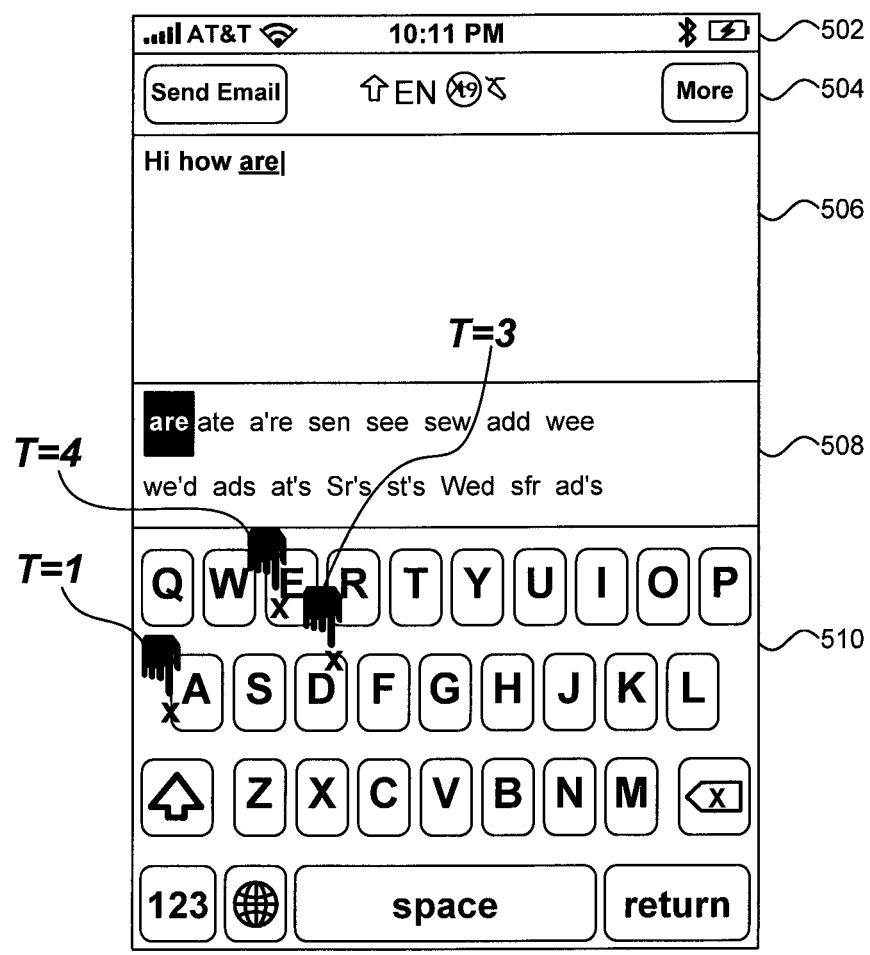

FIG. 5B illustrates how the user interface may receive a series of taps and output a word choice list in response. A tap consists of a user briefly depressing the touch screen at a localized point before lifting his finger. In the example of FIG. 5B, the user interface may receive a series of three taps (at time (T)=1 near the "A" key, at T=3 on the "D" key, and at T=4, on the "E" key.). In this example, using these three tap features, the disambiguation module produces a word choice list, including the default choice "are." This default choice illustrates how a disambiguation module may correct apparent user errors, since in the English language it is more like a user would intend to create the word "are" instead of the word "ade."

Trace Inputs

Figure 5C:
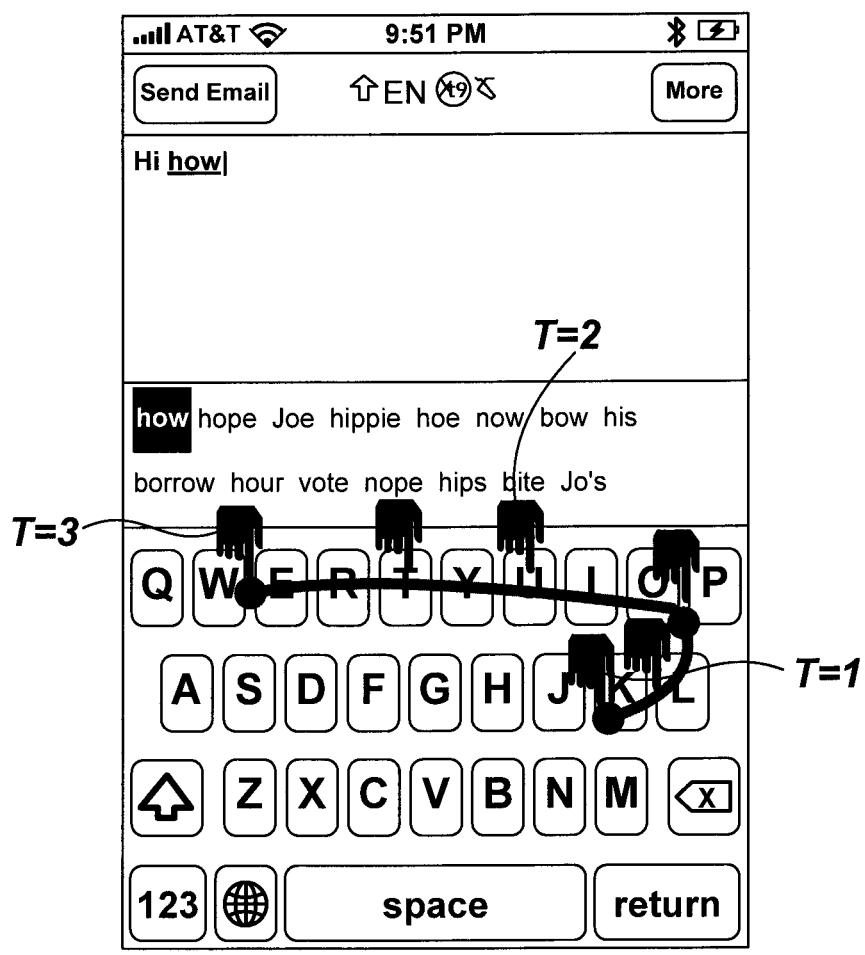

FIG. 5C illustrates how the user interface may receive a trace input from a user and output a word choice list in response. To input a trace, a user depresses or places his finger on a point on the touch screen display, and while continually depressing the display, he traces a line within the display with his finger before eventually lifting his finger from the screen. As will be described in greater detail herein, a trace input may be further broken into at least two different types of discrete features: corners and segments. As described in greater detail herein, a "corner feature" results upon the occurrence of different types of events during a trace, including, but not limited to a user: (1) initially depressing the screen at the beginning of a trace, (2) lifting a finger off the screen at the end of the trace, and/or (3) abruptly changing direction during the trace. Each pair of corners then demarcates a segment feature that runs along the user's trace path between the two corners.

In the example shown in FIG. 5C, the user inputs a trace starting at T=1 by depressing his finger on the screen near the "K" key in the keyboard area 510, tracing his finger upward to a point near the "P" and "O" keys, abruptly changing his direction near that point by moving across the top row of the virtual keyboard, and finally, at time T=3, lifting his finger from the screen at a point near the "W" key. As shown by the three dots, this single continuous trace may be broken into three distinct corner features (corner 1, corner 2, corner 3) and two segment features (segment 1 extending between corners 1 and 2, and segment 2 between corners 2 and 3). As shown in FIG. 5C, using the five extracted input features (three corners and 2 segments), a disambiguation module may produce a word choice list, including the default word "how," that is displayed to the user via the user interface.

Hover

Figure 5D:
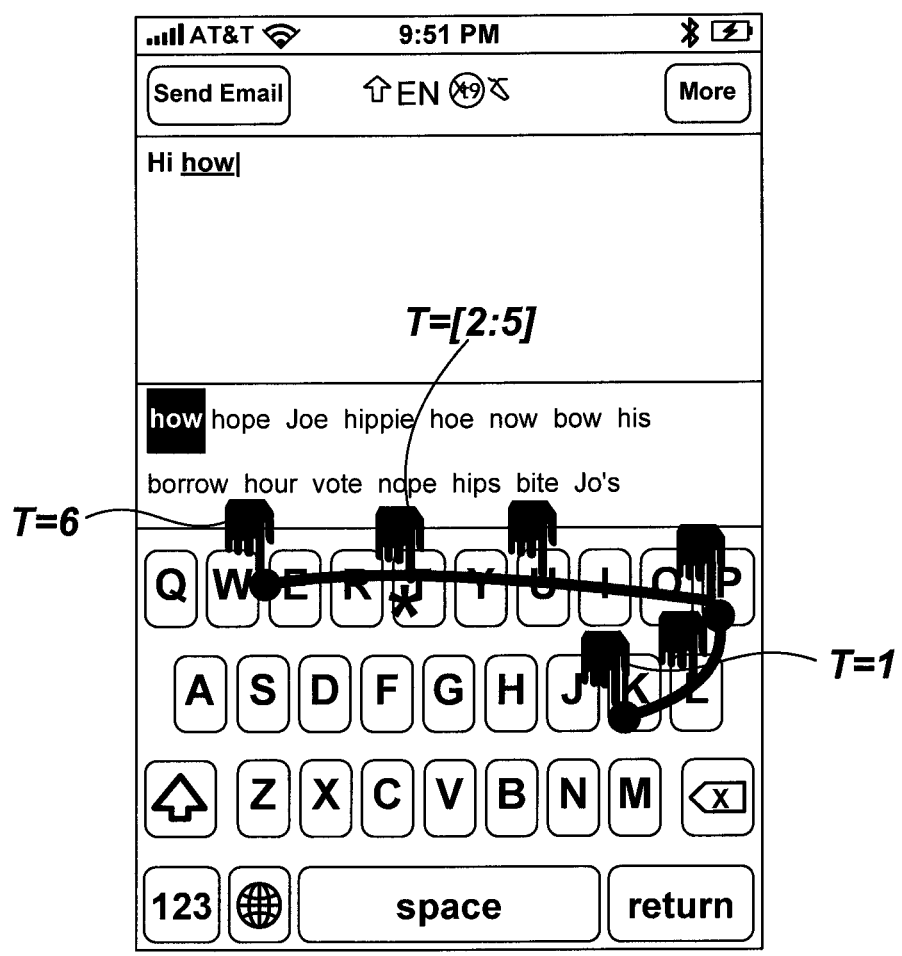

FIG. 5D illustrates how the user interface may receive a hover input feature from a user. A hover feature comprises any user input where the user gives special emphasis to a point within the display in a specified manner, which may include pausing a finger near a point, wiggling, encircling or scribbling a finger around a point, decelerating near a point during a trace, providing additional pressure at a point (e.g., as detected by a pressure-sensitive touch screen display), providing a second tap with another finger simultaneously during a trace, etc. For example, as shown in FIG. 5D, during the trace described previously with respect to FIG. 5C, a user may input a hover feature at a point near the "T" key by lingering there during the time window T=[2:5]. Although FIG. 5D shows a hover feature occurring in conjunction with a trace feature, a hover feature may occur in other instances (e.g., in conjunction with a tap feature, e.g. if a tap depression extends beyond a threshold duration).

Multi-Modal Inputs: Multiple Tactile Features

The user interface described herein permits a user to input different types of input features in any order (e.g., to input a trace followed by two taps, followed by three traces, etc.). Furthermore, the user interface permits a user to pause after inputting a first feature (e.g., a trace), and then resume his input (e.g., to input a second trace or to input a tap). After a pause, a disambiguation module may utilize both the input features detected before the pause and after the pause in order to generate a word choice list.

Figure 5E:
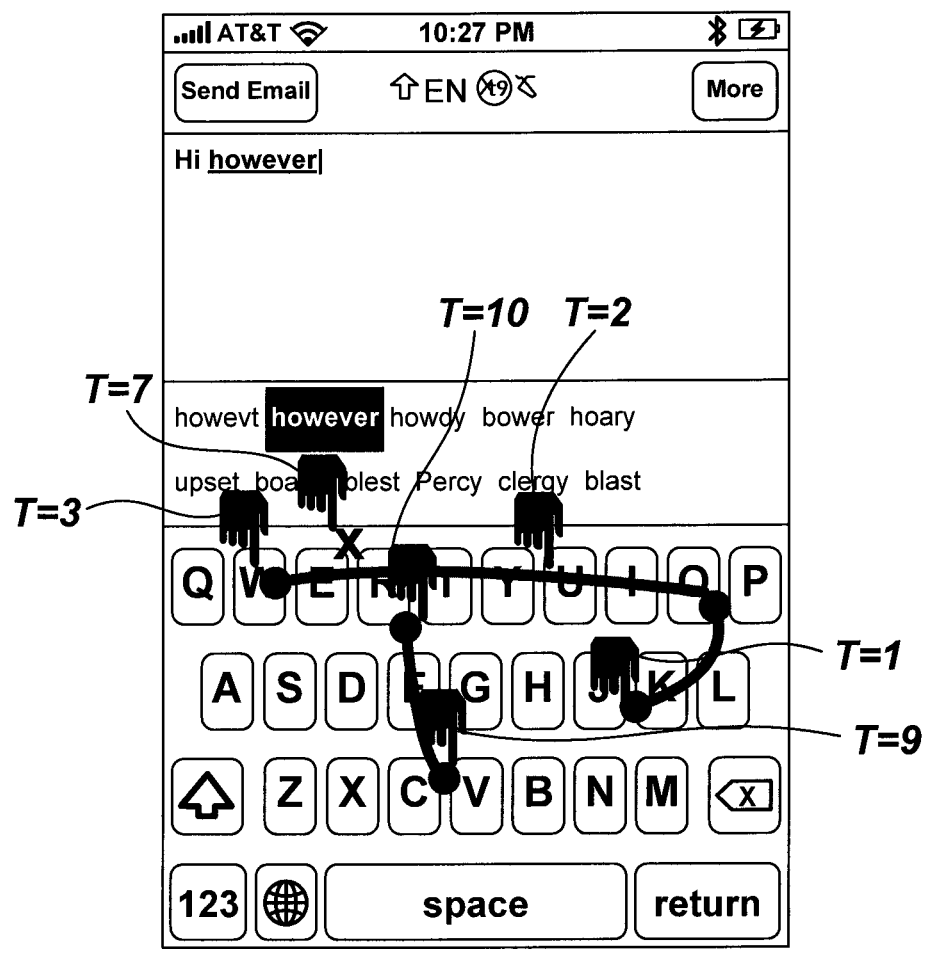

FIG. 5E illustrates how the user interface may receive an input from a user that comprises different types of tactile input features and, in response, displays a word list that is generated using all of the multiple input features. In the example of FIG. 5E, from T=[1:3], the user provides the same input as shown in FIG. 5C by tracing out a line that results in the default word "how" being displayed in the word choice list. The user then pauses until T=7, when he taps between the "E" and "R" keys (which may result in the display of an updated word choice list). He again pauses until T=9, when he initiates a new trace near the "V" key that ends near the "F" and "R" keys at T=10. At the conclusion of this trace, using the totality of all of the input features (i.e., a first trace (consisting of three corners and two segments), a tap, and the second trace (consisting of two corners and one segment), the disambiguation module updates the word choice list so that the default word displayed in the user interface is "however."

Multi-Modal Inputs: Tactile Input Features and Audio Inputs

Figure 5F:
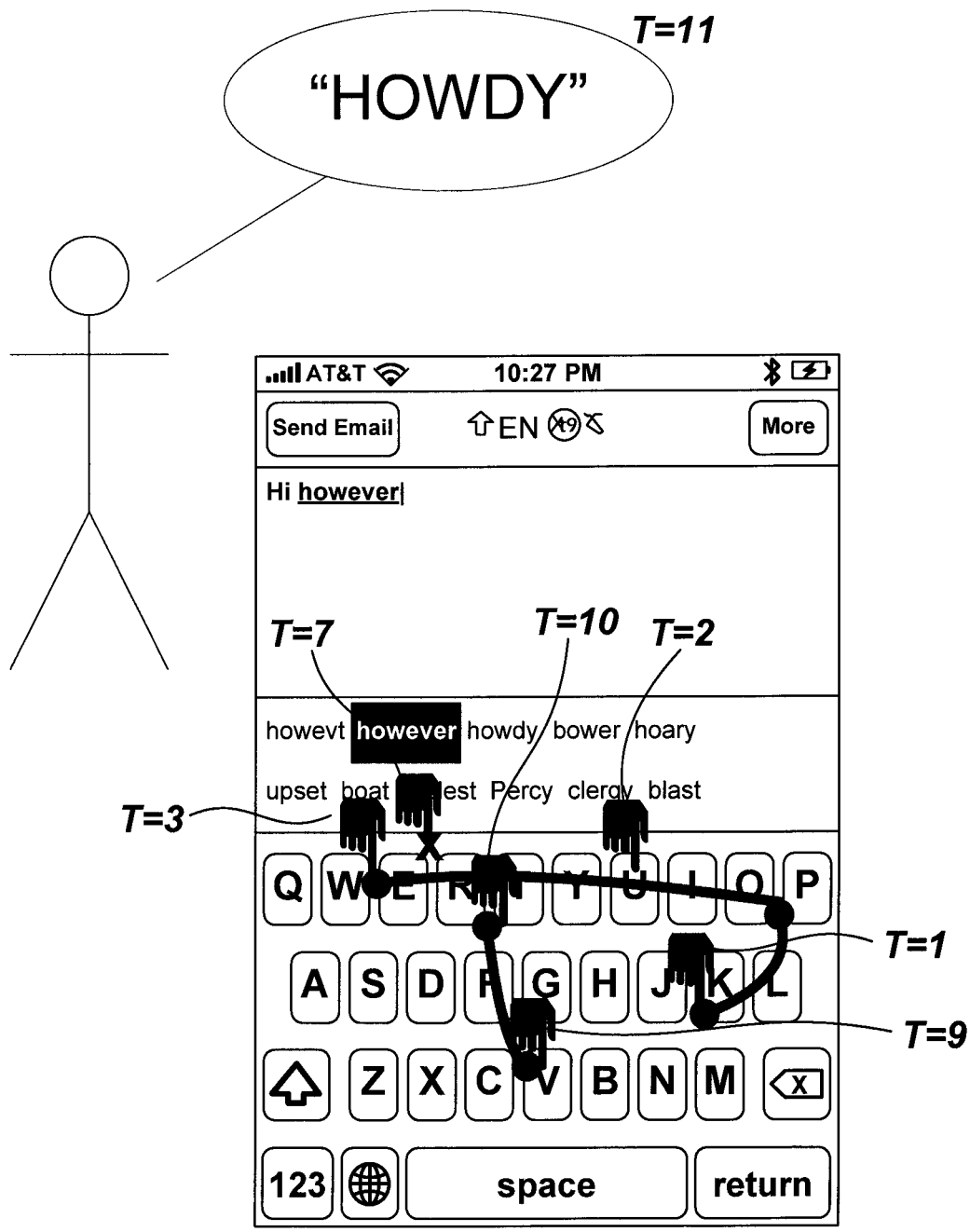
Figure 5G:
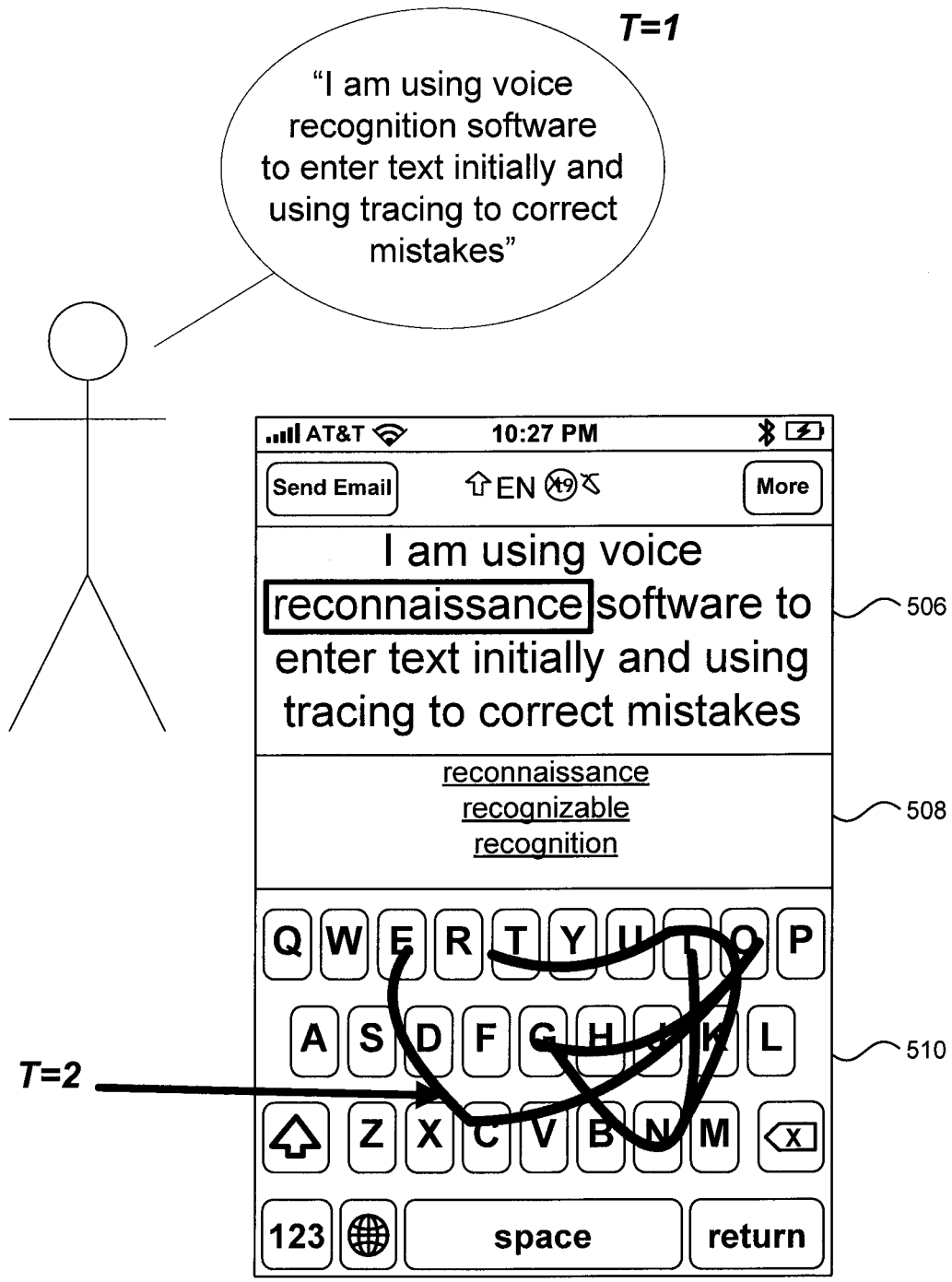

As illustrated by FIGS. 5F-G, the user interface described herein also permits a user to mix multiple tactile inputs and audio inputs in a complementary fashion. In such examples, the user interface and/or disambiguation module may further comprise a voice recognition module configured to parse and/or disambiguate an audio input into words and/or word choice lists. As a first example, the user interface may permit a user to provide an audio input in order to select a word from a word choice list that was initially generated by tactile user input. In the example shown in FIG. 5F, during time T=[1:10], the user provides the same input described in FIG. 5E by inputting multiple tactile features that result in the display of a word choice list that includes the default word "however," as well the word "howdy." At time T=11, the user indicates his intent to select the latter word by saying "howdy" aloud in order to produce an audio input to the user interface that is indicative of that choice (e.g., by speaking into a microphone that is coupled to the device providing or carrying the user interface).

As another example, the user interface may permit a user to select, via tactile input (e.g., a trace input), a word from a word choice list, wherein the word choice list was generated by audio input (e.g., a word choice list generated using voice recognition software), free form handwriting input (e.g., a word choice list generated using handwriting recognition software) or another mode of input. In the example of FIG. 5G, the user begins his input at time T=1 by stating out loud "I am using voice recognition software to enter text initially and using tracing to correct mistakes." In response to this audio input, the user interface (e.g., using a voice recognition module) generates a textual version of the user's sentence in the output area 506, but with an erroneous fourth word ("reconnaissance"). To correct the error, the user, at time T2, selects the erroneous word via a tactile input (e.g., a tap) in the keyboard area 510. The user interface may optionally display a word choice list in the word choice area 508 consisting of the phonetically similar words reconnaissance, recognizable and recognition that is generated by a voice recognition module. The user then traces out the correct word ("recognition") using the virtual keyboard as described previously. By analyzing the trace to determine which word choice it best matches, the system can recognize the user's intended word and correct the mistake. The multimodal nature of the system means that words entered using any particular modality such as speech, tapping, handwriting, speech, etc., can be selected/reselected and corrected. In some modalities, the nature of the ambiguity may result in a single word having more than one word (phrase segment) as an alternative selection, or parts made of more than one word can have a shorter alternative selection. An example is when the user utters: "Do little" which may be recognized as "Doolittle" with alternates of "Do Little" and "Do let a".

The above examples demonstrate the more general ability of the user interface to mix multiple kinds of disambiguation in a complementary fashion. In these examples, a first modality of disambiguation (e.g. textual disambiguation or audio disambiguation) generates a first word choice list (e.g. an N-best list), the members of which share a common characteristic (e.g., similar character arrangements on a keyboard or a phonetic similarity). Next, when it comes time to disambiguate a second type of user input, the set of possible words that must be searched to disambiguate the second input (e.g., the "dictionary" searched) is limited to the members of the first word choice list (e.g., an N-best list).

Alternate Keyboard Layouts and Other Features

Figure 5H:
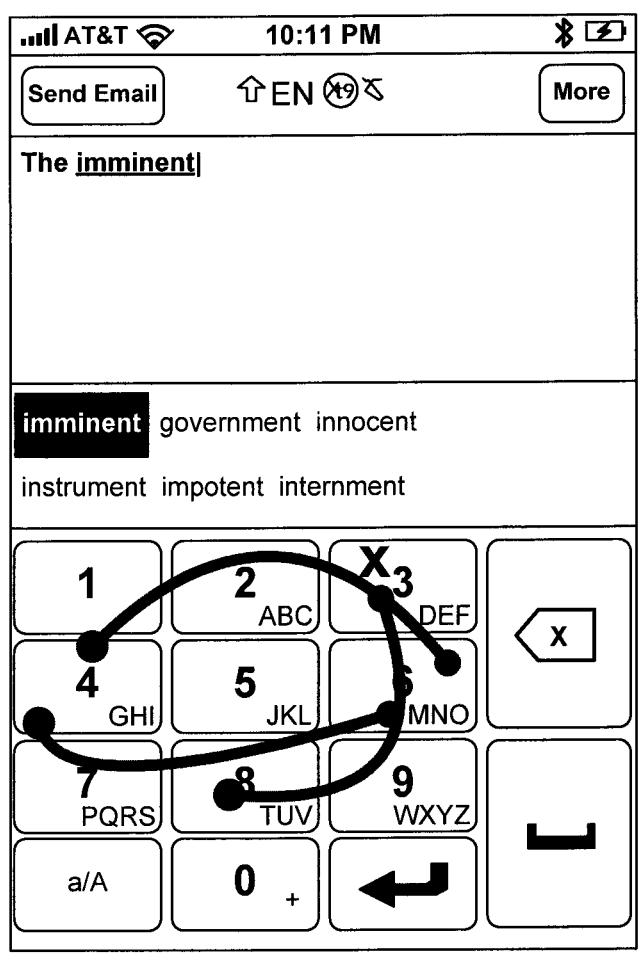

The suitable user interface of FIG. 5A shows a full QWERTY virtual keyboard that displays at most a single character in conjunction with each key. However, all of the input, output and disambiguation functionalities described herein (tapping, tracing, hovering, multi-modal inputs, etc.) may be suitably implemented with a user interface that utilizes any style of keyboard layout, including keyboard layouts where a single key is displayed in conjunction with two or more characters. For example, FIG. 5H shows a user interface that comprises a virtual keyboard with 12 primary keys arranged in a 4×3 configuration and 2 additional function keys to the side (a space key and a delete key). In such a layout, most of the primary keys are displayed in conjunction with 1-4 different characters. In conventional systems that use a similar 12-key layout, a user must typically utilize multiple keystrokes to indicate certain characters (e.g., in conventional systems, four repeated keystrokes or a sustained depression of a key may be required to indicate the letter "i"). In contrast, as shown in FIG. 5H, the disambiguation methods described herein permit a user to generate a word list that includes the intended word "imminent" with only a few traces and a tap. In the user interface, multiple input features (e.g., four sequential taps or a long hover over the "4GHI" key) are not required to select the initial letter of the intended word, "i."

Similarly, unlike conventional systems, in the systems described herein, repeated or prolonged user input features (e.g., multiple input taps or hovers) are not required to select accented characters (or other alternate characters) that may not be visually displayed on a virtual keyboard. As an example, in conventional systems, to select the accented character è on a QWERTY keyboard layout such as the one shown in FIG. 5A, a user may need to execute several keystrokes, one of which includes the "E" key. In contrast, the disambiguation methods described herein permit a user to generate a word list that includes words having the accented letter "è" with only a single input feature (e.g., a single tap or corner) to the user interface that implicates the "E" key. In addition to having multiple, similar letters mapped to a single key, the disambiguation methods described herein may also be practiced with a keyboard layout where numbers show up as alternatives to the letters on the top row.

Additionally, the user interfaces described herein do not require repeated or additional input features from a user to indicate repeated characters and/or repeated keystrokes. For example, to efficiently input the intended word "moonlight" using the full-QWERTY user interface shown in FIG. 5A, a user need only input one tactile feature near the "O" key in order to produce the intended word in the generated word list, despite the occurrence of a repeated "oo" within the intended word. As another example, to efficiently input the word "his" using the interface of FIG. 5H, the user need only indicate their selection of the "4GHI" button via a single input feature (e.g., a single tap or corner), since the same key is utilized for both the first letter ("h") and second letter ("i") in the intended word.

Context-Driven Tracing

Figure 5I:
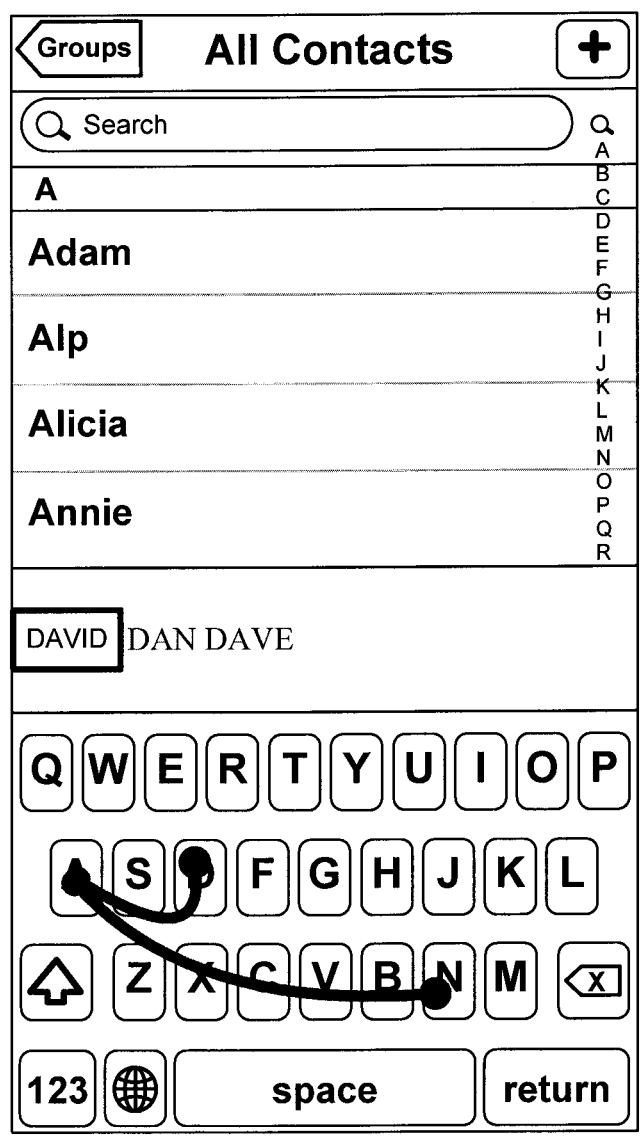

FIG. 5I illustrates an example of how context information may be used to provide more efficient text entry. In FIG. 5I, a user is searching for a contact name within a contacts application program. In order to enter her friend's name, she traces out a three-cornered trace. When disambiguating this trace entry, the disambiguation module 213 may limit its word lookup to a dictionary that only comprises words (e.g., mostly proper nouns) in the user's contact list. Furthermore, the disambiguation module may use more than just trace matching to rank the word choice list and to suggest a default name. For example, the disambiguation module may promote names that the user frequently enters or accesses, either in the contacts application program, in an email program, or in all application programs. To illustrate, although the trace shown in FIG. 5I starts at "D", turns at "A" and ends on the letter "N," forming the common name "DAN," the disambiguation module may still promote the name "DAVID" if the user enters that name with a much higher frequency and/or recency than "DAN."

Although FIGS. 5A-5I have emphasized tactile inputs such as taps, traces, hovers and multi-modal inputs related to virtual keyboards, one having skill in the art will appreciate that the disambiguation systems and methods described herein may also utilize other kinds of user inputs, including multi-touch inputs (e.g., two or more fingers upon a touch screen), accelerometer inputs (e.g. inputs that indicate acceleration of the larger system), handwriting/gesture inputs (e.g., free-form tactile input), and/or signals from input buttons.

Suitable System and Disambiguation Modules

Figure 6:
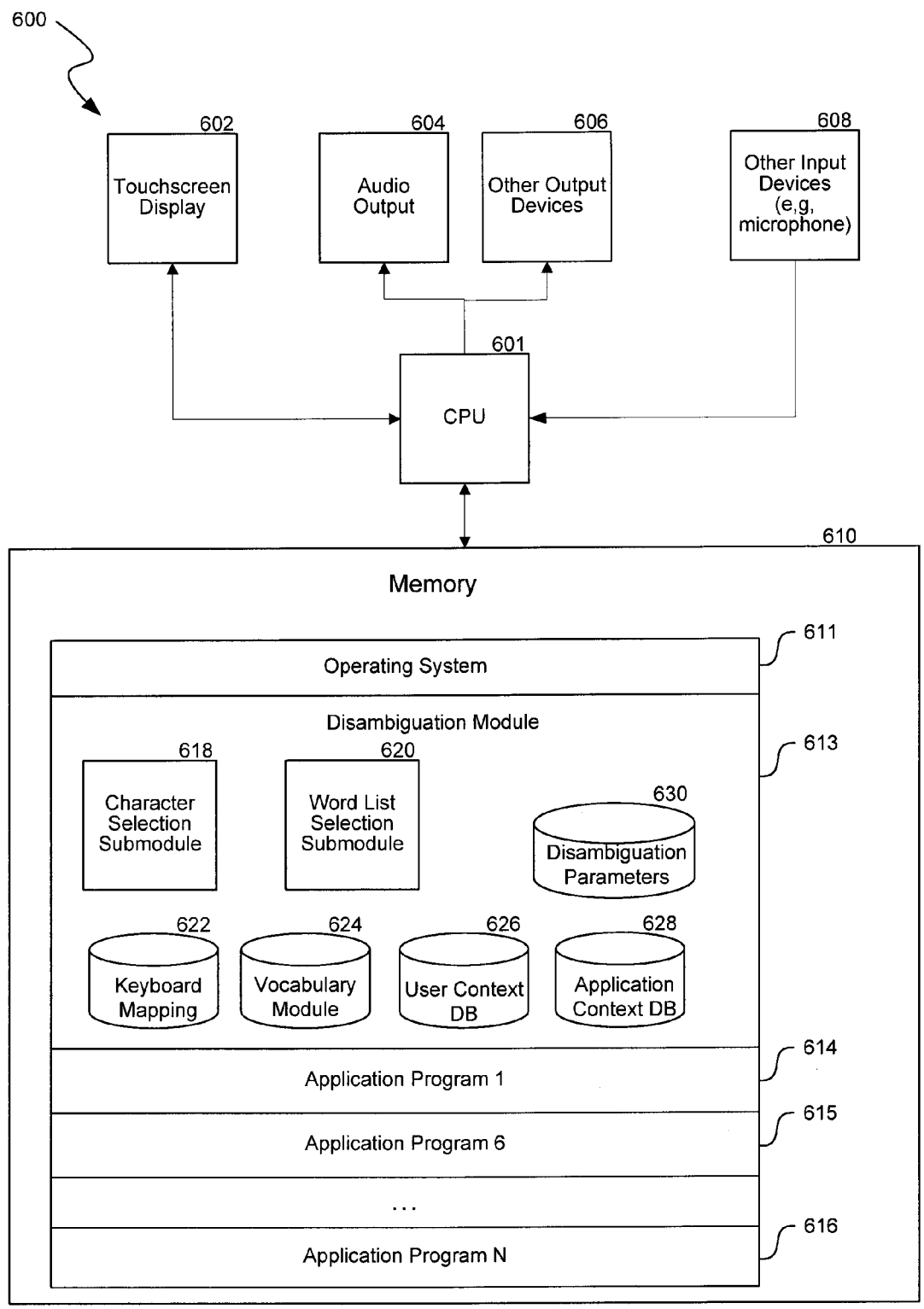
FIG. 6 is a block diagram illustrating a suitable computing system that may employ aspects of the disclosed technology.

FIG. 6 and the following discussion provide a brief, general description of a suitable computing environment in which the disclosed technology can be implemented. Although not required, aspects of the disclosed technology are described in the general context of computer-executable instructions, such as routines executed by a general-purpose data processing device, e.g., a server computer, wireless device or personal computer. Those skilled in the relevant art will appreciate that aspects of the disclosed technology can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the disclosed technology can be embodied in a special purpose computer or data processor that is specifically programmed, configured, or constructed to perform one or more of the computer-executable instructions explained in detail herein. While aspects of the disclosed technology, such as certain functions, are described as being performed exclusively on a single device, the disclosed technology can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

In one embodiment, the disclosed technology is implemented as a sequence of program instructions that are stored in a non-transitory computer readable media or computer readable memory. The instructions are executed by processor electronics to perform the functions described herein.

Aspects of the disclosed technology may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the disclosed technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 6 illustrates a suitable data processing or computing system 600 in which a disambiguation module 613 may operate in order to provide the user interface functionality described herein. The computing system may include a touch screen display 603, other input devices 608, an audio output component 604, other output devices 606, one or more processors or central processing unit (CPU) 601, and at least one memory 610, some or all of which may be carried or housed within a housing (not shown). As an alternative, or in addition to the CPU, the computing system 600 may include one or more digital signal processors (DSPs), application-specific integrated circuits (ASICs), field programmable gate arrays (FPGAs), or other logic/data processing circuitry.

The input and output components may include a global positioning system (GPS), a digital camera, a wireless LAN (WiFi) interface, a motion sensor, accelerometer, a Bluetooth® interface, an external USB or similar port, a headphone or headset jack adapter, projection display, haptic output device (e.g., a vibrator), as well as other components or a communication elements. For example, the Bluetooth® interface may communicate with an external wireless communications component, such as a wireless headset, to not only receive audio input but also provide audio output. In one implementation, the computing system 600 is a mobile phone, whereby the system also includes one or more radios coupled to the CPU 601 to permit wireless communications.

The output modalities of the system may include text-to-speech, audio, vibration, tactile, visual, etc. outputs. For instance the system can let the user know which input features, characters and/or letters have been recognized by adding a 'vibrate' or 'sound' feedback. Similarly, the system can provide the user with more detailed understanding of the features extracted and the level of uncertainty involved in its determinations.

The memory 610 may further comprise an operating system 611, a disambiguation module 613, and one or more application programs (shown as application programs 1 through N 614-616). The application programs can include word processing programs, slide presentation or image creation programs, email programs, SMS/MMS messaging programs, instant messaging programs, or other text-based communication or text-based document creation programs.

The disambiguation module 613 receives user input data from the operating system, including data related to a user's input with the touch screen 603, and uses the received input data to identify a user-selected word, which it may provide to an application program. For example, the disambiguation module 613 may receive a series of notifications from the operating system 611 of finger down events (when a user depresses a point on the touch screen), finger move events (e.g., when a user moves his finger while depressing the screen), and finger up events (e.g., when a user lifts their finger from the touch screen). (While generally described herein as using a finger, the user may use anything to touch or actuate the touch screen, such as a stylus.) Each of the received notifications may include a time series of position data, e.g., an X-Y set of coordinates (x, y) with a timestamp t (i.e., the coordinates (x, y, t)), which reflect the user's tactile input to the touch screen 603. Additionally, if the touch screen 603 comprises pressure sensors, the received notifications may include a time series of position and pressure data, e.g., a set of coordinates (x, y, t, p) that reflect the user's tactile input to the touch screen 603, including the applied pressure, p. The operation system 611 may also provide other kinds of input data to the disambiguation module 613, including multi-touch inputs (e.g., additional sets of simultaneous coordinates (x, y, t) representing a second finger simultaneously contacting the touch screen), audio inputs (e.g., voice inputs), visual inputs, accelerometer inputs, location data, sensor data, etc.

The disambiguation module may additionally receive and process dynamic context data from the operating system and/or application program(s) in order to facilitate its word identification. Context information is any information that may help inform the disambiguation module of the user's intent, and may include information such as sentence or word-pair context, language context, application-specific context (e.g. data fields/tags), user-specific context, location, time of day etc., as described in greater detail herein For example, the module may receive context information such as the last word selected by the user, other sentence-level context, the virtual keyboard layout utilized, the type of entry field into which the word will be entered (e.g., a "Contacts" field), location data (e.g. where the computing system includes a GPS receiver or accesses location data), calendaring data for the user, and/or context data or applications used or being used that may utilize the identified word. As another example, the disambiguation module may receive an "N-best" list from another mode of input. An N-best list is a rank-ordered list of suggested words, which may be capped at a fixed size (e.g., N). As one example, an N-best list may be generated from another type of disambiguation application program or module, such as a list of words generated from a speech recognition program (e.g., a list of homophones) or a handwriting-recognition program. As still another example, if a user is entering text in order to respond to an earlier email, the disambiguation module may receive a list of words used in the earlier email.

The disambiguation module may include a character selection submodule 618, a word list selection submodule 620, a keyboard mapping database 622, a vocabulary module 624, a user context database 626, an application context database 628 and a disambiguation parameter database 630. While depicted as separate modules, a single module, program or routine may incorporate two or more of the modules.

The character selection submodule 618 is configured to analyze received user input or input data to extract input features (or "input features"), e.g., taps, corners, segments, hovers, or other features. The character selection submodule 618 is further configured to analyze the extracted input features using a language-independent keyboard mapping database 622 to produce an input sequence that comprises an ordered set of feature objects (e.g. rank ordered set of letters for a word being spelled). Each feature object in the input sequence is associated with a set of characters associated with corresponding keys for one of multiple virtual keyboards or key layouts, a set of proximity weights, and one or more feature types. The proximity weights reflect the likelihood that a user intended to effectuate a particular keystroke via a particular input feature (e.g., a tap, corner, segment, or hover). This likelihood may be based on the proximity between the location(s) of the input feature and the location of the key on the virtual keyboard. During its operation the character selection submodule may utilize parameters, policies, and preferences retrieved from the disambiguation parameter database. Further details on aspects of the character selection submodule 618 may be found in the assignee's U.S. Patent Publication No. 2006/0274051 entitled "VIRTUAL KEYBOARD SYSTEMS WITH AUTOMATIC CORRECTION, and incorporated by reference herein.

The keyboard mapping database 622 permits the character selection submodule 618 to evaluate the likelihood that a user intended to effectuate a particular keystroke by inputting a particular input feature. For each type of virtual key layout utilized by the system and displayed to the user on the touch screen, such as a full QWERTY (e.g. 28-key, 32-key, or more), 14-key half-QWERTY keyboard, 12-key "numeric" keypad, etc. The keyboard mapping database 622 provides an area-to-key mapping that maps a particular key to a particular defined area or point on the touch screen display, and vice versa. For example, in a full 28-key QWERTY key layout, an area-key mapping may define the "E key" using the set of four points of the display: {(x1,y1), (x2,y2), (x3,y3), (x4,y4)}. As another example, in a 4×3, 12-key layout, such as the one shown in FIG. 1-H, an area-key mapping may define the "5JKL" key using the set of four points: {(x11,y11), (x22, y22), (x33,y33), (x44,y44)}. Of course, other mappings are possible, such as an x-y center location and radius to define a circle for the virtual keyboard and a map to a corresponding character for that virtual keyboard (where the circles may be intersecting).

Additionally, for each type of character layout utilized by the system, (e.g., an American English full QWERTY character layout vs. a French full AZERTY character layout) the keyboard mapping database provides a key-character mapping that maps a particular key (e.g., the "E key") to one or more characters (or for special function keys, to a particular function), and conversely, maps characters to a particular key. A key-character mapping may describe a one-to-many relationship, wherein a particular key is associated with more than one character, including characters that are not displayed on the virtual keyboard to the user of the touch screen. For example, in a key-character mapping related to a full QWERTY key layout, an "E key" may be mapped to two or more of the following characters: E, e, ë, ê, é, è, Ė, ę, Ę, ė, Ė, ě, Ě, ē, Ë. As another example, in a key-character mapping that is related to a 12-key layout like the one shown in FIG. 5H, the "5JKL" key may be mapped to the following characters: 5, %, J, j, K, k, L, l. A single area-key mapping may be related to more than one key-character mapping, e.g., to permit easier multi-lingual input via a single virtual keyboard layout. The use of a keyboard mapping database 622 to disambiguate user input is described in greater detail herein.

In addition, keys may combine to form Romanization, transliteration or transcription inputs allowing the user to enter foreign characters using standard Latin-1 based keyboard. Users can type a word using the Latin-1 based keyboard the way it sounds, and the transliteration component will produce a word in its native script. For example typing "serodija" results in the Russian word "сегодня". One or more Latin1 characters can combine to form one or more Russian characters. These mappings can be implemented in a variety of ways, using state machines, or other commonly used methods. This translation, or transliteration layer adds a layer of mapping or additional submodule implemented as probabilities. In cases where there is a one to one mapping, the implementation is straightforward. When there are multiple interpretations, each mapping can be assigned a probability value. For example, in Hindi, letters may have more than one valid mapping. For instance: the character ई has the following mappings: i, yi, ee and yi. Similarly the character ई maps to i and yi. Context or other parameters noted here may be used to further disambiguate or order the displayed listed of options to the user.

The word list selection submodule 620 is configured to receive the input sequence generated by the character selection submodule. The word list selection submodule 620 may analyze the input sequence using a variety of other inputs in order to generate a rank-ordered or otherwise structured word choice list, such as those shown in FIGS. 5A-5I. The other inputs that the word list selection submodule 620 may use include data from the vocabulary module 624, parameters retrieved from the disambiguation parameter database 630, received dynamic context data, and context data retrieved from the user context database 626 and the application context database 628. The word list selection submodule 620 is described in greater detail herein.

To facilitate word selection, the vocabulary module 624 provides one or more dictionaries that define a set or logical group of words. For example, an "American-English" dictionary may define a logical group of words in common usage by English-speaking Americans, while an "American-English-Msg" dictionary may define a logical groups of words (including emoticons) commonly used by English-speaking Americans in text and multimedia messages (e.g. SMS, MMS or similar messages). The vocabulary module 624 may also provide additional language information, such as static or dynamic frequency information within a particular logical group of words (e.g., within a particular language) and/or particular context. For example, the additional language information may include frequency information in accordance with a linguistic model, which may include one or more of: frequency of occurrence of a word in formal and/or conversational written text; frequency of occurrence of a word when following certain preceding word or words; proper or common grammar of the surrounding sentences; frequency of the word being utilized as a left-stem or right-stem (or prefix or suffix), etc. In addition to frequency, transition probabilities may be assigned to particular transitions, linking one class of prefixes to likely stems or stems with one or more classes of suffixes while rejecting prefixes with other words in the dictionary which would form illegal words. For example the word work may have high transition probabilities with suffixes -er, -ers, -ing, -s and -ed, which often form valid words.

Notably, the disambiguation module does not need to change its dictionary if the user changes his keyboard configuration. Furthermore, by using a keyboard mapping database 622, the disambiguation module may be utilized within any system regardless of the keyboard layout.

The disambiguation parameter database 630 may store various parameters, policies, and preferences for performing interaction or input feature extraction, character selection and/or word selection. For example, the disambiguation parameter database may include parameters and policies that aid in the selection and application of distance functions, proximity metrics, matching metrics and post-processing steps, all of which are described herein.

To facilitate improved character and/or word selection, the user context database 626 and the application context database 628 may provide context information to the character selection submodule 618 and/or the word list selection submodule 620 to inform its processing; these submodules may also receive dynamic context information from an application program and/or the operating system. The entry of text, the selection amongst alternatives, contextual information and multiple modalities are managed by the disambiguation module. The system may use inputs from the user, the context of the application, external sensors and context resources and disambiguation, and correction approaches to determine the user's intent as noted herein. Based on an understanding of the user's intent, the system maintains the context and state of the application, and manages the composition of inputs and synchronization across multiple input modalities. By interfacing with business logic, the system can produce multimodal output to be presented to the user. The interaction, the business logic and the context and state may be managed through an interaction script or more complex state machines (State Chart XML or SCXML) or languages which are used for the control of user interfaces such as XHTML+Voice Profile or SALT.

The user context database 626 may include any historical information relating to the user's prior character and/or word selection behavior, such as previous words utilized by the user, the frequency of words entered by the user, and common phrases employed by the user Other examples of user context information include: word pairs entered by a user, a user's unique vocabulary in a specific application (text messaging vs. email, for example), a user's level of 'sloppiness' (increasing the character region size) while entering text into the system, etc. Additionally, user context information may reflect how frequently a user selects words from a particular language or what language the user primarily uses. For example, if the system utilizes both French and English language dictionaries for a bilingual user, the user context database 626 may track the relative frequency with which the user selects French words versus English words in order to determine the user's "primary language," and then words from that dictionary may be preferred or presented first over words from the other dictionary.

Alternatively or additionally, some user context information may be reflected in a user-specific dictionary and/or other data structures in the vocabulary module 624. Additionally or alternatively, the user context database 626 may also provide user-specific policies and parameters that may override default disambiguation parameters stored in the disambiguation parameters database 230.

The application context database 628 may permit the disambiguation module 613 to access historical information related to character or word selection within a particular application program. The application context database 628 may also provide application-specific dictionaries and/or application-specific policies and parameters that may override default disambiguation parameters stored in the disambiguation parameters database 630. Context can also come from text fields in which the information is supposed to be entered. As an example, in some implementations, the disambiguation module may be designed to integrate with specific types of application programs that define application-specific fields, tags or labels that may be associated with a particular word entry. As an example, the text-field of a form ("Name" or "Email") may be a label that could be utilized to provide context information. The application context database 628 may then correlate a user's historical word entries with application-specific field(s) to provide additional context information. The system may define, in the application context database, application-specific fields and rules (e.g., grammar rules, matching metrics and/or post-processing rules) that reflect how the field information and other context information may be utilized during word selection. These rules may even specify that word suggestions for a particular field can depend on what words a user has entered in other fields.

The system informs the disambiguation module of the intended textual information of the field (name, phone number, date, email address, password) and/or provides it with a grammar which describes the information. For instance a form which requires State, ZIP and City to be entered would use an approach that would be able to provide appropriate grammars based on the context and content of the other fields. If the State is "WA", the grammar for cities is constrained by actual cities in the State of Washington and ZIP codes are similarly constrained. When City and State are entered, the range of ZIP codes is again constrained. Complex interactions between fields and grammars can simplify the entry of data in such "forms". Alternatively, the system can learn the context for often used text fields.

To illustrate the use of this context information, consider the example of form filling, where the disambiguation module may remember what words users have entered in particular field(s). To illustrate, in an order form a user may enter his work email into an email field and then the disambiguation module would predict that the shipping address field would contain his work address. In contrast, if he enters his personal email address into an email field, the disambiguation module would predict his home address in the shipping address field.

Other contextual information includes environmental parameters, such as time of day, location, calendar entries, user settings, application settings and system settings.

While shown as separate databases, two or more of the databases described herein may be combined, and may be implemented in any data structure or logical construct.

The character selection submodule 618 and/or the word list selection submodule 620 may keep the user context database 626 and/or the application context database 228 current by providing notifications about a user's present behavior. For example, the word list selection submodule 620 may return information to these databases when a user selects a word from a word selection list.

Additionally, as described previously, the disambiguation module 613 may also receive additional dynamic context data from the operating system and/or an application program. Although not shown, the disambiguation module may additionally comprise voice recognition software configured to disambiguate speech or audio inputs, as described herein.

Suitable Disambiguation Methods

The flow diagrams described herein do not show all functions or exchanges of data, but instead provide an understanding of commands and data exchanged under the system. Those skilled in the relevant art will recognize that some functions or exchange of commands and data may be repeated, varied, omitted, or supplemented, and other (less important) aspects not shown may be readily implemented. Further, although process steps, method steps, blocks, algorithms or the like may be described in a particular order, such processes, methods, blocks and algorithms may be configured to work in alternate orders. In other words, any sequence or order described herein does not necessarily indicate a requirement that the steps or blocks be performed in that order. The steps or blocks of processes and methods described herein may be performed in any order practical, and some steps may be performed simultaneously.

Figure 7A:
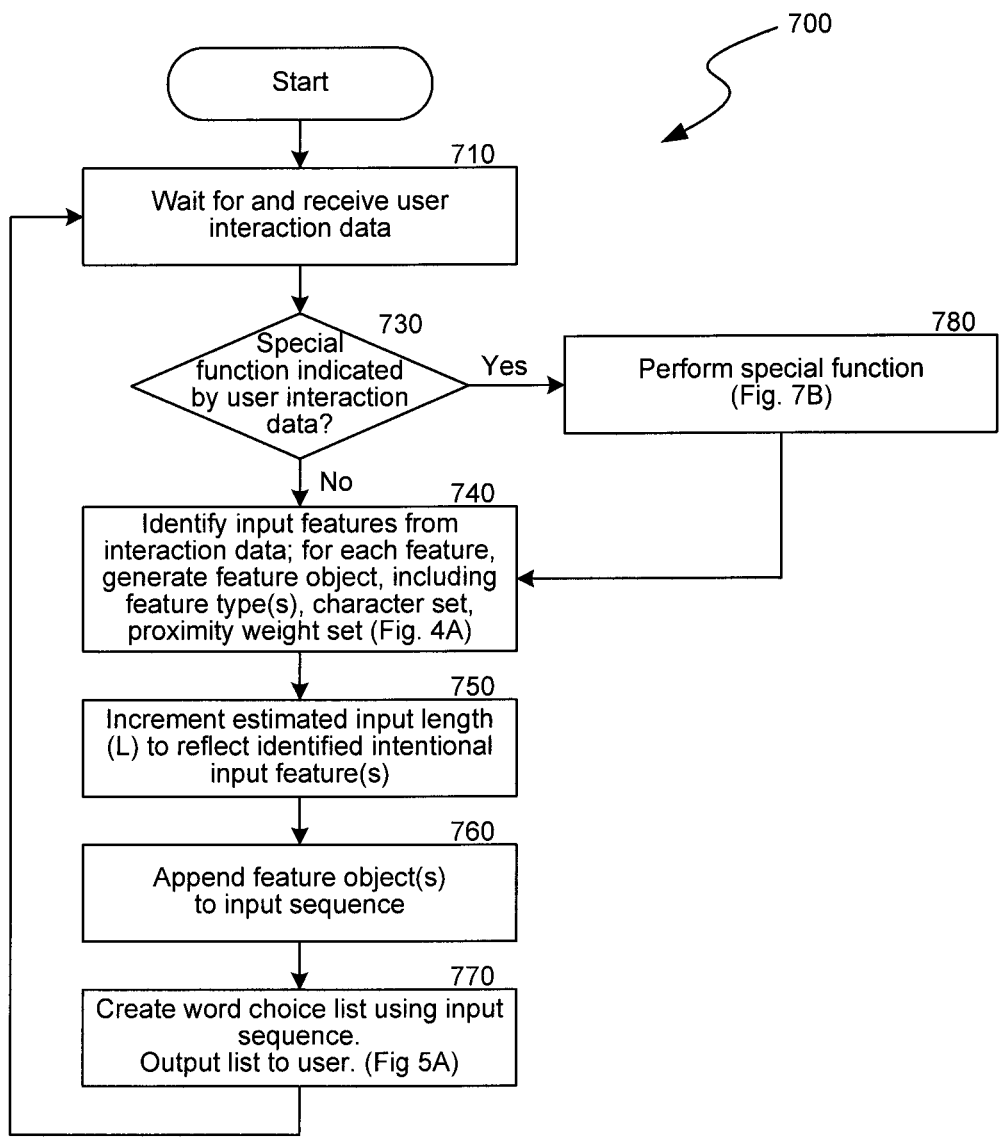
FIG. 7A is a flowchart illustrating a process for creating a word choice list based on user input to a device.

FIG. 7A shows a process 700 for disambiguating a series of user input data that may correspond to multi-modal user input in order to permit the selection of a word from a word choice list. The process 700 is performed by the disambiguation module 613 and begins at block 710, when the disambiguation module 613 waits for and receives input data before proceeding to block 730. Typically, the disambiguation module 613 receives input data in the form of one or more user input notifications or input events from the operating system, but it may also receive input data from other processes, such as an application program. For example, at block 710 the disambiguation module may wait for and receive from the operating system a finger down notification, a finger move notification, and/or a finger up notification, each of which is accompanied by a set of (x,y,t) or (x,y,t,p) coordinates, where x is the x-position of a user's finger on the display, y is the y-position of the user's finger, t is the time or a clock reference for those inputs, and p is an optional pressure measurement (for a pressure sensitive screen). The disambiguation module 613 may also wait for other forms of input data, such as voice inputs, accelerometer input, external sensor data, location information. Although not shown, at block 710, the disambiguation module 613 may receive additional dynamic context data, e.g., from the operating system and/or an application program. For example, it may receive information about the type of application program or the context in which the user is entering text (e.g., the type of field in which the user is typing, e.g., a date field versus a name field).

The period of time that the disambiguation module waits for and receives user input data may vary. For example, in one implementation, the disambiguation module may wait to receive an entire group of notifications corresponding to (1) a finger down notification, (2) the next finger up notification, and (3) all of the finger move notifications that occur in between these first two notifications, before proceeding to block 730. In some other implementations, at block 710, the disambiguation module 613 may continuously analyze incoming user input data to identify other types of logical groupings in the user input data and may proceed to block 730 only when a logical group is received in its entirety. For example, at block 710, the disambiguation module may continuously analyze received notifications as they arrive to determine if an input feature (e.g., a tap, a corner, a hover, etc.) or special function has occurred (using, e.g., the techniques described herein at block 802 and block 730, respectively) and when a logical group of input data that corresponds to a single input feature or special function is detected, processing of that logical group may then proceed at block 730.

At decision block 730, the disambiguation module determines whether the user has provided input that indicates that the disambiguation module should perform a special function, such as word selection, character deletion, or a function related to a special function key (e.g., shift, caps lock, keyboard selection key, etc.). As shown in FIG. 7A, if a special function is indicated, processing proceeds to block 780, where the disambiguation module performs the special function in accordance with the process shown in FIG. 7B (described herein), before the process proceeds to block 740. Otherwise, if input data does not indicate a special function, the process proceeds directly to block 740.

At block 740, the disambiguation module utilizes the character selection submodule 618 to identify what input features (e.g., taps, corners, segments, hovers, audio inputs, etc.), if any, are indicated by the received input data. Furthermore, at block 740, the disambiguation module utilizes the character selection submodule to generate a feature object for each identified input feature. A feature object includes a character set, a set of feature types, and a proximity weight set. The character selection submodule may perform these tasks in accordance with the processes shown in FIG. 8A-8B.

During block 740, the character selection submodule may also characterize each identified input feature using one or more feature types. For example, the character selection submodule may characterize each input feature as a tap, a corner, a segment, a hover, etc. Additionally, the character selection submodule may also determine whether an identified input feature is an "intentional input feature" (or "intentional feature"). An intentional input feature is an input feature that appears more likely to correspond to an intended keystroke by a user as compared to other types of input features. If a feature is not an intentional input feature, it is instead characterized as an "incidental input feature" (or "incidental feature"). When matching candidate words to input features, intentional input features may be treated differently (e.g. weighted higher) than incidental features, as described herein.

To illustrate, in some implementations, the disambiguation module treats all taps and all corners as intentional input features, since these features indicate a distinct and abrupt change in the user's input behavior. As another illustration, the disambiguation module may treat all taps, corners and hovers as "intentional" input features. The disambiguation module may further refine which input features are characterized as intentional or incidental by employing other factors described herein. Characterization of input features is described in greater detail herein with respect to FIG. 8A. In some implementations, the disambiguation module may make no distinction and may treat all input features as intentional.

At block 750, the disambiguation module may increment an estimated input length variable (L) to reflect the number of new intentional input features, if any, that were identified at block 740. As described herein, the disambiguation module may later use the estimated input length L to pre-filter dictionaries or for other purposes when generating a word choice list at block 370. Similarly, at block 750 the disambiguation module may additionally update other variables that reflect the composition of the input sequence (e.g., a variable that reflects the number of segment features present in the input sequence).

At block 760, the disambiguation module appends any newly generated feature objects to an input sequence. The input sequence reflects the ordered set of all input feature objects created since the user last selected a word. The various feature objects in the input sequence are ordered on the basis of time.

At block 770, the disambiguation module utilizes the word list selection submodule 618 to create a word choice list using the current input sequence and to output this list to the user (e.g., via the word choice list area on a touch screen display). In this way, the disambiguation module gives the user an opportunity to select his intended word. The creation of a word choice list is described in greater detail herein with respect to FIGS. 9A and 9B.

In one variant of the system, if the user selects a word in the word choice list, the system may respond by only showing words that start with the selected word. In addition to words, the selection list may also contain objects which are represented by the word. For instance the word love may have an icon in the shape of a heart associated with it. In addition, words which are retrieved from different vocabularies or providers, such as the contact dictionary, may offer additional options when selected. For instance, if a user has entered a name which matches a name in the contacts dictionary, the user may select to add the phone number, driving directions, e-mail address or any other related object, including an object which represents the contact in a machine readable format (vCard etc). Other words may be sent to 'recognizers' which may recognize keywords, phone numbers, potential calendar entries etc. When the user has typed: "Let's meet for Lunch at Joey's," the recognizers could add an action: add to calendar, call Joey's, make reservation, insert directions and more. When the user selects any action, the system may launch an activity which at completion returns the user to the activity of text entry. Such activities may be launched with any relevant contextual parameters that may help the activity to be better informed about the intent of the user, including user history, user preferences. In another example, the user may want to add a song to the email. By typing the name of the song, artist, album or even such keywords as mp3, song, the user may launch an activity that allows the user to seamlessly attach the object. Optionally, the word(s) which were selected to cause the start of the activity may be automatically deleted.

Figure 7B:
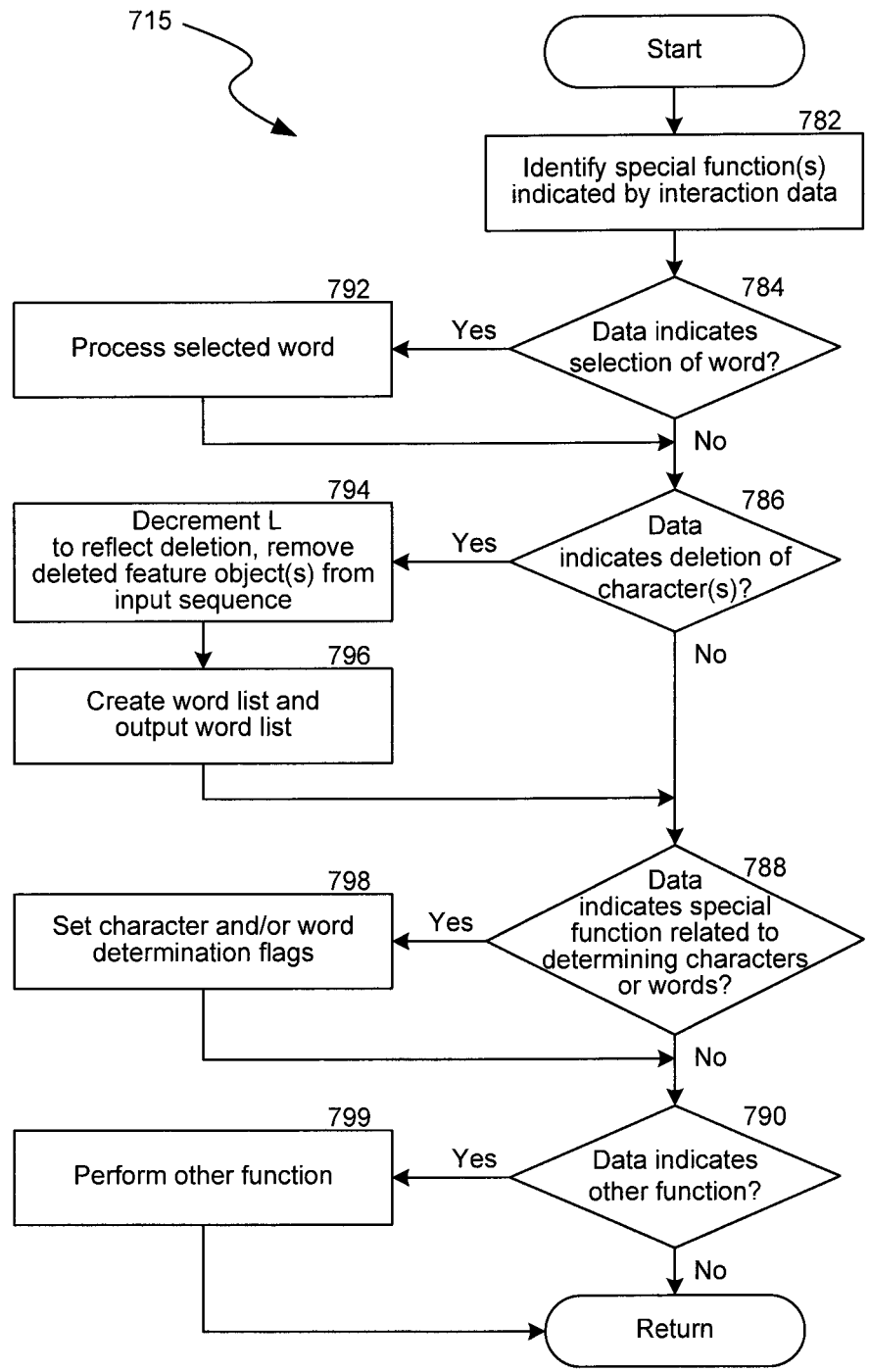
FIG. 7B is a flowchart illustrating special function handling.

FIG. 7B shows a process 715 for performing a special function indicated by user input data. The process 715 begins at block 782, when the disambiguation module identifies what types of special functions were indicated by the user's input data. To do so, the disambiguation module may analyze the proximity of tactile user input to a special function key, a word choice list area, and/or other active area, such as a menu button; may perform speech recognition analysis of voice command inputs; may analyze other tactile gestures (e.g. to detect a swipe, a multi-touch action) or physical gestures (e.g., a shake of a device); and/or may perform a lookup in the disambiguation parameters database to map types of input to a special function.

At decision block 784, the disambiguation module determines if the input data indicates that the user has selected a word (e.g., from a word choice list). User selection of a word may occur, for example, via vocal selection (as described previously), if the user taps, traces or hovers near or over a special key (e.g., a space bar, tab key, enter key, etc.), or if the user taps, traces or hovers on or near a word in the word choice list area. Of course a user may select a word by any other suitable method, such as by shaking a device, pushing an input button, etc.

In one example, the disambiguation module 613 may provide "auto-spacing" functionality by analyzing the types of input features utilized by the user to determine whether the user's input indicates that she intent to end one discrete word and begin another. In some implementations, the disambiguation module 613 will interpret two consecutive traces in an input sequence (i.e., without another type of input feature like a trace or hover intervening) as an indication that the user intended to (1) select the default word determined for the last trace and the other previous features in the input sequence, and (2) begin a new word starting with the second trace. Thus, at decision block 784, the disambiguation module may determine whether the last two input features were traces. If they were, the system may (1) proceed to block 792 in order to process the user's selection of the last default word, and (2) restart process 700 with the components of the second trace (i.e., its corners and segments) as the first features in a new input sequence. Otherwise, the system may simply continue the process 700. Of course, any other suitable feature combination could be utilized to test for auto-spacing at decision block 784. More generally, the disambiguation module 613 may perform auto-spacing upon the occurrence of a particular feature composition within the input sequence; the triggering compositions may be set using disambiguation parameters and preferences in the disambiguation parameters database 630.

Additionally, for certain languages (e.g., compounding languages) or contexts (e.g., URL entry), the auto-spacing feature may be disabled or implemented in a different fashion. For example, if two consecutive traces (or a different triggering condition) is detected, the system may (1) proceed to block 792 in order to process the user's selection of the last default word, and (2) restart process 700 with the components of the second trace (i.e., its corners and segments) as the first features in a new input sequence, and may set a flag that indicates that the last default word and the new word should be compounded when the new word is selected.

If the input data indicates the user has selected a word, processing proceeds to block 792 where the disambiguation module processes the selected word, otherwise processing proceeds directly to block 786. At block 792 the disambiguation module outputs the selected word to the desired output (e.g., to the output area of a window associated with a currently running application program). The nature of this output may be affected by context (e.g., sentence context), flags, parameters, or other factors. For example, if the immediately previous word in a sentence is a common left stem in a compounding language, and the currently selected word is a common right stem in the same compounding language, the disambiguation module may determine whether to insert a space before the currently selected word, or whether to compound the newly selected word to the immediately previous word. To make such a decision, the disambiguation module may utilize language information from the vocabulary module 624 and/or grammar module. As another example, if the disambiguation module may eliminate a spaces between words if it can infer from the context (e.g., the previous entry of "google.com") that a user is entering a URL.

Additionally, at block 792, the disambiguation module may update the vocabulary module to reflect the selection. For example, the disambiguation module may update frequency and recency information related to the selected word and/or may add a user-created word to a user-specific dictionary or temporary dictionary until the user has entered the same word several times. This avoids the accidental addition of garbage words to the user database. The system may even take notice of later edits to the word to remove such accidental additions to the dictionary without further user intervention. In addition, the user may indicate that a user generated word should be added immediately to the user dictionary through a particular action, such as a long press on the word. In addition to the word, the system may also include information about the textual context of the word such as the preceding word/ words to further improve future predictions (e.g. with word pairs, as noted herein).

As another example, the disambiguation module may update a dictionary that is both application- and user-dependent (e.g., if the system maintains different user dictionaries for email vs. text messaging). As yet another example, the disambiguation module may retrieve the previous word entered in order to update the user context database 626 with information that relates to word pairs utilized by a user. For example, if the user frequently used the word pair "school book", and in a current entry a previous word was "school", then the work "book" may receive a higher probability and be promoted within the word choice list. As another example, in some implementations, the disambiguation module may update the application context database 628, e.g., by associating the selected word with an applicable field label.

Additionally, at block 792, the disambiguation module may analyze current and/or historical received input data, current and/or historical input sequences and current and/or historical selected words in order to adjust its future behavior. For example, the disambiguation module may compare the location of the keys corresponding to a user's selected word to the location of detected features in an input sequence to determine if it can discern any trends in how the user inputs data to the user interface (can the system learn the user's patterns or habits based on a set of similar user inputs). If trends are discerned, the disambiguation module may update user-specific or other disambiguation parameters to reflect any observed trend. As examples, the disambiguation module may adjust its character selection parameters if a user always overshoots or undershoots a character at a corner (or does so in certain cases), if a user wiggles slightly during a tap in an effort to apparently provide extra emphasis or indicate a repeated letter, if the user typically pauses mid-segment in order to indicate an intended keystroke, etc. As another specific example, the disambiguation module may adjust applicable distance function and/or proximity metric parameters (e.g., those used to generate a corner oval, as described herein) to reflect how a user is particularly precise or imprecise in their input entry. In many instances, the disambiguation module employs a feedback loop, wherein the module stores the series of user inputs associated with the same word the user selected from the word list, compare those inputs, and make adjustments to ordered list of words on subsequent word lists, disambiguation of weights to inputs, etc. Different adaptation models may exist when the system detects a single finger entry (such as the thumb when holding the device in one hand) versus the entry through multiple fingers when holding the keyboard with both hands. In addition, the models can take into consideration other contextual parameters such as speed of the user, the availability of environmental light, etc.

As another example, the disambiguation module may analyze the selected word to determine the primary or preferred language of the user by determining the frequency with which the user selects words from a particular language, so that the user need not explicitly set his preferred language.

Additionally, at block 792, the disambiguation module may also update the application context database to reflect the frequency or recency of the word or phrase in the context of a particular application program (e.g., a text message program) and/or a particular application field (e.g., a "name" field). If appropriate, selected fields such as password fields may be remembered, but can be protected from being retrieved until the user enters a secret passcode, gesture, shake, speech command which unlocks the secured memory, vault or location containing these sensitive words for a period of time which may depend on various context parameters. For instance, when a device has entered a 'sleep' mode or a 'screen saver' mode, the vault may auto lock. The behavior of the vault may be defined by the user, if necessary on a per case basis. Furthermore, the user may have defined various 'personas' or guises and based upon explicit or implicit activation, usernames, passwords and other sensitive data may change. For instance, during working hours, the persona would be 'work' while after hours or during the weekends the persona could be 'leisure' or 'home' or 'family', and differing dictionaries, databases and preferences of the system would be used depending upon the persona.

Finally, at block 792, the disambiguation module may clear the input sequence and restart a new process 700 as shown in FIG. 7A.

At block 786, the disambiguation module determines whether the input data indicates the deletion of characters. For example, the disambiguation module may determine whether a delete special function key was been depressed (or traced), or whether the user shook the device or otherwise performed a deletion gesture. If a deletion event is detected, processing proceeds to blocks 794 and 796 before block 788. Otherwise processing proceeds directly to block 788. At block 794, the disambiguation module removes one or more feature objects from the input list. Typically, for a single depression (e.g., tap) or trace of a delete key, the disambiguation module may remove the last intentional feature object and any subsequent incidental feature objects from the input sequence. However, the disambiguation module may remove a different subset of feature objects from the input sequence; the number, nature and order of the features removed at block 394 may depend on the precise nature of the input data received (e.g., whether a "delete all" key or gesture was utilized instead of a "delete one" key or gesture; whether a user's deletion gesture or input indicated that a particular feature should be deleted, etc.) At block 794, the disambiguation module may additionally decrement the estimated input length variable L to reflect the deletion of one or more intentional feature objects from the input sequence. At block 796, the disambiguation module creates a new word list using the updated input sequence and outputs this new list to the user (e.g., as described in FIG. 9A).

At block 788, the disambiguation module determines whether the input data indicates a special function that is related to how the disambiguation module should select candidate characters and/or words when generating a word choice list. For example, the disambiguation module may determine whether the user has tapped or traced over a shift key, a caps lock key, a keyboard selection key, or a similar key that modifies how the disambiguation module should select characters and/or words. In another example, the keyboard may contain a 'Command' key which allows the user to quickly enter system commands. For instance by tracing over a Command key the word "COPY", or tracing from the Command key to then trace the word COPY on the keyboard, the user can copy selected text. Similarly, a CTRL key could be used to map to commonly used functions: CTRL-A "Select All", CTRL-CN to copy and paste, CTRL-E to center text etc. In addition, the user may be able to define commands and short cuts. As another example, the disambiguation module may determine whether the user has indicated a similar intent via other input means (e.g., by tracing off-keyboard (e.g. to indicate an undisplayed character is desired); by shaking, rubbing or other physical gesture; or by voice command). If a special function is indicated, the disambiguation module takes appropriate responsive action at block 798, for example, by adjusting a character determination flag (such as a capitalization flag, an area-key mapping selection flag, a key-character mapping selection flag, and/or a diacritical marker flag), or a word determination flag (such as a capitalization flag), by adjusting the contents of the input sequence, and/or by taking any other suitable action At block 790, the disambiguation module determines whether the input data indicates another function. For example, the disambiguation module may determine that the user has tapped on a menu button. If another function is indicated, at block 799 the disambiguation module takes suitable steps needed to perform the other indicated function before the process 315 returns. Otherwise, the process 715 returns immediately.

Figure 8A:
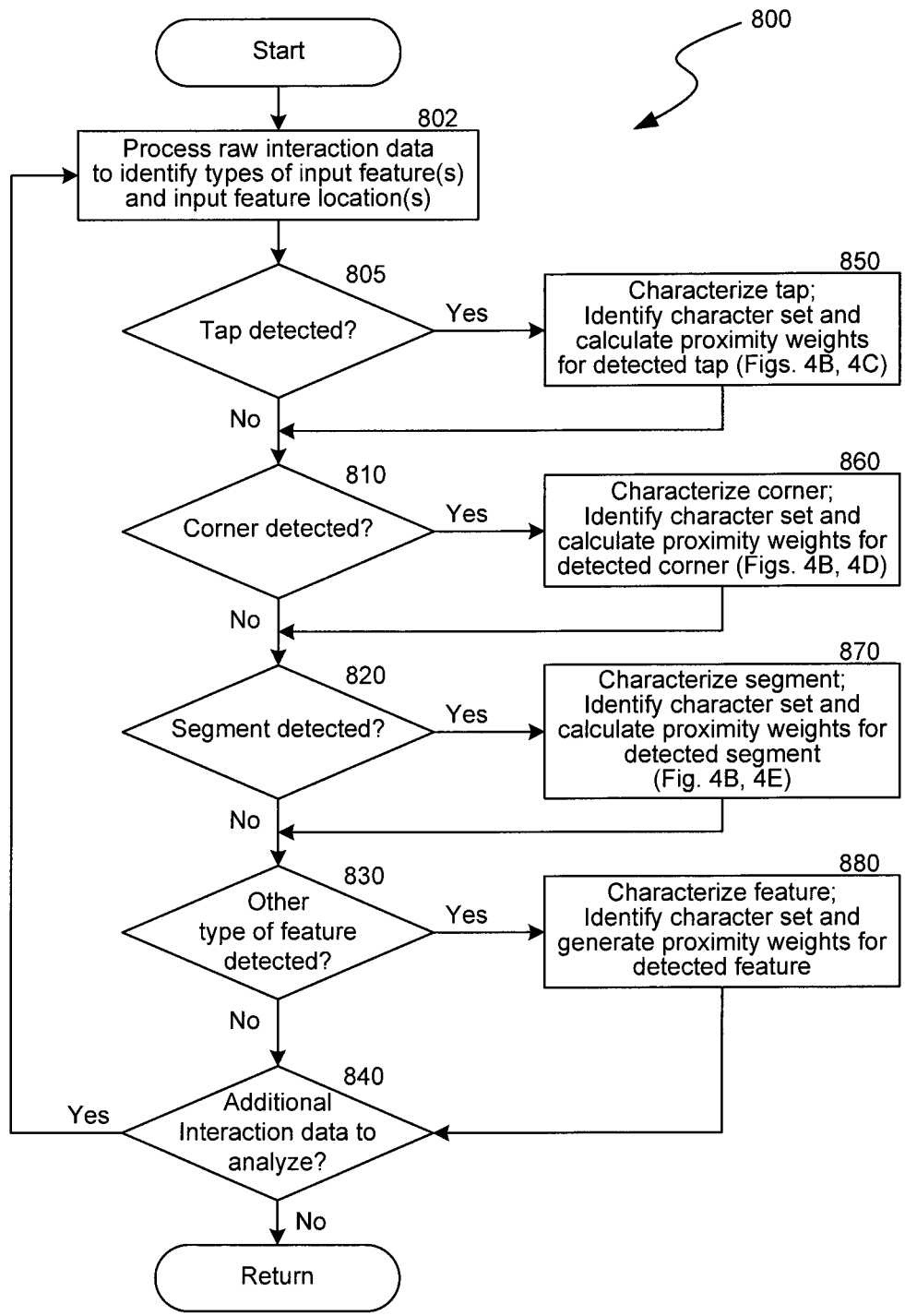
FIG. 8A is a flow diagram illustrating a process to determine input features, character sets and proximity weight sets from input data.

FIG. 8A illustrates a process 800 for identifying what input features, if any, are indicated by received input data and generating a feature object for each identified input feature. The process also characterizes each input feature, selects a character set to associate with the input feature, and determines a proximity weight set associated with that character set or corresponding weights for each character in the set.

The process 800 begins at block 802, where the character selection submodule processes the raw input data (e.g., a time series of finger down, finger move and finger up notifications or events associated with position measurements) to identify the types of input feature(s) present and the location of the identified input features. To identify each input feature, the character selection submodule may analyze a group of input data corresponding to a single depression of a user's finger, i.e., a time series of input data that starts with a finger down event, any number of finger move events, and a finger up event. The character selection submodule may then analyze this group to determine movement and/or pressure metrics from the related time series of position/pressure data, X-Y={x(t),y(t), and optionally, p(t)}. For example, the character selection submodule may calculate first-order values such as: the total time of the depression, the total distance traveled (e.g., by summing all of the line segments reflected in X-Y), the range of (x(t), y(t)) or some combination thereof, the net difference in pressure during the depression, etc. As another example, the character selection submodule may perform higher-order and/or time-dependent calculations, such as determining the velocity of the user's finger along a trace or performing well-known geometric analysis algorithms that may be used to identify corners, inflection points (e.g., using second derivatives), and/or other interest points.

At decision block 805, the character selection submodule determines whether the input data indicates a tap feature. To identify a tap feature, the character selection submodule may simple determine whether the total depression time falls under a threshold tap time value and/or the total range of movement during the time series also falls under a threshold tap distance value. If these conditions are satisfied, the character selection submodule may identify a suitable location (e.g. the initial, average, or final (x,y) coordinate seen during the depression window) to utilize as the location of the tap feature. However, the character selection submodule may apply any other suitable method to identify a tap, to distinguish a tap from other types of features and/or to determine the location of the tap. For example, the character selection submodule may ignore low-pressure taps.

If a tap is detected at decision block 805, processing next continues at block 850, where the character selection submodule generates a feature object for the tap by characterizing the tap, identifying a related character set associated with the tap, and calculating proximity weights for each character in the character set. Typically, a character selection submodule will characterize a tap feature as an intentional feature as described previously, but under certain circumstances dictated by disambiguation parameters (e.g., a low-pressure tap); the character selection submodule may instead characterize a tap as an incidental feature. Additionally, the character selection submodule may characterize the tap feature as both a "finger-down" and "finger-up event." Suitable methods for identifying a related character set and calculating proximity weights for a detected tap feature are described in greater detail herein with respect to FIGS. 8B and 8C.

At block 810, the character selection submodule determines whether the input data contains a corner feature. The character selection submodule may detect a starting corner and an ending corner of a trace simply by utilizing the first and last members or data points of the X-Y set of a trace. To identify a mid-trace corner feature, the character selection submodule may utilize any suitable curvature analysis method to detect an abrupt change in the user's direction. As one example, the character selection submodule may repeatedly evaluate a series of coordinates (e.g. three consecutive points) on the trace to determine if the central point falls more than a threshold distance from the line connecting the other two points. If it does not, the evaluation repeats for the next set of points on the trace. If it does, the central point is identified as a corner location. This process is then iterated to find corners. As another example, to identify a mid-trace corner feature, the character selection submodule may evaluate the pressure, velocity and/or acceleration behavior along a trace. However, the character selection submodule may apply any other suitable method to identify a corner, to distinguish a corner from other types of features and/or to determine the location of the corner.

If a corner is detected at decision block 805, processing next continues at block 860, where the character selection submodule generates a feature object for the corner by characterizing the corner, identifying a related character set associated with the corner and calculating proximity weights for each character in the character set. Typically, a character selection submodule will characterize a corner feature as an intentional feature as described previously, but under certain circumstances dictated by disambiguation parameters (e.g., a low-pressure corner or a mid-trace corner with a lower curvature); the character selection submodule may instead characterize a corner as a incidental feature. Additionally, the character selection submodule may characterize a starting corner feature as a finger-down feature and characterize an ending corner feature as a finger-up feature. Suitable methods for identifying a related character set and calculating proximity weights for a detected corner feature are described in greater detail herein with respect to FIGS. 8B and 8D.

At decision block 820, the character selection submodule determines whether a segment feature is detected in the input data. The character selection submodule may detect a segment and select the location data for a segment feature simply by selecting the X-Y trace data that falls between two adjoining corners (where, again, a "corner" can include an endpoint of the trace). The submodule may also determine whether where the trace is greater than an area of key on the virtual keyboard to indicate a potential segment between two features. However, the character selection submodule may apply any other suitable method to identify a segment, to distinguish a segment from other types of features and/or to determine the location of the segment.

If a segment is detected at decision block 820, processing next continues at block 870, where the character selection submodule generates a feature object for the segment by characterizing the segment, identifying a related character set associated with the segment and calculating proximity weights for each character in the character set. Typically, the character selection submodule will characterize a segment feature as an incidental feature unless otherwise dictated by disambiguation parameters. Suitable methods for identifying a related character set and calculating proximity weights for a detected segment feature are described in greater detail herein with respect to FIGS. 8B and 8E.

At decision block 830, the character selection submodule determines whether another type of feature is detected in the input data. For example, the character selection submodule may identify any hovering or anomalous localized pressure that occurred during an X-Y trace. Examples of other features that the character submodule may detect include: spoken commands (e.g., to select a letter), a second finger tapping the screen during a trace, a moderate change in curvature, and a constant change in curvature (e.g., suggesting a circling motion). If another type of feature is detected, processing continues at block 880, where the character selection submodule generates a feature object for the feature by characterizing the feature, identifying a related character set associated with the feature and calculating proximity weights for each character in the character set. The character selection submodule may characterize the identified feature as an intentional feature if the feature is a clear manifestation of the user's intent to effectuate a particular keystroke. For example, a clearly spoken letter may be characterized an intentional feature.

During the process 800, the character selection submodule may adjust the location of an input feature to offset known peculiarities or trends in a user's input style by evaluating various user-specific disambiguation parameters. For example, the character selection submodule may adjust the position of a tap feature to the left of its actual detected location if the user has a tendency to tap to the right of keys.

Figure 8B:
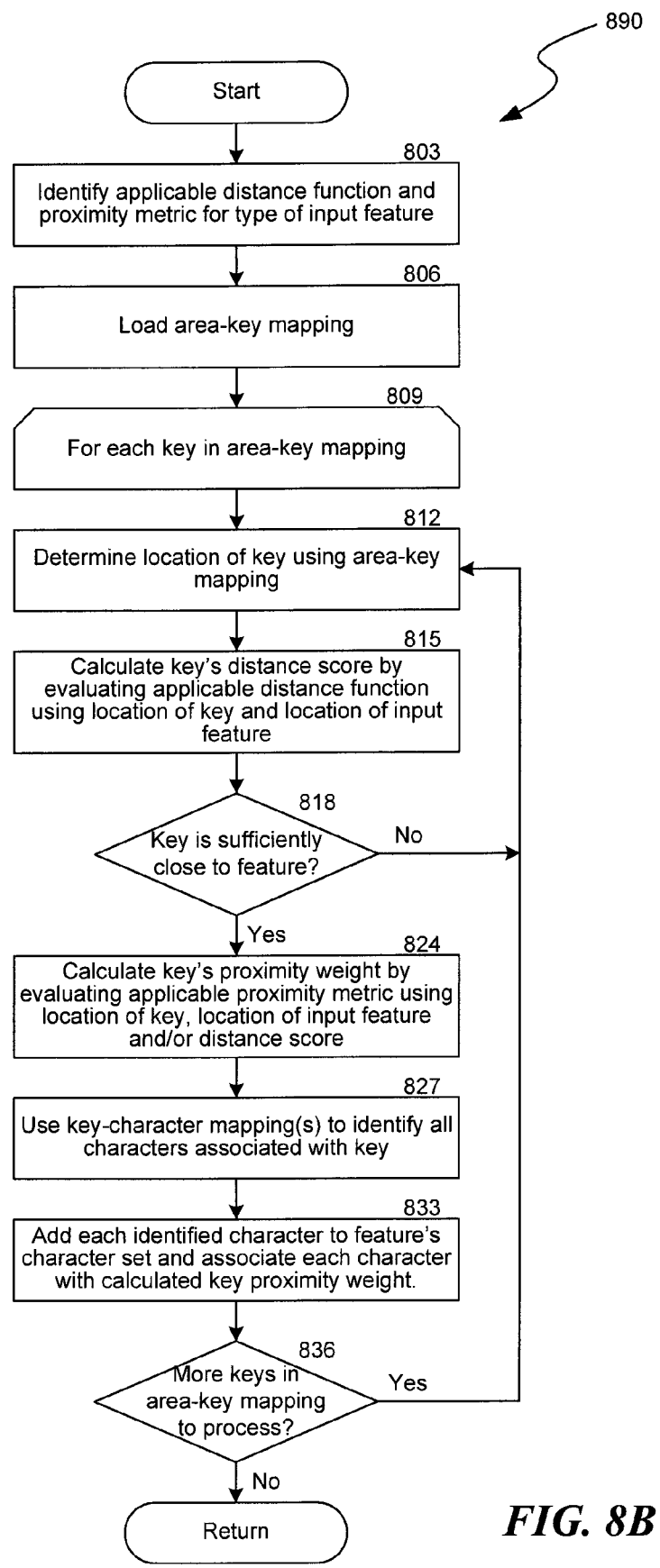
FIG. 8B is a flow diagram illustrating a process to identify character sets and appropriate weights for input features.
Figure 8D:
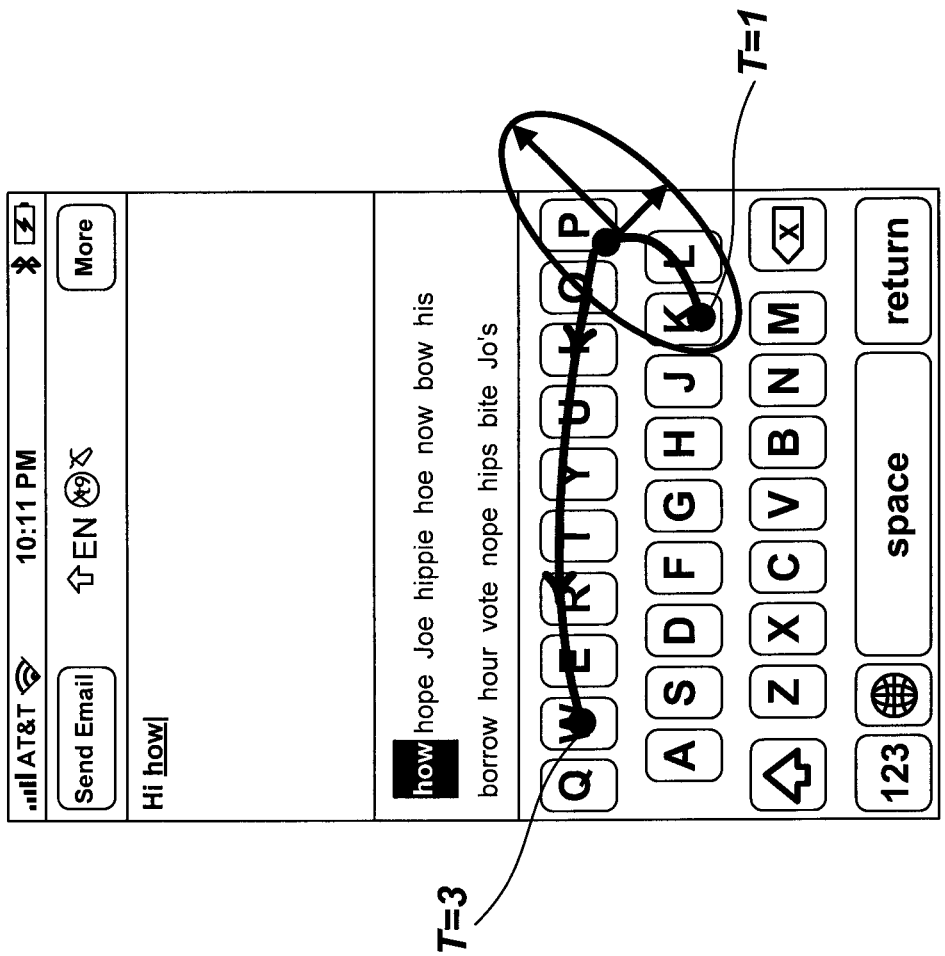
FIG. 8C through BE are screen shots illustrating how a character selection sub-module may identify character sets for different types of input features.
Figure 8C:
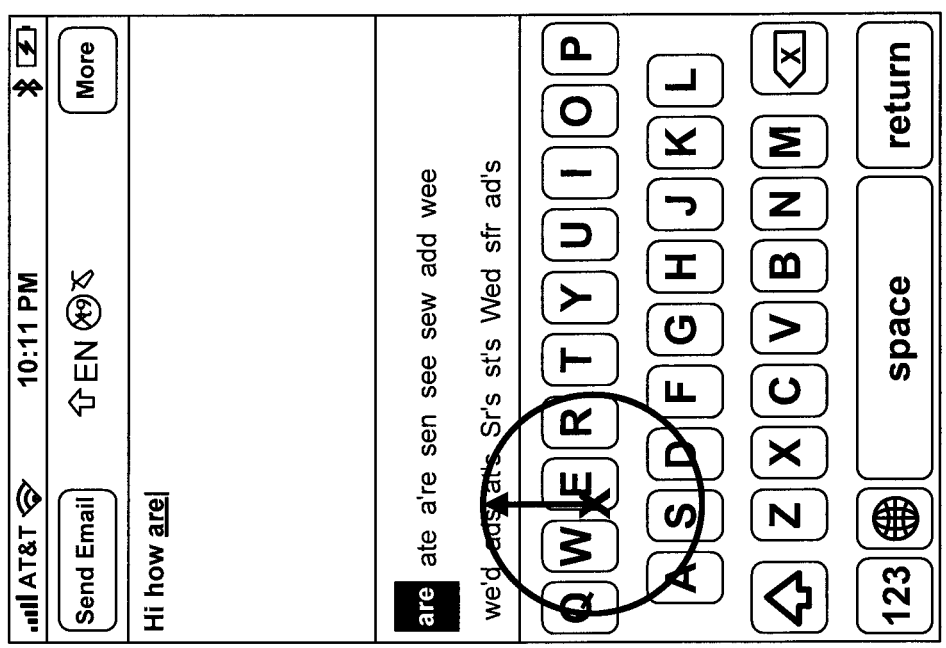

FIG. 8B shows a process 890 for identifying a character set and calculating related proximity weights for an input feature. The process 890 begins at block 803, where the character selection submodule utilizes disambiguation parameters to identify an applicable distance function and proximity metric that should be used for the particular feature type. A "distance function" provides a method of deriving a distance score, which reflects the separation between the location of a particular input feature and the location of a particular key in a virtual keyboard. A "proximity metric" provides a method of deriving a proximity weight. A "proximity weight" reflects the likelihood or probability that a user intended to indicate a particular keystroke by an input feature, based on the separation between the location of the input feature and the location of a particular corresponding key in a virtual keyboard. FIGS. 8C-8E, described below, illustrate various types of distance functions and proximity metrics that may be utilized. One having skill in the art will appreciate, however, that any suitable distance functions or proximity metrics may be employed.

At block 806, the character selection submodule loads an area-key mapping from the keyboard mapping database 622 that reflects the key layout (e.g., 12-key, 28-key, etc.) of the virtual keyboard being displayed to and utilized by the user.

Then, starting at block 809, the character selection submodule performs a loop for each key in the area-key mapping. The loop begins at block 812, where the character selection submodule determines the location of the key by using the area-key mapping, which typically is a language-independent mapping. Next, at block 815, the character selection submodule calculates the key's distance score by evaluating the applicable distance function using the location of the key and the location of the input feature, as described in greater detail herein with respect to FIGS. 8C-8E. At decision block 818, the character selection submodule determines if the key is sufficiently close to the input feature to merit further analysis; to do so, the submodule may evaluate the distance score against a threshold value. If the key is not sufficiently close, the loop repeats starting at block 812. Otherwise, the process proceeds to block 824, where the character selection submodule calculate the key's proximity weight by evaluating the applicable proximity metric using the location of the key, the location of the input feature and/or the distance score as described in greater detail herein with respect to FIGS. 8C-8E.

At block 827, the character selection submodule uses one or more key-character mappings to identify all characters associated with the key, even characters that may not be displayed to the user on the virtual keyboard (e.g., an accented letter). The submodule may determine which key-character mappings to use at block 827 by evaluating various flags (e.g., a keyboard selection flag), dynamic context information (e.g., a user's language settings received from the operating system), user preferences, and/or disambiguation parameters. For example, the submodule may receive an indication that the user interface has a full QWERTY keyboard with a French character layout, and may use this information to select a suitable key-character mapping. The character selection submodule may utilize more than one key-character mapping at this block (e.g., to accommodate a multi-lingual user who may wish to continuously enter text without switching between different on-screen character layouts).

At block 833, the character selection submodule adds each character identified at block 827 to the feature object's character set and associates each identified character with the calculated key proximity weight. At block 836, the character selection submodule determines if there are more keys in the area-key mapping to process. If so, the loop repeats starting at block 812, otherwise the process 890 returns.

FIG. 8C conceptually illustrates suitable distance functions and/or proximity metrics that may be suitably employed with tap features. FIG. 8C indicates a tap feature 882 located at a point (shown with an "X") on the "E" key of a virtual, displayed QWERTY keyboard. In some implementations, both the distance function and the proximity metric are piece-wise step functions. In one example, the distance score for a key is zero if any part of the key (or alternatively, all of the key) falls within a circle 881 of radius R, where R may be determined at least in part using disambiguation parameters (including, for example, parameters that may be adjusted to reflect a user's input style and parameters related to a keyboard layout such as the average key size and/or average key separation). In this example, the distance function has a maximum value for all other keys falling outside the radius. In this example, for the tap 882 shown, the A, W, S, E, D, R (and possibly T) keys would have a 0 distance value (or other minimum value), and all other keys would have a maximum distance value. In another example, the distance score for a key is zero (or minimum) if the tap point 882 falls directly on the key, is an intermediate value if some (or alternatively, all) of the key falls within a circle 881 of radius R, and is a maximum value for all other keys outside the circle 4881. In this example, for the tap 882 shown in FIG. 8C, the E key would have zero distance score, the A, W, S, D, R (and possibly T) keys would have an intermediate value, and all other keys would have a maximum value. In yet another example, the distance function for a key is the Cartesian distance from the tap feature 882 to a point on or in the key (e.g., its centroid, the closest point on its perimeter, etc.). In these examples, a proximity metric for a key may be defined as the maximum value of the distance function (or another maximum value) minus the distance score of the key. However, one having skill in the art will appreciate that any other suitable higher-order distance functions and/or proximity metrics may be employed and that the proximity metric need not directly employ a key's distance score. The techniques described for tap features may also be suitably employed for other finger-on and/or finger-off features (e.g., corner features that either start or end a trace).

FIG. 8D conceptually illustrates suitable distance functions and/or proximity metrics that may be suitably employed with corner features, and may be particularly well-suited to non-terminal corner features. During a trace, as a user approaches a corner 883, there may be a tendency for the user to either overshoot and/or overshoot his intended corner key. Whether a user overshoots or undershoots during a given trace may be a function of the handedness of the user, the shape and/or layout of the keyboard, the direction of the trace, the velocity or acceleration as the user approaches the corner, the shape of the user's hand, the user's ability to visually discern the keyboard layout as he approaches the corner key (it may be obstructed by his hand), the degree of curvature of the trace at the corner, and other factors. These factors may also affect precisely how the user overshoots or undershoots (e.g., whether they overshoot in the x-direction, the y-direction, how far they overshoot, etc.).

FIG. 8D conceptually illustrates how distance functions and/or proximity metrics may compensate for a user overshooting or undershooting an intended key. FIG. 8D shows how an ellipse 884 or oval area (or similar asymmetric shape) at an internal corner feature 883 may be utilized to implement piece-wise distance functions analogous to the piece-wise distance functions described previously with respect to FIG. 8C. The precise shape and orientation of the area may be chosen to correct for overshoot or undershoot that is caused by the factors just described. For example, in one implementation, the major axis 888 of an ellipse 884 may be chosen to parallel the velocity vector of the user's finger just before it reaches the corner 883, when it reaches the corner or shortly after it turns the corner. Additionally, the length of the major axis 888 may be chosen to increase in proportion to the magnitude of the velocity vector at one of these points and/or to otherwise reflect the factors described previously (e.g., the sloppiness of the user). Similarly, the length of the minor axis 889 may be chosen to reflect the factors described previously.

Figure 8F:
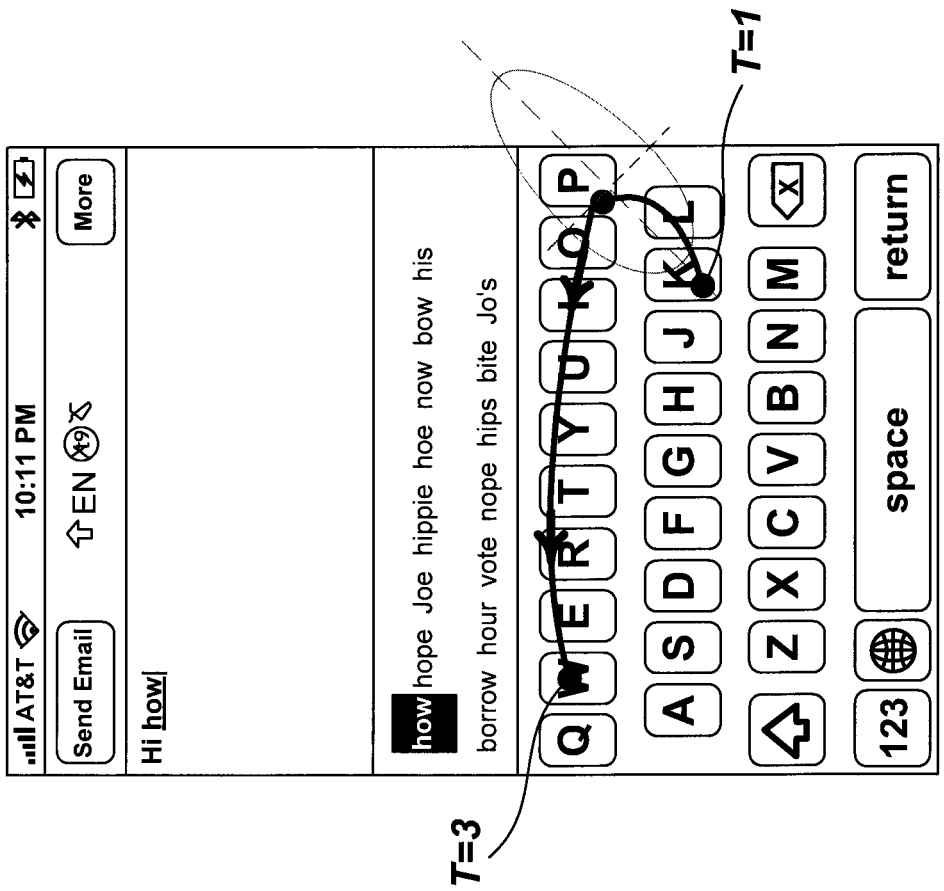
Figure 8E:
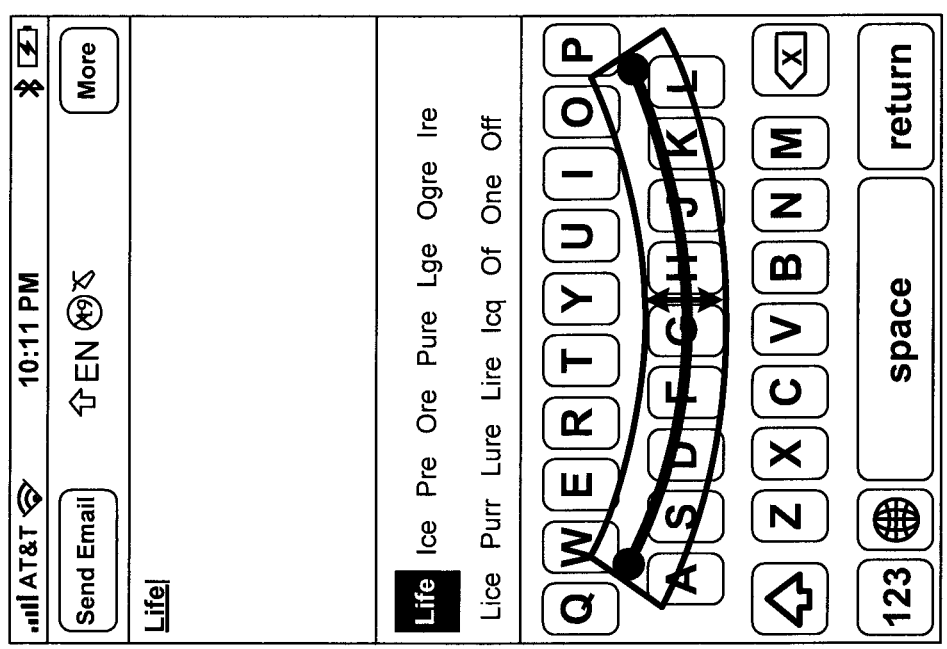

As shown in FIG. 8F, a different type of asymmetric shape may also be utilized, such as an ovoid shape, which comprises two half-ovals, each having its own major axis and minor axis. The directions, and absolute and/or relative lengths of the two major axes may be a function of the velocity of the user's fingers (both magnitude and direction), the handedness of the user, the sloppiness of the user, and/or the other factors described previously. In one implementation, the major axis of a half-ellipse may be chosen to parallel the velocity vector of the user's finger just before it reaches the corner, when it reaches the corner or shortly after it turns the corner. The axes may be chosen in part to correct for an obscured view that is dependent on the handedness of the user and their direction of movement. For example, a right-handed user moving to the right has less visibility of keys to the right of his finger (e.g., than a left-handed user moving in the same direction), which causes increased uncertainty in judging his intent to strike a key on the right side of a corner. In the example shown in FIG. 8F, the ovoid is longer on the right side of the keyboard to compensate for a right handed user's more obstructed view of some keys as he approaches from the bottom left. The minor axes of the two half-ovals in the ovoid may also be chosen to reflect the factors described previously; the two half-ovals may have minor axes of different lengths, with the longer axis being located to the right in the example above.

Similar to the methods described previously with respect to FIG. 8C, keys that fall (either fully or partially) within the asymmetric shape (e.g. ellipse 884 or the ovoid of FIG. 8F) may be assigned a lower distance score (and/or higher proximity weight) than shapes outside the asymmetric shape. As another example, if a corner point 883 falls on a key, that key may be assigned a minimum distance score, keys within the asymmetric shape may be assigned an intermediate distance score, and keys outside the asymmetric shape may be assigned a maximum distance score. In yet another example, the distance function for a key is the Cartesian distance from the corner feature 483 to a point on or in the key (e.g., its centroid, the closest point on its perimeter, etc.). Also, the proximity weight for a key may be chosen by subtracting the key's distance score from the maximum possible distance score.

FIG. 8D has primarily described piecewise distance functions and proximity metrics for corner features. However, any other suitable higher-order distance functions and/or proximity metrics may be employed (including higher-order distance functions and/or proximity metrics that correct for overshoot or undershoot factors) and that the proximity metric need not directly employ a key's distance score.

FIG. 8E conceptually illustrates distance functions and/or proximity metrics that may be suitably employed with segment features. Here, a piece-wise distance function and/or proximity metric may be defined using an irregular area 885 defined by all points falling within a particular perpendicular distance from the trace line of the segment feature 886. The maximum distance utilized to define the area may be determined at least in part using disambiguation parameters (including, for example, parameters that may be adjusted to reflect a user's input style and habits). In a first example, all keys that fall partially (or alternatively, wholly) within the irregular area 885 may receive a minimum distance score (and/or maximum proximity weight) and all other keys may receive a maximum distance score (and/or minimum proximity weight). In a second example, keys that are directly intersected by the segment feature 886 may receive a minimum distance score (and/or maximum proximity score), other keys that fall partially (or alternatively, wholly) within the area may receive an intermediate distance score (and/or maximum proximity score), and all other keys may receive a maximum distance score (and/or minimum proximity score). One having skill in the art will appreciate that any other suitable higher-order distance functions and/or proximity metrics may be employed, including higher-order functions and metrics that utilize the perpendicular distance of a key to the trace line.

Figure 9A:
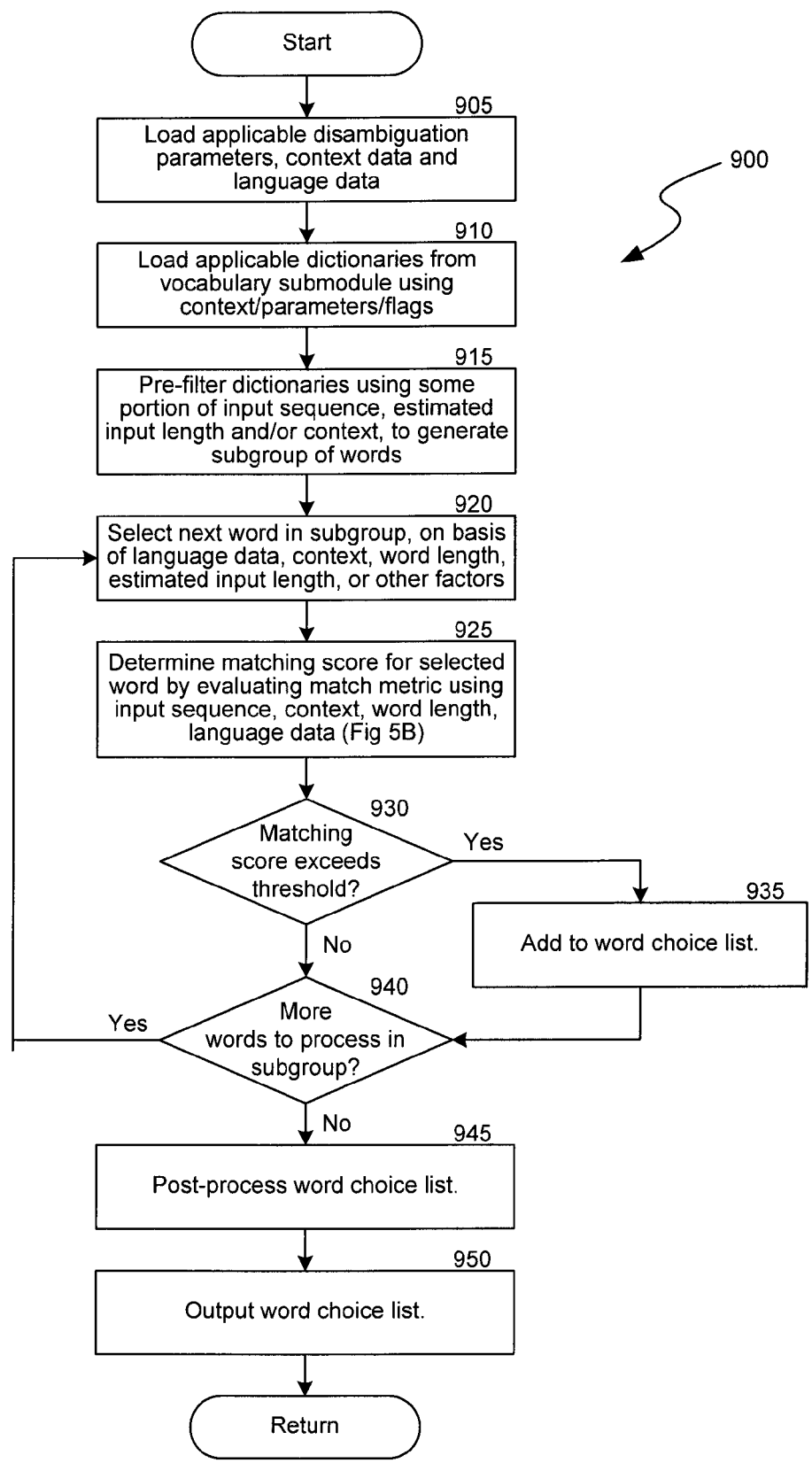
FIG. 9A is a flow diagram illustrating a process to generate a word choice list.

FIG. 9A shows a process 900 for creating a word choice list using an input sequence of feature objects. The process 900 begins at block 905, where the word list selection submodule loads or receives applicable disambiguation parameters; context data, including semi-static context data retrieved from the user context database and application context database and dynamic context data received from an operating system and/or application program; and language data, including, e.g., frequency data from a vocabulary module, user context database, and/or application context database. At block 510, the word list selection submodule ("word submodule" for short) loads applicable dictionaries from the vocabulary submodule using the context data, disambiguation parameters, and/or any flags (e.g., language selection flags). For example, the dictionaries used may be selected on the basis of the type of application program that will receive the output of the disambiguation module. As another example, the dictionary used may be generated by analyzing the user's speech using voice recognition software or by analyzing another mode of user input. For example, the dictionary may be an N-best list generated by voice recognition software, handwriting recognition software, etc.

At block 915, the word submodule may pre-filter the dictionaries using some portion of the input sequence, the estimated input length L and/or the context to generate a subgroup of words. As a first example, the word submodule may pre-filter the dictionary on the basis of whether a word matches the first "finger-up" feature and/or the last "finger-down" feature (described previously), since these features provide possibly the strongest indication of the user's intent to effectuate a particular keystroke. As a second example, the word submodule may pre-filter the dictionary on the basis of estimated input length L. For example, the word submodule may filter out any words that are shorter than L minus X, where X is determined using disambiguation parameters. As a third example, the word submodule may pre-filter the dictionary to a list of words generated by voice recognition software. As a fourth example, if the dynamic context indicates that the user is typing in a name field, it may filter the dictionary to only include proper nouns. Of course, the word submodule may use a combination of these filtering techniques.

At block 920, the word submodule selects the next word in the subgroup on the basis of language data, context, word length, and/or any other suitable factors. For example, the word submodule may sort the subgroup on the basis of frequency of use and present these words in that order.

Figure 9B:
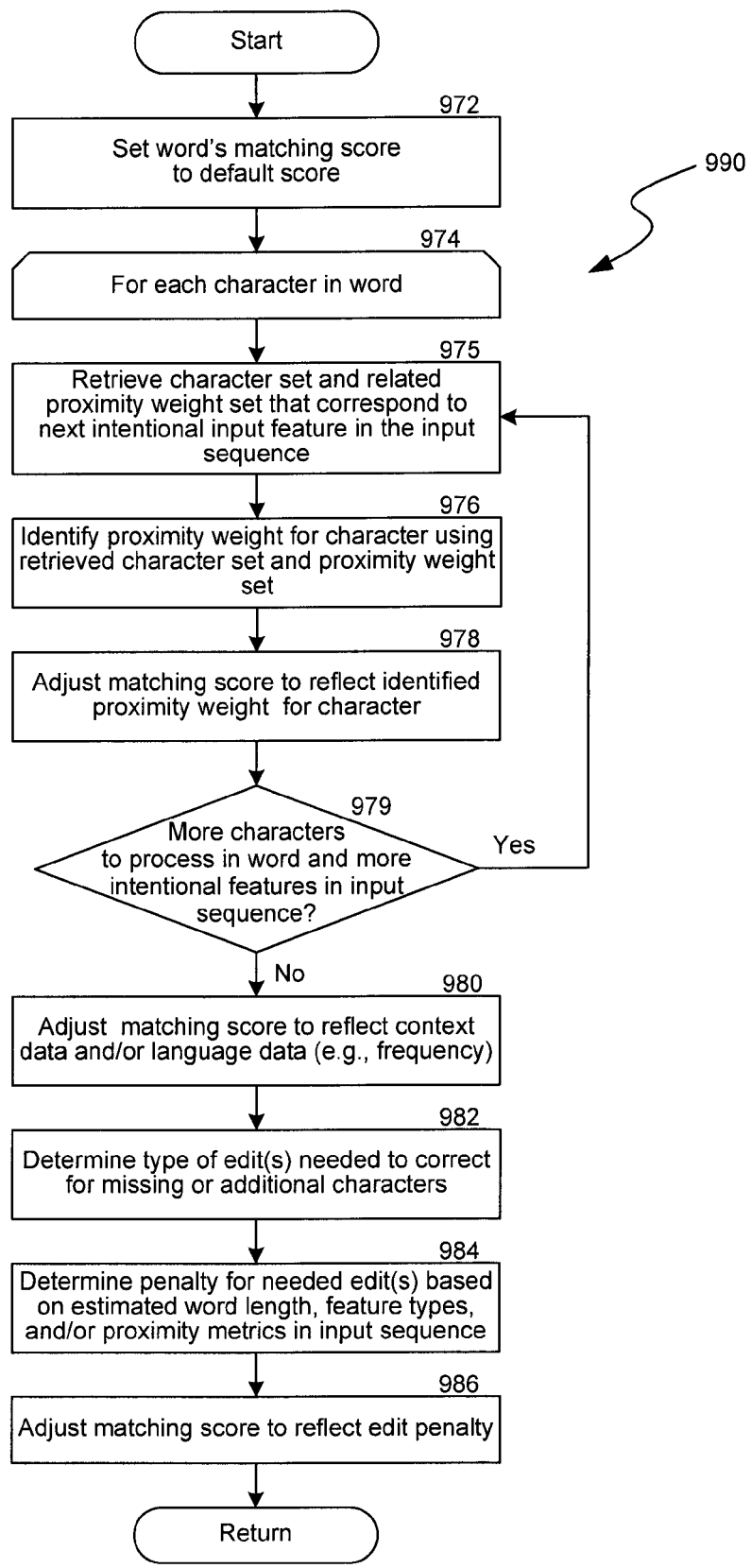
FIG. 9B is a flow diagram illustrating a process for calculating matching metrics for words.

At block 925, the word submodule determines the matching score for the selected word by evaluating a match metric using input sequence, context, word length, and language data. A suitable method for determining a matching score using a match metric is shown in FIG. 9B.

At decision block 930, the word submodule may determine if the word has a matching score that exceeds a minimum threshold value that is determined using disambiguation parameters. If it does, the word is added to the word choice list at block 935 before the process proceeds to block 940. Otherwise processing proceeds directly to block 940. The word submodule may eliminate poorly matching words and provide a word list of fixed or minimum size. Alternatively block 930 may be eliminated from the word submodule.

At block 940, the word submodule determines if there are more words to process in the subgroup. If there are, the processing returns to block 920 so that another word may be evaluated.

Otherwise, the process proceeds to block 945, where the word choice list is post-processed. For example, the word submodule may sort the list by matching score and/or by selecting one or more default words that have the highest matching score. As another example, after sorting, the word submodule may group or adjust the ordering of words in a logical fashion to facilitate improved user browsing behavior. For example, the word submodule may rearrange the list to group together words that have the same root (e.g., "interest," "interesting," and "interestingly") to permit a user to scan the word choice list more rapidly. As yet another example, dynamic or static context data may be utilized at block 950 to adjust the list, e.g., to promote or demote particular words in the list and/or to otherwise adjust the order of the list. For example, if a user has utilized a particular word in the same application program before, that word may be promoted. As another example, the word submodule may promote words that end with a punctuation mark over words that have embedded punctuation marks. As yet another example, if more than one language dictionary was utilized to generate a word list or the disambiguation module is otherwise providing bilingual integration (e.g., to accommodate a bilingual user), the post-processing may promote words in the primary language of the user and/or demote words in a secondary language of the user. The "primary language" of the user may be determined by language parameters or flags and/or by user context data from the user context database 626.

As still another example of post-processing, the disambiguation module may promote or demote particular words based on application-specific field information and/or rules or grammar retrieved from the application context database.

In another example of post-processing, the disambiguation module may determine whether the user is attempting to utilize a word that may not be listed or found in a standard dictionary, such as neologism like "podcast," or an uncommon proper noun. If it determines, based on typical character sequences in a language that the user may be attempting to enter an "unlisted" word that does not appear in the dictionary, it will make the unlisted word the default word, and provide the word choice list as an alternative suggestion. Otherwise, it may utilize a high-scoring word selected from the dictionary as the default word.

To illustrate, if the user crisply taps out the letters "podcast," the disambiguation module may keep "podcast" as default word, despite the fact that it may not be in a standard English dictionary, since the character sequences (the combinations of "po," "ca," and "st," etc.) are frequently seen in the English language. On the other hand, if the user crisply taps out the letters "Pfsx," the disambiguation module may assume that the user has made a misspelling (or typed sloppily) and will not select "pfsx" as the default word, since the combinations of "pf" "fs" and "sx" are all infrequently seen in the English language. Instead the disambiguation module will select a dictionary word with a high matching score found during blocks 905-940.

To make this determination, the disambiguation module may first generate a "stroke sequence" by selecting, for each intentional feature (e.g., tap) in the input sequence, the associated character that has the best proximity score. Next, the disambiguation module may evaluate the composition of the stroke sequence by using a table or database within the vocabulary module 624 that provides the probabilities or frequencies of various character sequences (character bigrams, 3-grams, 4-grams, ... n-grams, etc.) in a given language (or other logical group of words) to derive a composition score. The composition score may be the product of various probabilities/frequencies of bigrams/etc., or another higher-order function of the various probabilities/frequencies. If the composition score exceeds a threshold value, the disambiguation module may use the stroke sequence as the default word. In some implementations, the stroke sequence may be defined using a different subset of the input sequence (e.g., tap features only, not corners).

At block 950 the word choice list is output to the user, e.g., via a word choice list area on a display or otherwise. Alternatively, the word choice list and/or a default word may be provided to another process (e.g., an application program) that does not need user intervention to select a word.

FIG. 9B shows one suitable process 990 for calculating a matching score for a word using a matching metric. Any matching metric or algorithm may be utilized to generate a matching score, and that the disclosed technology is not limited to those particular examples described below.

The process 990 begins at block 972 when the word submodule sets a word's matching score to a default score, which may be a unity value of 1. A loop for each character in the word then begins, as shown at block 974. At block 975, the word submodule retrieves the character set and related proximity weight set that corresponds to the next intentional input feature in the input sequence, or if this is the first iteration of the character loop, the first intentional input feature in the input sequence. For example, the word submodule retrieves the character set and proximity weights associated with the next tap or corner feature in the input sequence.

At block 976, the word submodule identifies the proximity weight for the character. To do so, the submodule determines whether the character appears in the retrieved character set, and if it does, it uses the retrieved proximity weight associated with the character. Otherwise, if the character does not appear in the retrieved character set, the submodule may use a default proximity weight (e.g., a low weight) specified by a disambiguation module, terminate the loop 974, or end the process 990 by returning a default matching score (e.g., a score of zero or other default matching score).

At block 978, the word submodule adjusts the matching score to reflect the identified proximity weight for the character. In one example, the submodule adjusts the matching score by multiplying it by the retrieved proximity weight. However, the matching score may be adjusted in any manner to reflect the retrieved matching score. For example, the previous matching score and the retrieved proximity weight may combined by any suitable function including simple addition, a weighted summation, multiplication, division, and higher order functions etc.

At decision block 979, the word submodule tests whether there are any more characters to process in the word and whether there are more intentional features in the input sequence. If both conditions are satisfied, the character loop repeats starting at block 975. Otherwise the process proceeds to block 980.

At block 980, the word submodule adjusts the matching score to reflect context data and/or language data (e.g., frequency of use). In one implementation, the word submodule scales the matching score by the frequency of use. As another example, the word submodule may increase a matching score based on context data, for example, the matching score may be increased if the user has utilized the same word in the same type of data field and/or the same application. As yet another example, if the surrounding sentence context (e.g., previous words entered by the user) suggests that the word is more or less likely, the matching score may be adjusted upward or downward. These examples are not intended to be exhaustive. The previous matching score may be adjusted in any suitable manner (e.g., via higher order functions) that reflects how the context and/or frequency of use increases or decreases the likelihood that the word was the intended entry of the user.

At block 982, by utilizing known edit distance techniques, the word submodule determines the type of edits needed to match a character sequence reflected in the intentional features of the input sequence. For example, the word submodule may determine what characters would need to be added to the word, or what characters would need to be removed from the word so that it would match a sequence of characters reflected in the sequence of intentional features.

When determining the types of edit(s) needed, the word submodule may only attempt to match a first portion of the word against the intentional features in the input sequence. For example, the word submodule may ignore any mismatches that occur after the Lth character in the word, where L is the estimated input length. The cutoff point could alternatively be chosen as L−1, L+2, L+3, etc. In this way, the word submodule improves the chances that a longer word having a good initial match to the user's initial input will be returned.

At block 984, for each edit needed, the word submodule determines an edit penalty based on the estimated input length and the input sequence, including the feature types reflected in the input sequence and the proximity weights. As utilized herein, a "low penalty" is one that is lower than a standard or default penalty assessed by a standard edit cost function for a similar edit.

As a first example, the word submodule may assign a zero or low penalty for character changes needed after a first portion of the word. For example, there may be no penalty or a low penalty assessed for character changes needed after the Lth position in the word. This technique similarly improves the chances that a longer word that has a good initial match to the user's initial input will be returned.

As a second example, the word submodule may assign a zero or low penalty for character additions or deletions involving characters that are reflected by the full input sequence, including both intentional and incidental features. For example, if the only difference between the word and the input sequence of intentional features is a missing "E" between the third and fourth intentional features, the word submodule may assign a zero or low penalty if an "E" character appears in a character set associated with an incidental feature (e.g., a segment) that falls between the third and fourth intentional features in the input sequence. In some implementations, the penalty assessed may be a function of the proximity weight associated with the missing character. To illustrate, returning to the previous example, if the segment feature that provides the missing "E" cuts directly through the center of the E key (i.e., the proximity weight for the E character is near its maximum possible value), the penalty assessed may be lower than if the segment runs further away from the E key. By reducing or eliminating edit penalties in these circumstances, the word submodule permits a user to indicate her selection of a letter simply by tracing through the letter.

As a third example, the word submodule may assign a zero or low penalty for character additions or deletions caused by repeating characters or repeating keystrokes. Stated another way, there is a no penalty or lower penalty assessed if the word would match the input sequence if only one or more input features were repeated (one or more times) within the sequence. By reducing or eliminating edit penalties in these circumstances, the word submodule permits a user to indicate her selection of a word that has repeating characters or repeating keystrokes with a reduced number of input features. If a low penalty is assessed, it may be a function of the type of input features that would need to be repeated (e.g., intentional vs. incidental), the number of times each feature would need to be repeated, and/or the proximity metrics associated with the repeated input features. To illustrate, if the word is "WEED" and only difference between the word and the input sequence of intentional features is that the second "E" is missing between the second and third intentional features, the word submodule may assign a zero or low penalty.

As a fourth example, the word list selection submodule may assign a zero or low penalty for character changes that reflect the addition or deletion of punctuation marks and/or similar symbols.

At block 986, the word submodule adjusts the matching cost to reflect any calculated penalties. In some cases, the penalty is subtracted from the matching score. However, in other implementations, higher-order adjustments may be utilized. Then the process 990 returns.

IV. Application to Security Systems

In accordance with another aspect of the disclosed technology, a password or other text entry system and method are provided that allow a user to leverage the familiarity with QWERTY keyboard (or other common keyboard layouts).

This password or other text input is achieved by providing the user with preferably nine, or other appropriate number of defined zones, each anchored by a distinct key that acts as a zone output key. When the user selects one key from a particular zone, the zone output key of the selected zone is considered as having been selected. Thus, while a user is able to enter a password on a standard keyboard in a standard manner, depending on the zone definitions, a sequence of zone output keys will be output representative of the input password. If a receiving device is aware of the zone definition used when generating the sequence of output keys corresponding to the input password, the receiving device is able to decipher the sequence of output keys to determine whether the proper password has been entered.

A plurality of zone definitions may be available. Thus, by transmitting a zone definition identifier and sequence of zone output keys, a receiving device, that is aware of the plurality of zone definitions and identifiers associated therewith, can properly interpret the transmission while maintaining the security of the password.

Additionally, the zone definition need not necessarily include keys that are contiguous with each other. By defining non-contiguous zones, the user must be more accurate in key entry, but the difficulty for a hacker or other thief in breaking the code may be greatly increased, and the number of possible available zone definitions is similarly greatly increased.

Additionally, rather than using only a standard keyboard for text entry of the password characters, characters may be input using directional input on a joystick, 4 or 8 directional keypad (such as the ones found in TV remote control, telephones and mobile phones), various combinations of numeric keys on such a remote control or other available numeric keypad, or pointing functionality of such a remote control or other device, such as a Nintendo® Wii® remote or other wand like input device, body movement entry solutions, or the like. When using such a non-traditional input device, the user may move the joystick or other device in the direction of a desired key to be input. When performing this movement, rather than moving between keys, the selector moves between adjacent zones of keys, all keys contained in the zone moved to will be selected, and a zone output key associated with that zone may be further delineated. Thus, when a key is desired to be selected, a joystick or the like may be used to move to a zone that contains the desired key. By selection of such a zone, the associated zone output key may be presented as part of the output sequence of characters. By way of example, if the user wishes to select the letter "R" as part of a password, movement to a zone containing the letters R, T, Y, U, and I, and using Y as a zone output key, selection of such a zone causes the letter "Y" to be output as part of the output stream. In addition to providing a coded password transmission, a user need only select between the number of zones, and not be as precise as selecting each individual key in that selection of any key in a particular zone will result in the same zone output key being output as part of the password data stream.

The disclosed technology is also applicable to any keyboard configuration, and language, and any other symbol grouping. Furthermore, the zones assigned to an input device need not be visible to a user, rather only working to encrypt the data to be transmitted in the background.

Figure 10:
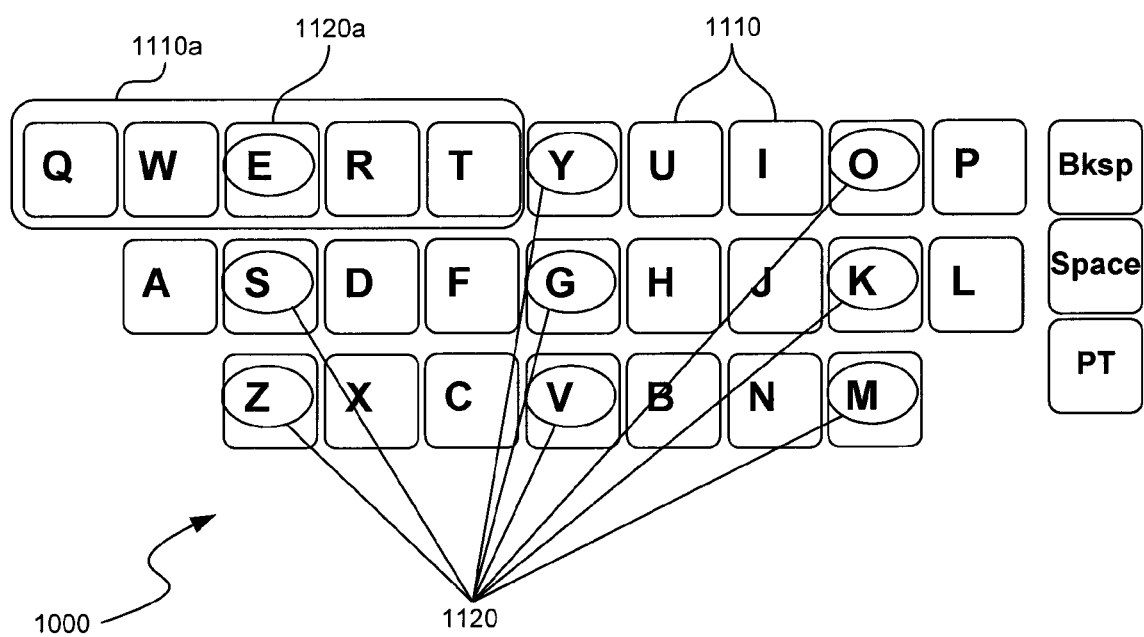
FIG. 10 is a graphical representation of a displayed keyboard, including zone output keys and a selected zone, constructed in accordance with an embodiment of the disclosed technology.

Referring first to FIG. 10, a first embodiment in accordance with the disclosed technology is shown. In FIG. 10, a keyboard, designated generally at 1000, is provided with a plurality of keys 1110. In this depicted embodiment, a 26 letter QWERTY keyboard is shown. It should be understood by one of ordinary skill in the art that other keyboard configurations are available, including but not limited to other arrangements of the 26 English letter alphabet, arrangements of any other character set for use in other languages, any combination of numbers and/or letters, or any other desired combination of symbols of any kind. A predetermined number of these keys 1110 are also designated as zone output keys 1120. In the depicted embodiment, there are nine such zone output keys, although any desired number may be employed. Each zone output key 1120 is associated with a zone comprising one or more letter keys associated therewith. As is further shown in FIG. 10 by way of example, the "E" key, designated as 120*a* represents the zone output key for a zone comprising the "E" key, and the other letter keys "Q", "W", "R", and "T", collectively designated at 1110*a*. Thus, any time a user is interested in selecting any one of the five keys in this zone (1110*a* or 1120*a*), the zone output key "E" will be the selected output key to comprise part of the output data stream representing the selected password or other text. While it is anticipated that each zone output key may be associated with a predefined, unique set of keys 1110, it would be possible to have the zones overlapping, and indeed include one or more keys 1110 in one or more zones.

Furthermore, while it is contemplated that all of the available symbol keys, in this case letters, be included within at least one zone, this need not be the case. Indeed, any particular key or keys may be left alone, requiring direct user selection. Such a configuration may be desirable for rarely-used keys, or keys with special significance.

As can be understood from this description referring to FIG. 10, a user experience is eased as a user need not be as accurate when choosing a key entry, and indeed only has, in this particular depicted embodiment, nine zones to choose from, rather than a more traditional 26 letters. In the particular embodiment as depicted in FIG. 10, a user interface might utilize a joystick with eight directional movement, and a center home position, each available position corresponding to a zone output. Alternatively, a remote control or other device with a nine number keypad may be employed, each number corresponding to one of the zone output keys. Of course other configurations, including a joystick with less directional movement or a track ball with more, the same, or fewer degrees of freedom may be employed thus allowing a user to directionally move between zones. While requiring less hardware and learning, such a configuration may require two or more jumps when moving from one zone to another situated remotely on the input keyboard as movement may be limited to jumping between adjacent zones. Alternatively, it may be possible to provide a scenario where a cursor or other pointer returns to a "home" or other designated zone or location after each letter entry. This feature has its benefits and drawbacks, providing a known start point for each text entry, but requiring multiple movements for double letters, etc.

When employing the eight direction joystick as noted above, the user can move between the zones through movement of the joystick. Two or more schemes are possible. In a first, a valid movement of the controller may be Up, Down, Left, Right, Up-Right, Up-Left, Down-Right, and Down-Left. These eight distinct movements allow the user to quickly move between the zone output keys on the keyboard, moving from zone to zone. A similar scheme may be employed with a less versatile four direction joystick. Without diagonal movements available, however, more jumps may be necessary for moving from one zone to another. In a second scheme, each of the eight directional keys and a central "neutral" position may each correspond to the zones, allowing a user to directly access each of the zones without having to navigate from one to the other. Alternatively, when, for example, a nine key number pad is provided, each number may correspond to a particular zone.

While a most common option would be for these keys to be assigned to various zones based upon corresponding locations, in an alternative embodiment of the disclosed technology, it is possible to configure the zones in any contiguous or non-contiguous manner as the zone location will likely not affect the user experience, if the user is actually entering the password keys, rather than simply selecting one of a number of zones, but the available multiple zone configurations will assist in protecting the security of the input password. In either of these entry situations, it is not necessary that the zones be visible to a user. Rather, a user may be prompted to enter a password as normal on a keyboard. Background processing may assign a zone definition (as will be described below) and prepare a data output stream to transmission.

Figure 11:
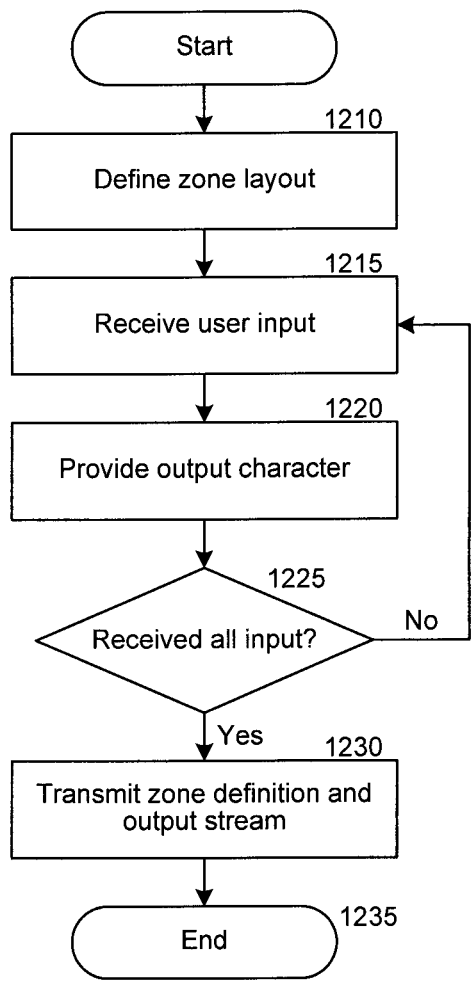
FIG. 11 is a flowchart depicting entry of a password by a user in accordance with an embodiment of the disclosed technology.
Figure 15:
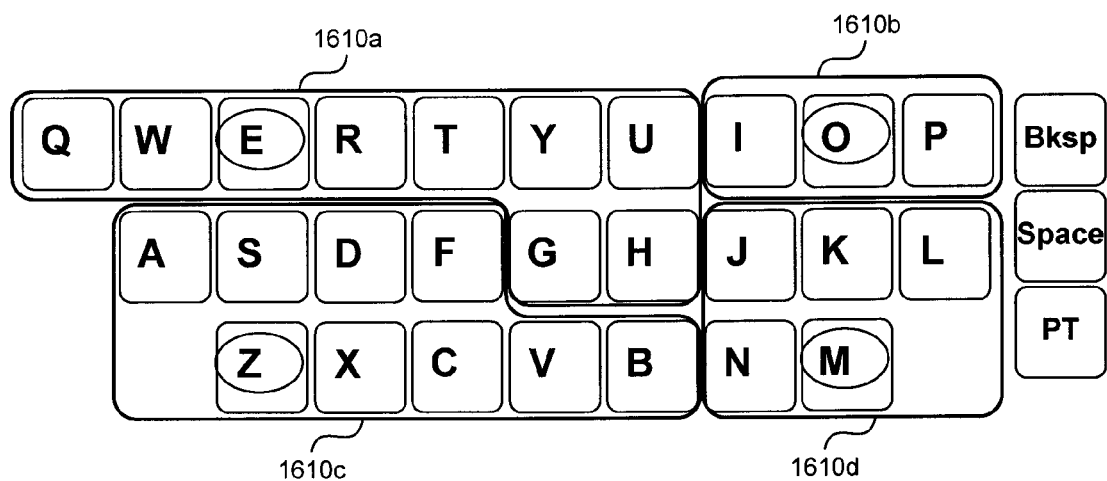
FIG. 15 depicts a reduced zone configuration in accordance with the disclosed technology.
Figure 16:
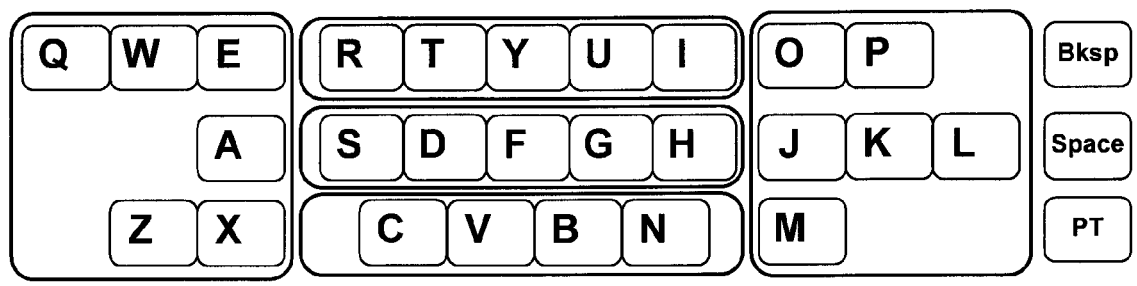
FIG. 16 depicts an alternative zone definition scheme in accordance with an alternative embodiment of the disclosed technology.

Referring next to FIG. 11, steps used in accordance with an embodiment of the disclosed technology will be described. First in step 1210, a zone definition must be determined. Thus, the keys of the keyboard are assigned to a predetermined number of zones. These zones may be contiguous or non-contiguous. Examples of different possible zone configurations can be seen in FIG. 15 (see zones 1610*a-d*) and 16, in addition to FIG. 10. It should be noted that the use of, for example four zones as shown in FIG. 15 will result in an easier input experience for the user as they will need only to select between four zones. The system, however, may require a longer password to be utilized in such a situation so that different passwords may be more likely to generate different sequences of zone output keys. Of course, other configurations may be employed. In accordance with the disclosed technology, a plurality of such zone configurations may be defined, and thus the apparatus at step 1210 may select from one of the predefined zone layout definitions.

Once the zone definition has been selected, a user may start to enter characters that comprise the password. Such an input character is received at step 1215. At step 1220, the zone output key associated with the zone comprising the key selected by the user is defined as the output character associated with the input character. This output character is then provided as a first character to the eventual output data stream to be transmitted. Then processing passes to step 1225 where it is inquired whether all input characters have been received. If this inquiry is answered in the negative, and it is therefore determined that not all of the desired input characters have been received, control returns to step 1215 and a next input character is received.

If, however, the inquiry at step 1225 is answered in the affirmative, and it is therefore determined that all desired input characters have been received, then control passes to step 1230, where the utilized zone definition and generated output data stream representing the input password is transmitted to a receiving device. Processing then ends at step 1235. While the embodiment has described transmitting the zone layout definition along with the output data stream, such zone layout definition may be transmitted separately. It is contemplated that such zone layout definition preferably not comprise a complete listing of zones, but rather a zone definition indicator, thus allowing a receiving device to select from one of a plurality of predefined zone layout definitions. In such a manner, only such an otherwise meaningless indicator is transmitted, thus not giving away the zone layout and increasing the security of the system. Further, it is possible that no zone definition is transmitted, and that the transmitting and receiving devices are synchronized and simply cycle through a predetermined number of zone layout definitions in a predetermined manner. Further, it may be possible to use any other indicator or the like to enter into an equation, algorithm, or the like to select from the plurality of zone layout definitions, as long as both the transmitting and receiving devices are able to process the same algorithm to them utilize the same zone layout definition for both generation and interpretation of the password.

Figure 12:
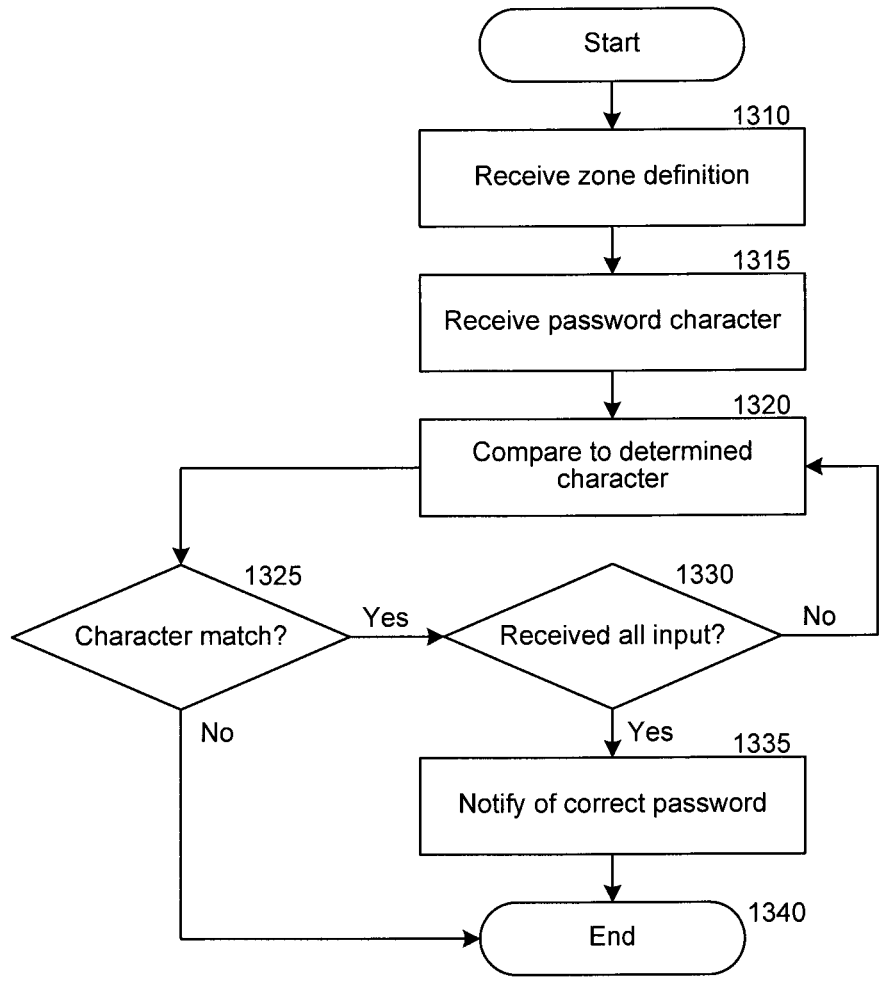
FIG. 12 is a flowchart diagram depicting receipt of a password at a receiving device in accordance with an embodiment of the disclosed technology.

Referring next to FIG. 12, a receiving device first receives the transmitted zone layout definition (or uses one of the methods noted above to determine the correct zone layout definition to employ). Processing then passes to step 1315 where the receiving device receives the first character of the transmitted data stream, including the output data stream representing the input password. This received character is then compared to a zone output key of a zone containing an expected password character. At step 1325, if it is determined that these characters do not match, then processing ends at step 1340. If it is determined that these characters match, then processing passes to step 1330 where it is determined whether all password characters have been received. If all of the password characters have not been received, processing passes back to step 1315 to receive a next password character.

If it is determined at step 1330 that all of the password characters have been received, then processing passes to step 1335 where the system recognizes that a valid password has been entered, and the user is so notified. Processing then ends at step 1340. Therefore, in accordance with the charts displayed in FIGS. 11 and 12, a system of a transmitting device and a receiving device can confirm a user password from one to the other without actually transmitting each actual password character, thus maintaining the security of that password.

In an alternative embodiment of the disclosed technology, it may be possible to provide two consecutive zone definitions that divide the keyboard in a manner so that upon entry of a password twice by a user, the system transmits zone indications for the two different zone definitions allowing for particular notification of the selected keys at the receiving end, even if the keys themselves. For example, if the letter "A" is first associated with zone 1, and then in a second zone definition is the only letter previously in zone 1 that is now associated with zone 4, a sequence of Z1, Z4 for the first letter in two consecutive password entries would result in a guaranteed determination of the letter "A", even though this letter was never transmitted. Thus, through the user of multiple iterations of this password scheme, further precision can be achieved.

Figure 13:
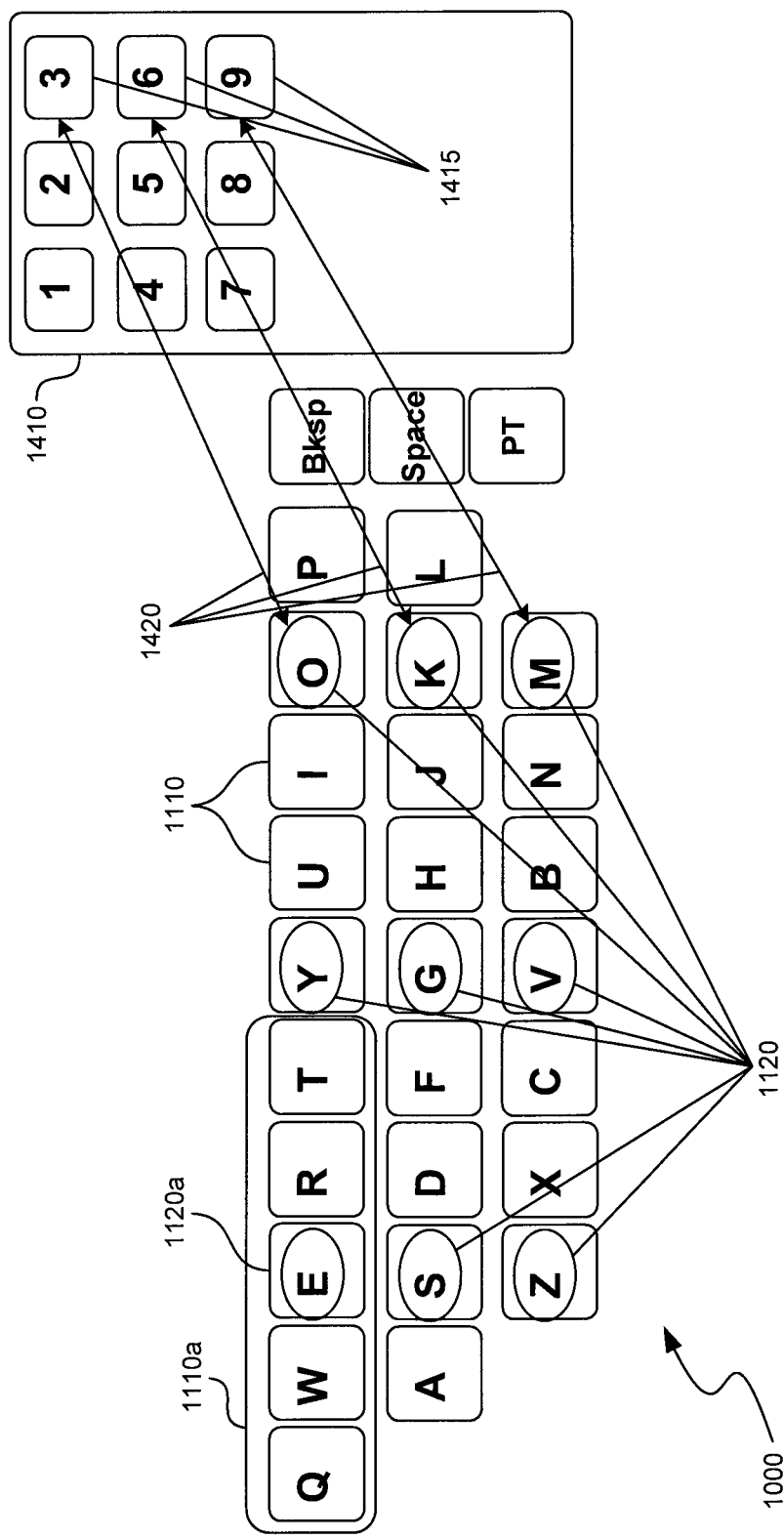
FIG. 13 depicts the mapping of a numeric keypad to zone output keys on a QWERTY keyboard in accordance with an embodiment of the disclosed technology.

An embodiment of the disclosed technology employing a traditional nine key keypad is shown in FIG. 13. As is shown in FIG. 13, zone output keys 1120, 1120*a* are shown, as well as keys associated therewith 110*a*, similarly to the display depicted in FIG. 10. Additionally, a key configuration 1410 is shown, such as that may be included on a traditional remote control, telephone, or the like, indicating a mapping each key 1415 thereof to one of the zone output keys 1120, 1120*a*. Such mapping may be indicated by a connecting lead line 1420, color, shape, or any other desired indicator of relationship. Thus, if a number of zones are defined, a user may be able to enter the password using such a keypad by selecting number keys associated with the zone including each of the desired characters in the password.

In an additional embodiment of the disclosed technology, rather than making an indication on a remote device as described above to indicate zone selection, it may be possible to employ a pointing device, such as a remote control utilized with, for example, a NINTENDO® Wii® controller, body movement sensing to determine a user input, or the like. Thus, as a user points such a controller at a displayed virtual keyboard, or otherwise indicates zone selection, a zone pointed at by the controller is highlighted or otherwise indicated as being designated. A user can select such a zone by pressing an indicator on the remote, or by other method as is known to one of ordinary skill in the art. The use of zones in accordance with the disclosed technology is particularly useful in such a situation in that the ability to select each individual key may be difficult in such a configuration. Accuracy may be difficult. However, in accordance with the present disclosed technology, a user need only select between, for example, one of nine zones, thus making this ability to select much easier for a user. Thus, a user will likely be able to move through character selection in a much faster and easier manner.

Figure 14A:
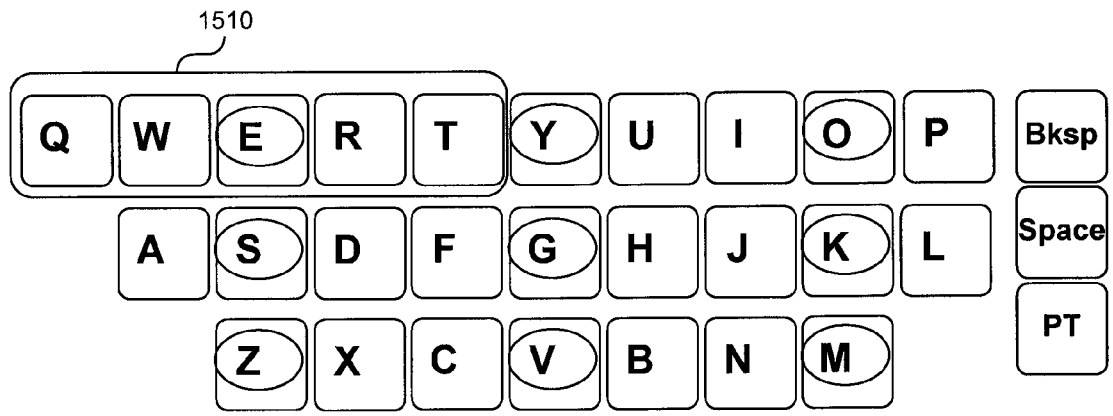
FIGS. 14A and 14B depict selection of zones employing a pointing device in accordance with an embodiment of the disclosed technology.
Figure 14B:
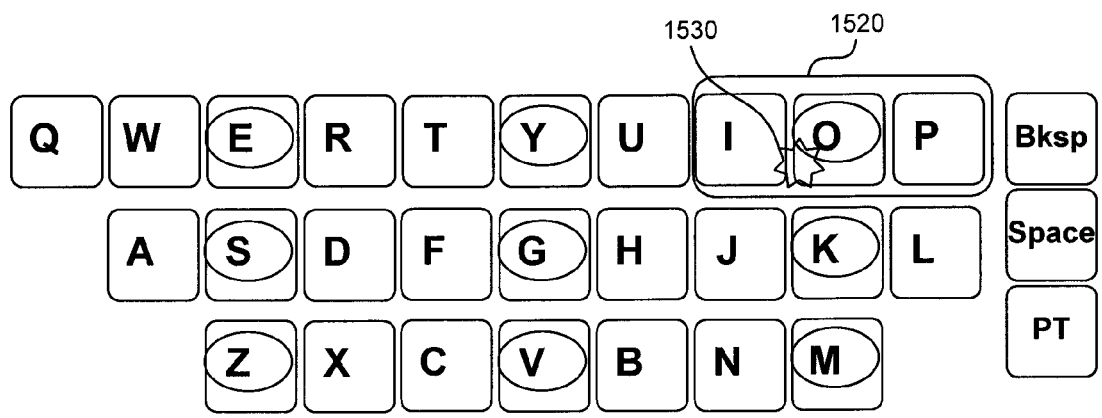

As is shown in FIGS. 14A and 14B, utilizing such a pointer device allows for easy selection of a desired zone. FIG. 14A depicts selection of a zone 1510, such as that selected in FIG. 10. In FIG. 14B a zone 1520, two zones to the right of the previously selected zone, is designated and selected. The user is able to make such a designation and selection simply by redirecting the pointing device. Preferably, an indicator 530 remains on the display to aid in locating the current position of the pointing device.

In addition to providing a visual indication of the remote pointing device moving from one displayed zone to another, in an alternative embodiment of the disclosed technology, a haptic or other tactile response is also provided to a user to provide an additional, non-visual indication of movement and selection. Thus, as a user moves the pointing device to designate a second zone, a vibration or other non-verbal indicator may be provided to the user. Thus, if as in the movement between FIGS. 14A and 14B a user moves the pointer two zones, such a haptic response may be provided to a user twice, once each time the border between zones is crossed. Such haptic response may also be modified, thus providing a different response for different zones. Thus, each zone may have a different haptic signature, or a zone determined by a parsing algorithm to be the most likely selected zone in the next selection may be provided a haptic indicator different from the other zones. The zones may be differentiated in any other manner including such a haptic indicator.

Referring once again to FIG. 10, when a character in a particular zone is selected on the user interface, a predetermined number of adjacent keys to the left and the right and/or above and below are highlighted along with the selected key, thus comprising a zone associated with the zone output key. This highlight lets the user know the zone that has been selected. Preferably, the zone output key associated with the designated zone is further delineated as the key that will become part of the output data stream. As is also noted above, if the zones are not to be displayed to a user, then selection of a particular key will result in no change in display, even if in the background the zone output keys are being output based upon an input zone, as described above.

As noted above, the displayed virtual keyboard represents a full QWERTY keyboard, but may comprise any other desired configuration. The zone output keys may be preferably highlighted in a different color on the keyboard, or designated using some other distinguishing characteristic. When the input device is used to go to a zone corresponding to a particular zone output key, the other characters in the zone are preferably highlighted as well to provide to the user visual feedback on the set of letters that are grouped with the selection of a particular zone.

While the disclosed technology has been described related to the transmission of a password, the features of the disclosed technology may be applied to a more lengthy encrypted data transmission.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the disclosed technology provided herein can be applied to other systems, not necessarily the system described above. The elements and acts of the various examples described above can be combined to provide further implementations of the disclosed technology. Some alternative implementations of the disclosed technology may include not only additional elements to those implementations noted above, but also may include fewer elements.

Any patents and applications and other references noted above, including any that may be listed in accompanying filing papers, are incorporated herein by reference. Aspects of the disclosed technology can be modified, if necessary, to employ the systems, functions, and concepts of the various references described above to provide yet further implementations of the disclosed technology.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system may vary considerably in its specific implementation, while still being encompassed by the disclosed technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

We claim:

1. A method, performed using one or more processors and a memory, for data input, the method comprising:
  receiving, through an input device and using the one or more processors, a first user input as part of a gesture,
    wherein the gesture comprises at least a first input selection that represents less than an entire word and a second input selection; and
    wherein the gesture is a continuous stroke across a virtual keyboard from a first simulated key across one or more other simulated keys;
  identifying, in the first user input, a bend from the first input selection to a current input location along the gesture;
  determining that the bend indicates a third input selection that represents a portion of the word between the first input selection and the second input selection;
  assigning to the bend a directional classification from a discrete set of directional classifications;
  determining one or more candidates for the third input selection based on the candidates for the third input selection being in a direction, relative to the first input selection, corresponding to the assigned directional classification;

determining, using the one or more processors, one or more possible word suggestions based upon the first input selection and the one or more candidates for the third input selection, wherein the one or more possible word suggestions are determined prior to receiving the second input selection; and providing, using a display, the possible word suggestions to the user.

2. The method of claim 1, wherein the one or more candidates for the third input selection are determined without regard for the proximity of the bend to a representation of the third input selection.

3. The method of claim 1, wherein the discrete set of directional classifications comprise directional classifications corresponding to up, down, left, and right.

4. The method of claim 1, wherein the discrete set of directional classifications comprises eight or less directions.

5. The method of claim 1, wherein assigning to the bend the directional classification comprises:

determining an angle off a horizontal direction or a vertical direction; and selecting a direction that amounts to one of: up, down, left, or right, wherein selecting the direction is based on a closest correspondence to the determined angle.

6. The method of claim 1, wherein determining that the bend indicates the third input selection comprises determining that the bend indicates a single character between the first input selection and the second input selection.

7. The method of claim 1, wherein the first input selection indicates a jumper point for a zone including at least two characters.

8. A non-transitory computer readable medium, storing instructions that, when executed by a computing system, cause the computing system to perform operations for data input, the operations comprising:

receiving a first user input as part of a gesture, wherein the gesture comprises at least a first input selection that represents less than an entire word and a second input selection; and wherein the gesture is a continuous stroke across a virtual keyboard from a first simulated key across one or more other simulated keys;

identifying, in the first user input, a bend from the first input selection to a current input location along the gesture;

determining that the bend indicates a third input selection that represents a portion of the word between the first input selection and the second input selection;

assigning to the bend a directional classification from a discrete set of directional classifications;

determining one or more candidates for the third input selection based on the candidates for the third input selection being in a direction, relative to the first input selection, corresponding to the assigned directional classification;

determining one or more possible word suggestions based upon the first input selection and the one or more candidates for the third input selection, wherein the one or more possible word suggestions are determined prior to receiving the second input selection; and providing, using a display, the possible word suggestions to the user.

9. The non-transitory computer readable medium of claim 8, wherein the one or more candidates for the third input selection are determined without regard for the proximity of the bend to a representation of the third input selection.

10. The non-transitory computer readable medium of claim 8, wherein the discrete set of directional classifications comprise directional classifications corresponding to up, down, left, and right.

11. The non-transitory computer readable medium of claim 8, wherein the discrete set of directional classifications comprises eight or less directions.

12. The non-transitory computer readable medium of claim 8, wherein assigning to the bend the directional classification comprises:

determining an angle off a horizontal direction or a vertical direction; and selecting a direction that amounts to one of: up, down, left, or right, wherein selecting the direction is based on a closest correspondence to the determined angle.

13. The non-transitory computer readable medium of claim 8, wherein determining that the bend indicates the third input selection comprises determining that the bend indicates a single character between the first input selection and the second input selection.

14. The non-transitory computer readable medium of claim 8, wherein the first input selection indicates a jumper point for a zone including at least two characters.

15. A computing system configured to perform data input, the system comprising:

one or more processors;

a memory;

a touch sensitive input configured to:

receive, using the one or more processors, a first user input as part of a gesture, wherein the gesture comprises at least a first input selection that represents less than an entire word and a second input selection; and wherein the gesture is a continuous stroke across a virtual keyboard from a first simulated key across one or more other simulated keys;

an input recognition module configured to:

identify, in the first user input, a bend from the first input selection to a current input location along the gesture;

determine that the bend indicates a third input selection that represents a portion of the word between the first input selection and the second input selection;

assign to the bend a directional classification from a discrete set of directional classifications;

determine one or more candidates for the third input selection based on the candidates for the third input selection being in a direction, relative to the first input selection, corresponding to the assigned directional classification; and determine, using the one or more processors, one or more possible word suggestions based upon the first input selection and the one or more candidates for the third input selection, wherein the one or more possible word suggestions are determined prior to receiving the second input selection; and a display configured to provide the possible word suggestions to the user.

16. The computing system of claim 15, wherein the one or more candidates for the third input selection are determined without regard for the proximity of the bend to a representation of the third input selection.

17. The computing system of claim 15, wherein the discrete set of directional classifications comprise directional classifications corresponding to up, down, left, and right.

18. The computing system of claim 15, wherein the discrete set of directional classifications comprises eight or fewer directions.

19. The computing system of claim 15, wherein determining that the bend indicates the third input selection comprises determining that the bend indicates a single character between the first input selection and the second input selection.

20. The computing system of claim 15, wherein the first input selection indicates a jumper point for a zone including at least two characters.

\* \* \* \* \*